(12) United States Patent
Buzan et al.

(10) Patent No.: US 11,001,444 B2
(45) Date of Patent: May 11, 2021

(54) STORAGE AND RETRIEVAL SYSTEM ROVER INTERFACE

(71) Applicant: Symbotic, LLC, Wilmington, MA (US)

(72) Inventors: Forrest Buzan, Dunstable, MA (US); Edward A. MacDonald, Somerville, MA (US); Taylor A. Apgar, Boston, MA (US); Thomas A. Schaefer, Groveland, MA (US); Melanie Ziegler, Andover, MA (US); Russell G. Barbour, Natick, MA (US)

(73) Assignee: Symbotic LLC, Wilmington, MA (US)

( * ) Notice: Subject to any disclaimer, the term of this patent is extended or adjusted under 35 U.S.C. 154(b) by 0 days.

(21) Appl. No.: 16/293,309

(22) Filed: Mar. 5, 2019

(65) Prior Publication Data

US 2019/0193938 A1    Jun. 27, 2019

Related U.S. Application Data

(60) Continuation of application No. 15/598,969, filed on May 18, 2017, now Pat. No. 10,221,013, which is a
(Continued)

(51) Int. Cl.
*B65G 1/04* (2006.01)
(52) U.S. Cl.
CPC .................. *B65G 1/0492* (2013.01)
(58) Field of Classification Search
CPC combination set(s) only.
See application file for complete search history.

(56) References Cited

U.S. PATENT DOCUMENTS

| 6,652,213 B1 | 11/2003 | Mitchell et al. |
| 8,068,978 B2 | 11/2011 | D'Andrea et al. |

(Continued)

FOREIGN PATENT DOCUMENTS

| CN | 28585784 | 1/2007 |
| CN | 201031067 | 3/2008 |

(Continued)

OTHER PUBLICATIONS

International Search Report, International Application No. PCT/US2014/026502, dated Sep. 25, 2014.

*Primary Examiner* — Kyle O Logan
(74) *Attorney, Agent, or Firm* — Perman & Green, LLP

(57) ABSTRACT

An automated storage and retrieval system including at least one autonomous rover for transferring payload within the system and including a communicator, a multilevel storage structure, each level allowing traversal of the at least one autonomous rover, at least one registration station disposed at predetermined locations on each level and being configured to communicate with the communicator to at least receive rover identification information, and a controller in communication with the at least one registration station and configured to receive the at least rover identification information and at least one of register the at least one autonomous rover as being on a level corresponding to a respective one of the at least one registration station or deregister the at least one autonomous rover from the system, where the controller effects induction of the at least one autonomous rover into a predetermined rover space on the level.

20 Claims, 34 Drawing Sheets

Related U.S. Application Data division of application No. 14/348,786, filed as application No. PCT/US2014/026502 on Mar. 13, 2014, now Pat. No. 9,656,803.

(60) Provisional application No. 61/783,828, filed on Mar. 14, 2013, provisional application No. 61/780,363, filed on Mar. 13, 2013, provisional application No. 61/798,282, filed on Mar. 15, 2013.

(56) References Cited

U.S. PATENT DOCUMENTS

| | | | |
|---|---|---|---|
| 8,299,750 | B2 | 10/2012 | Pai |
| 9,082,112 | B2 | 7/2015 | Sullivan et al. |
| 9,694,975 | B2 * | 7/2017 | Lert ................ B65G 1/1373 |
| 2002/0159879 | A1 | 10/2002 | Elger |
| 2004/0010337 | A1 | 1/2004 | Mountz |
| 2008/0193009 | A1 * | 8/2008 | Sonoura ............... G01S 5/0294 382/153 |
| 2009/0074545 | A1 * | 3/2009 | Lert, Jr. ............... B65G 1/0492 414/276 |
| 2010/0316469 | A1 * | 12/2010 | Lert ..................... B65G 1/10 414/273 |
| 2010/0316470 | A1 | 12/2010 | Lert et al. |
| 2011/0006731 | A1 | 1/2011 | Wang et al. |
| 2012/0101627 | A1 * | 4/2012 | Lert ..................... B65G 1/065 700/216 |
| 2012/0186942 | A1 | 7/2012 | Toebes et al. |
| 2012/0189410 | A1 * | 7/2012 | Toebes ............... B65G 1/0492 414/273 |
| 2012/0195720 | A1 | 8/2012 | Sullivan et al. |
| 2012/0200259 | A1 | 8/2012 | Sullivan et al. |
| 2013/0197869 | A1 | 8/2013 | Fritz et al. |
| 2014/0312838 | A1 | 10/2014 | Dorval et al. |
| 2014/0343717 | A1 | 11/2014 | Dorval et al. |

FOREIGN PATENT DOCUMENTS

| | | |
|---|---|---|
| CN | 102725213 | 10/2012 |
| JP | 05122840 | 5/1993 |
| JP | 08140283 | 5/1996 |
| JP | 08251716 | 9/1996 |
| JP | 5003541 | 8/2012 |
| JP | 2013010633 | 1/2013 |
| WO | 0133610 | 5/2001 |
| WO | 2010118412 | 10/2010 |
| WO | 2012083055 | 6/2012 |
| WO | 2012083062 | 6/2012 |

* cited by examiner

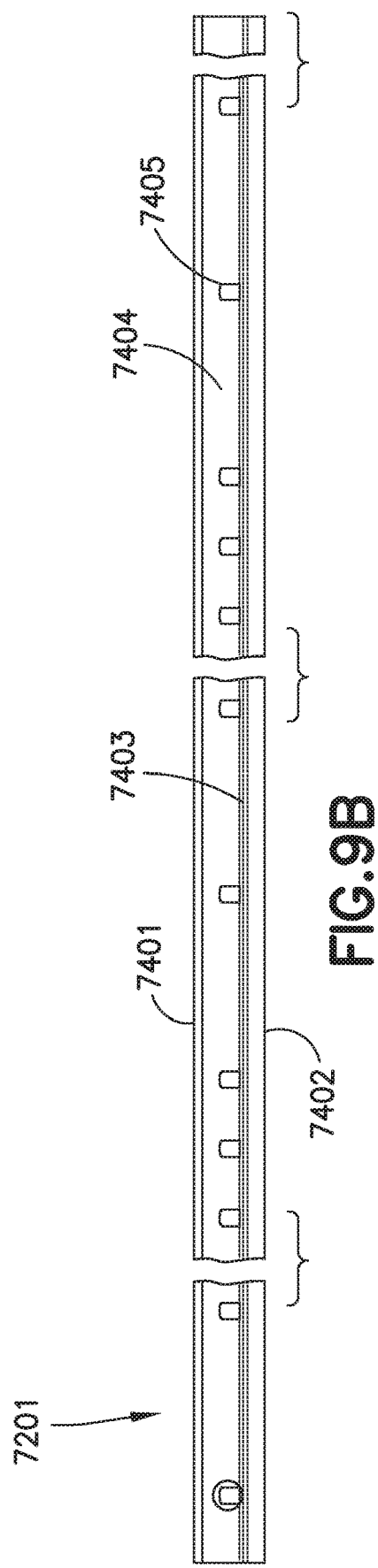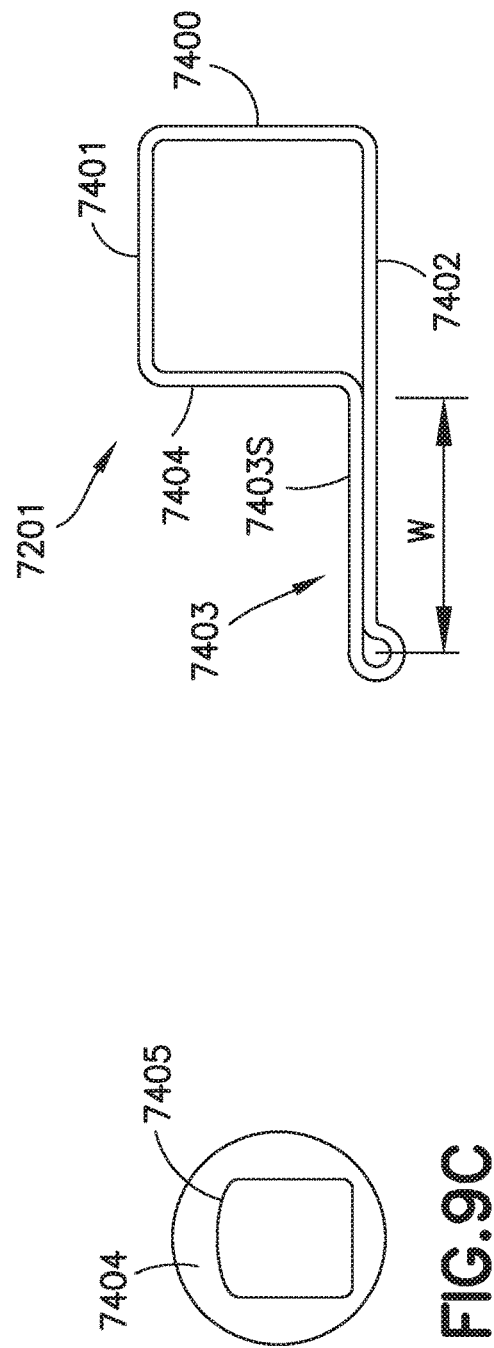

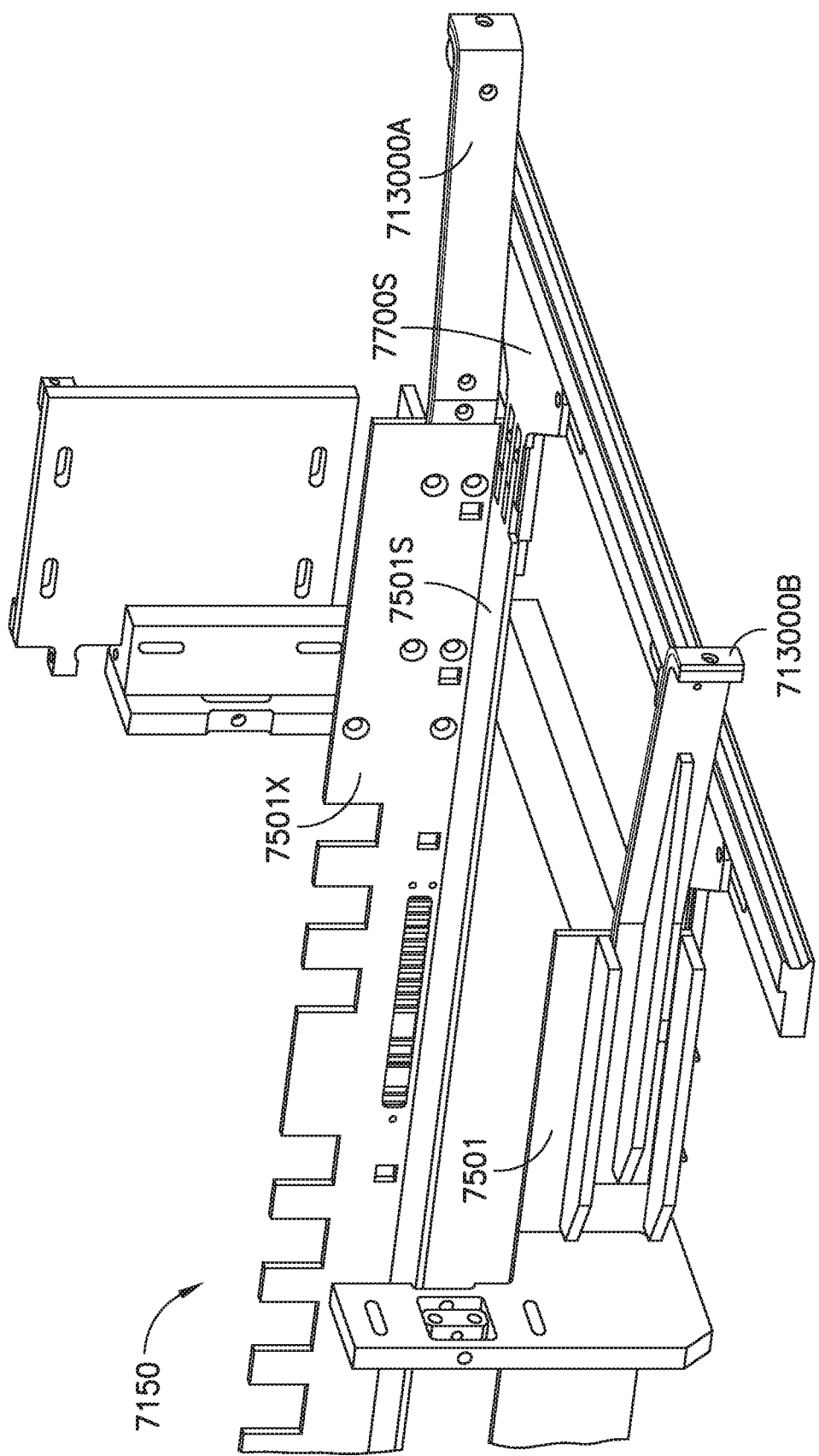

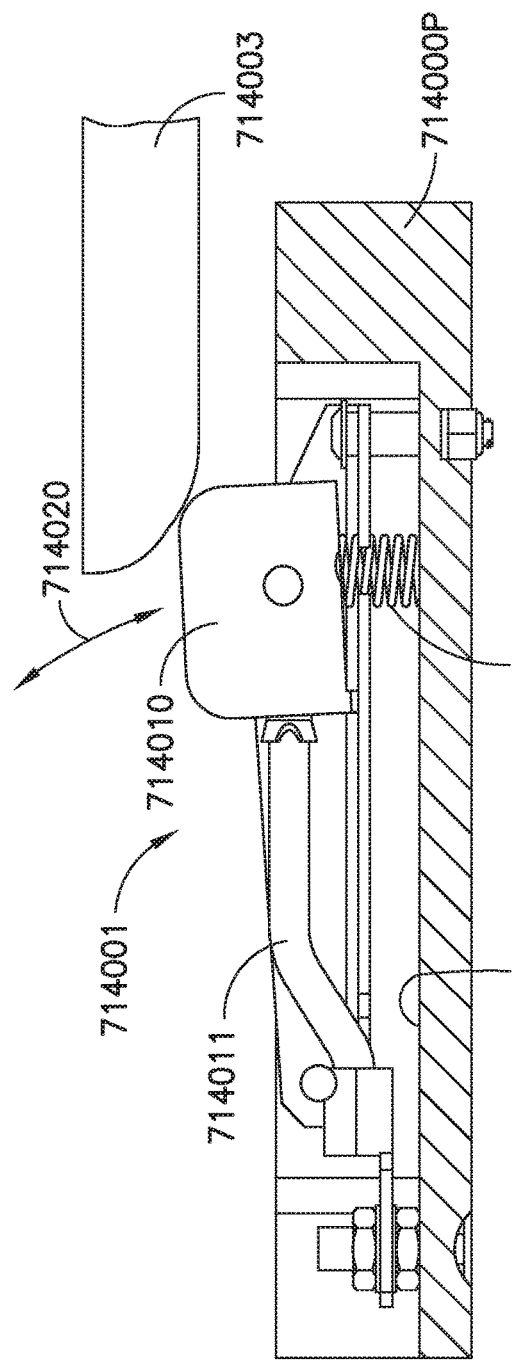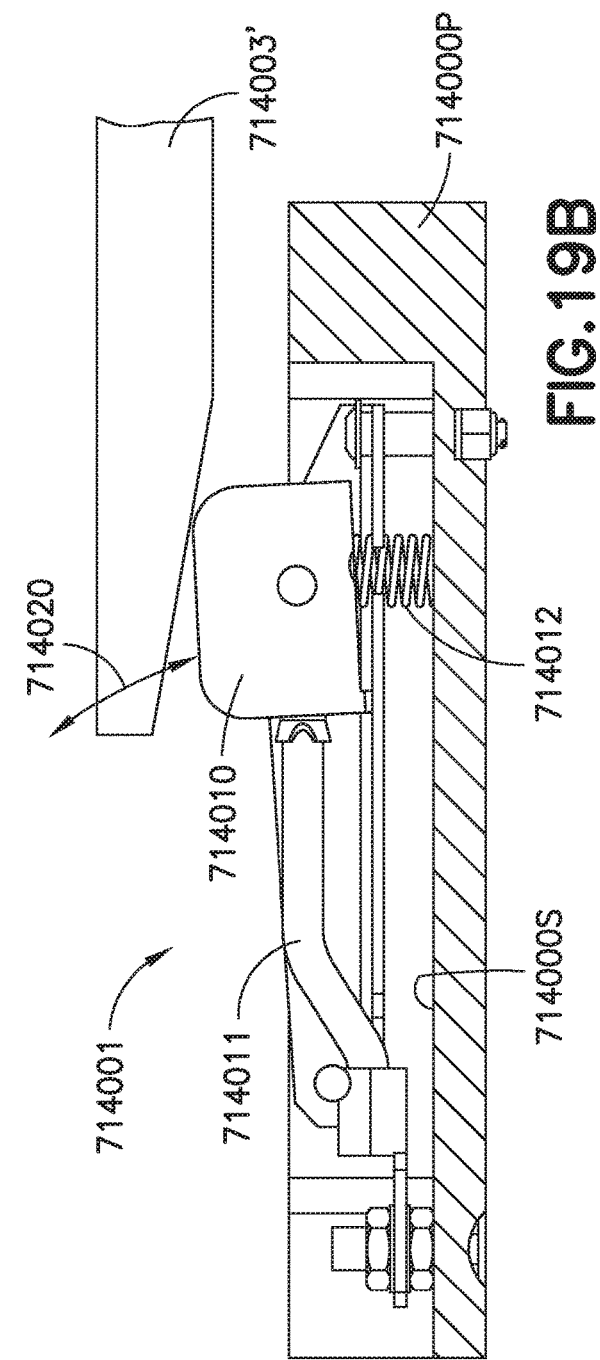

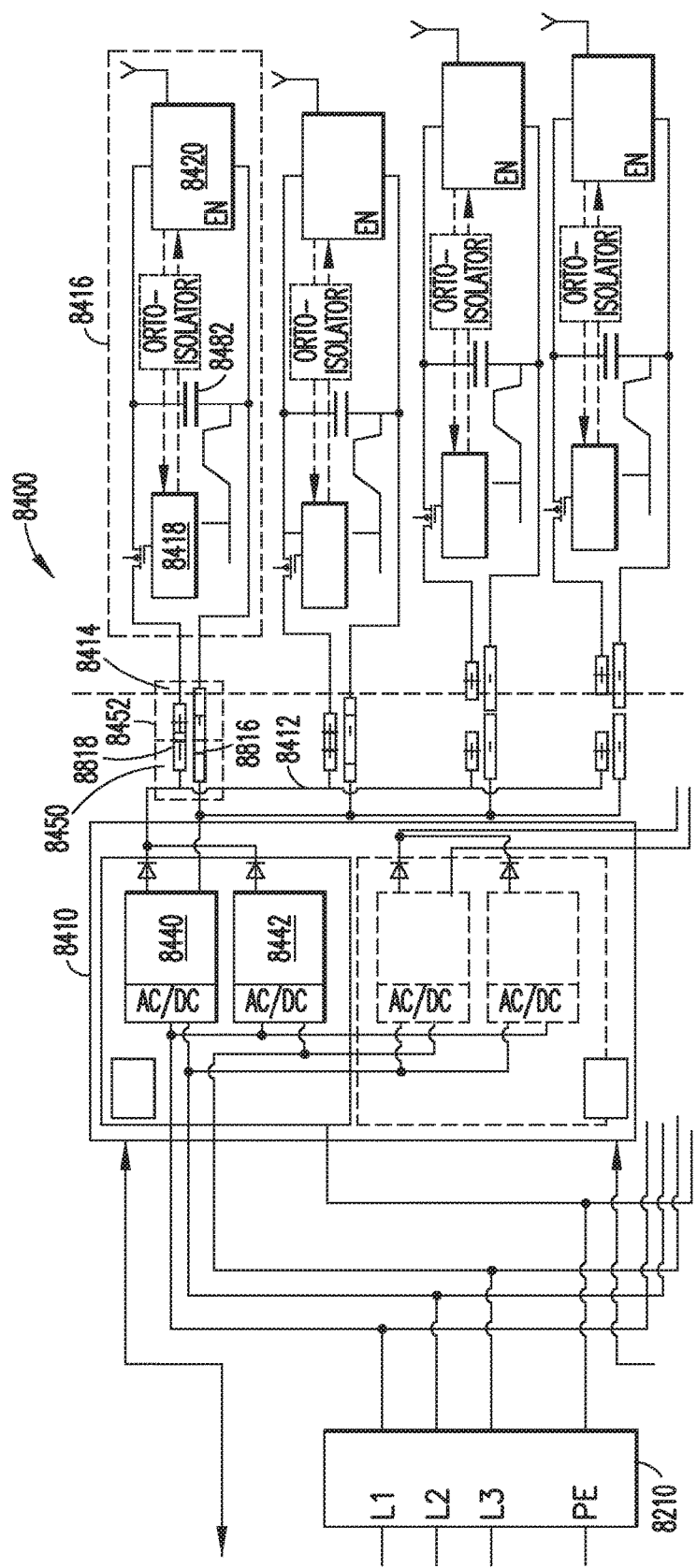
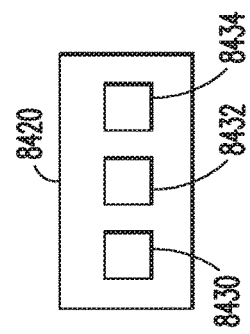
FIG.22A
FIG.22B
FIG.22C

STORAGE AND RETRIEVAL SYSTEM ROVER INTERFACE

CROSS-REFERENCE TO RELATED APPLICATIONS

This application is a continuation of U.S. patent application Ser. No. 15/598,969, filed May 18, 2017 (now U.S. Pat. No. 10,221,013) which is a divisional of U.S. patent application Ser. No. 14/348,786, filed Mar. 31, 2014 (now U.S. Pat. No. 9,656,803) and claims the benefit of International Application No. PCT/US2014/026502 having an international filing date of Mar. 13, 2014, which designated the United States of America and which is a non-provisional of and claims the benefit of U.S. Provisional Application No. 61/783,828 filed on Mar. 14, 2013, U.S. Provisional Application No. 61/780,363 filed on Mar. 13, 2013, and U.S. Provisional Application No. 61/798,282 filed Mar. 15, 2013, the disclosures of which are incorporated herein by reference in their entireties.

BACKGROUND

1. Field

The exemplary embodiments generally relate to material handling and, more particularly, to autonomous rovers within a material handling system.

2. Brief Description of Related Developments

Automated storage and retrieval systems, such as in a warehouse environment, may use autonomous vehicles/rovers to place items in storage and retrieve those items from storage. Where the automated storage and retrieval systems include multiple levels, the autonomous vehicles/rovers are generally brought to each level by driving the vehicle up and down ramps connecting the different levels or by lifting the vehicles/rovers to each level using a fork lift or hoist.

In addition, when operating in the storage and retrieval system the location of the autonomous vehicles/rovers must be known. The location of these vehicles generally is determined using GPS like systems, optical systems and radio frequency systems.

It would be advantageous to be able to easily transport autonomous vehicles/rovers to and from each level of a storage and retrieval system. It would also be advantageous to provide automated registration/deregistration of autonomous vehicles/rovers in/from the automated storage and retrieval system. It would be further advantageous to provide positioning data to autonomous vehicles/rovers lacking any previous positioning data.

Material handling systems such as, for example, automated storage and retrieval systems, cycle storage items to storage locations (e.g. shelves of a storage rack) in a storage array of an automated warehouse or store. Storage racks with dynamically allocated storage locations may expect to be subject to a higher number of load cycles during a life span/term of the automated storage and retrieval system, because of the higher usage rate of each potential storage location, when compared to conventional storage racks (where storage locations are fixed at predetermined locations of the shelves). Conventional storage structures have generally neglected fatigue concerns, and to the limited extent fatigue loads have been incorporated into the design of the conventional storage structure, such loads appear to be related to gross storage loads on the structure, rather than loading from automation (e.g. loads from automated material handlers with various payloads traversing the storage structure or payload transfer actions).

Also, conventional automated storage and retrieval systems may provide for the scanning of items after a seismic or other event that may cause movement of the stored items. Automation may be used to determine the position of the affected storage items so that the items can be moved to their correct positions. Generally, this scanning is done to facilitate recovery of the automated storage and retrieval system once the automated storage and retrieval system is shut down as a result of the seismic or other event.

It would be advantageous to have a storage structure that incorporates fatigue considerations with respect to loading from automation of the automated storage and retrieval system. It would also be advantageous to have a storage structure that facilitates maintaining operation after a seismic or other event that may cause movement of the stored items.

The autonomous vehicles/rovers may include energy storage units that require charging before initial use and during use such as when recharging upon depletion.

It would be advantageous to have a charging system for charging an autonomous vehicle's/rover's energy storage unit. It would also be advantageous to charge an autonomous vehicle's/rover's energy storage unit where the autonomous vehicle/rover may be transferring material or wherever the autonomous vehicle/rover may be located.

BRIEF DESCRIPTION OF THE DRAWINGS

The foregoing aspects and other features of the disclosed embodiment are explained in the following description, taken in connection with the accompanying drawings, wherein:

FIG. 9A-9D are schematic illustrations of a rover travel rail in accordance with aspects of the disclosed embodiment;

FIGS. 15, 16A-16C, 17A-17B and 18 are schematic illustrations of portions of a compliant interface in accordance with aspects of the disclosed embodiment;

FIGS. 19A-19C are schematic illustrations of a rover charging contact in accordance with aspects of the disclosed embodiment;

FIGS. 22A-22C are schematic illustrations of an exemplary implementation of a charging system in accordance with aspects of the disclosed embodiment;

DETAILED DESCRIPTION

Figure 1:
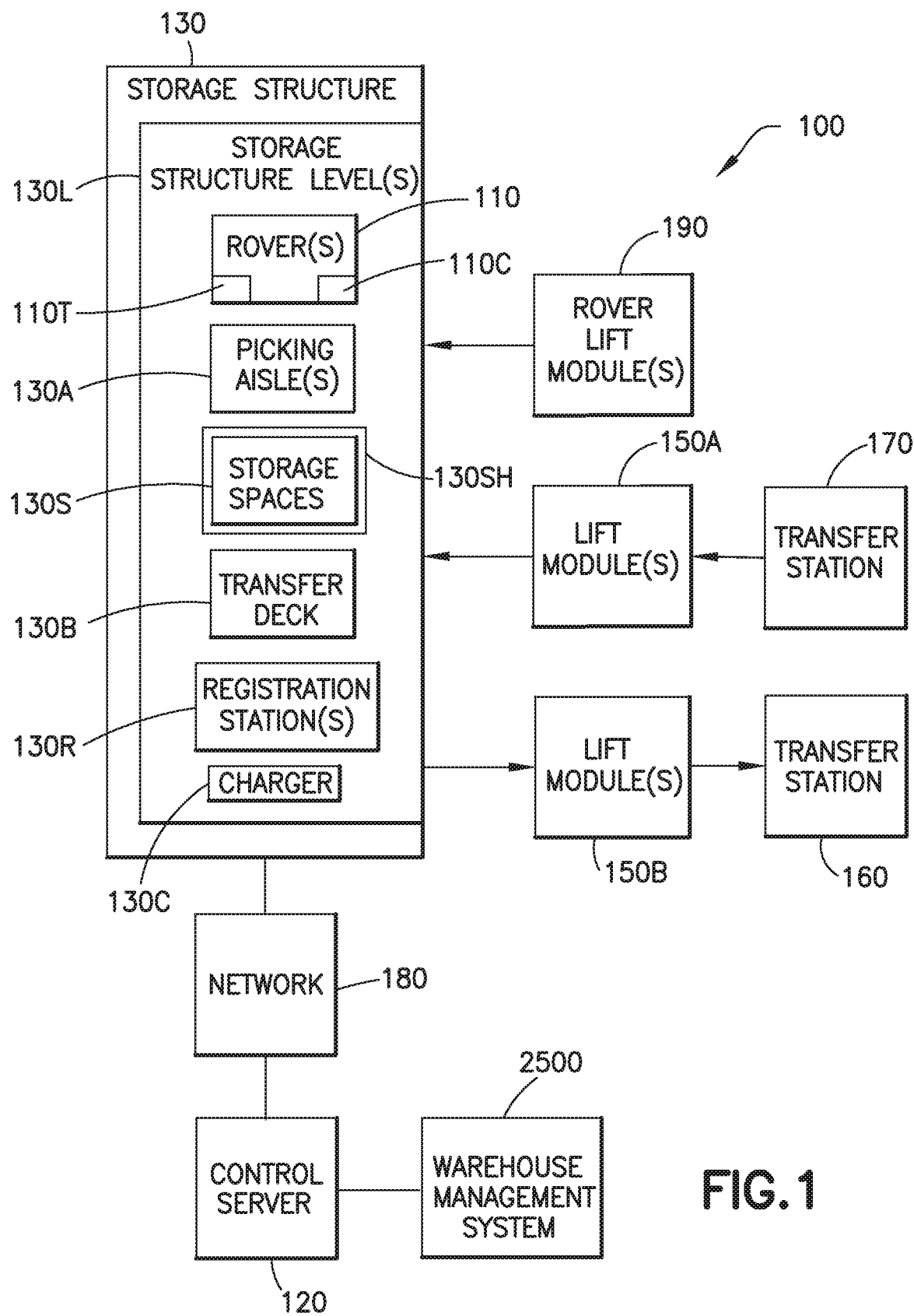
FIG. 1 is a schematic illustration of an automated storage and retrieval system in accordance with aspects of the disclosed embodiment.

FIG. 1 is a schematic illustration of an automated storage and retrieval system in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety.

The automated storage and retrieval system 100 may include in-feed and out-feed transfer stations 170, 160, input and output vertical lift modules 150A, 150B (generally referred to as lift modules 150), rover lift modules 190, a storage structure 130, and a number of autonomous rovers 110. The storage structure 130 may include automatic rover registration stations 130R (referred to herein as registration stations 130R) and multiple levels 130L of storage rack modules. Each storage level 130L includes storage spaces 130S and storage or picking aisles 130A (having rover travel surfaces, as will be described below) which, e.g., provide access to the storage spaces 130S and transfer decks 130B over which the rovers 110 travel on a respective storage level 130L for transferring case units between any of the storage spaces 130S (e.g. disposed on storage shelves 130SH located on one or more sides of the picking aisles 130A) of the storage structure 130 and any shelf of the lift modules 150. The storage aisles 130A, and transfer decks 130B are also configured to allow the rovers 110 to traverse the storage aisles 130A and transfer decks 130B for placing case units into picking stock and to retrieve ordered case units.

The rovers 110 may be any suitable autonomous vehicles capable of carrying and transferring case units throughout the storage and retrieval system 100. In one aspect the rover 110 may be automated, independent (e.g. free riding) rovers. Suitable examples of rovers can be found in, for exemplary purposes only, U.S. patent application Ser. No. 13/326,674 filed on Dec. 15, 2011; U.S. patent application Ser. No. 12/757,312 filed on Apr. 9, 2010; U.S. patent application Ser. No. 13/326,423 filed on Dec. 15, 2011; U.S. patent application Ser. No. 13/326,447 filed on Dec. 15, 2011; U.S. patent application Ser. No. 13/326,505 Dec. 15, 2011; U.S. patent application Ser. No. 13/327,040 filed on Dec. 15, 2011; U.S. patent application Ser. No. 13/326,952 filed on Dec. 15, 2011; and U.S. patent application Ser. No. 13/326,993 filed on Dec. 15, 2011, the disclosures of which are incorporated by reference herein in their entireties. The rovers 110 may be configured to place case units, such as the above described retail merchandise, into picking stock in the one or more levels of the storage structure 130 and then selectively retrieve ordered case units for shipping the ordered case units to, for example, a store or other suitable location. Each rover 110 may include a controller 110C and a communicator 110T.

The rovers 110, vertical lift modules 150, rover lift modules 190 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. In one aspect, the control server 120 may include a collection of substantially concurrently running programs (e.g. system management software) for substantially automatic control of the automated storage and retrieval system 100. The collection of substantially concurrently running programs may be configured to manage the storage and retrieval system 100 including, for exemplary purposes only, controlling, scheduling, and monitoring the activities of all active system components, managing inventory (e.g. which case units are input and removed and where the case units are stored) and pickfaces (e.g. one or more case units that are movable as a unit), and interfacing with the warehouse management system 2500 as well as monitoring and tracking, in any suitable manner, the input and removal (i.e. the registration and deregistration) of rovers 110 at each storage level 130L.

Figure 2A:
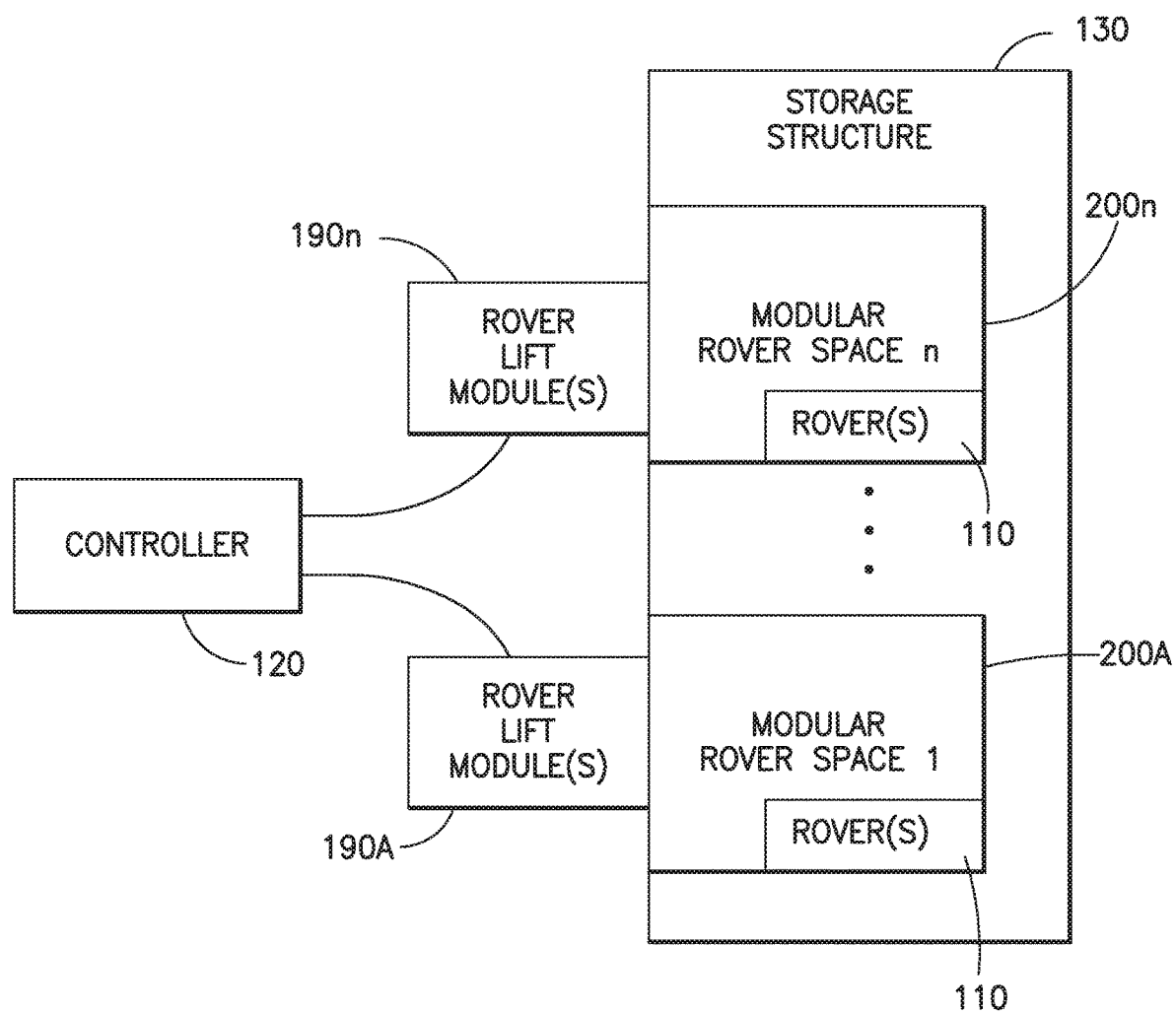
FIGS. 2A, 2B and 2C are schematic illustrations of portions of the automated storage and retrieval system of FIG. 1 in accordance with aspects of the disclosed embodiment.

Referring to FIG. 2A, a portion of the automated storage and retrieval system 100 is shown in accordance with aspects of the disclosed embodiment. The storage structure 130 may include one or more modular rover spaces 200A-200n which may be accessed by one or more respective rover lift 190A-190n. As will be described in greater detail below, each rover lift 190 may be an entry/exit station that communicates with, for example, the transfer deck 130B on each level 130L of the storage structure 130 for automatically transferring the rovers 110 to and from each storage level 130L (e.g. to populate each of the modular rover spaces 200A-200n) independent of rover payload transport and independent of the introduction and removal of case units to/from the storage structure 130.

Figure 2B:
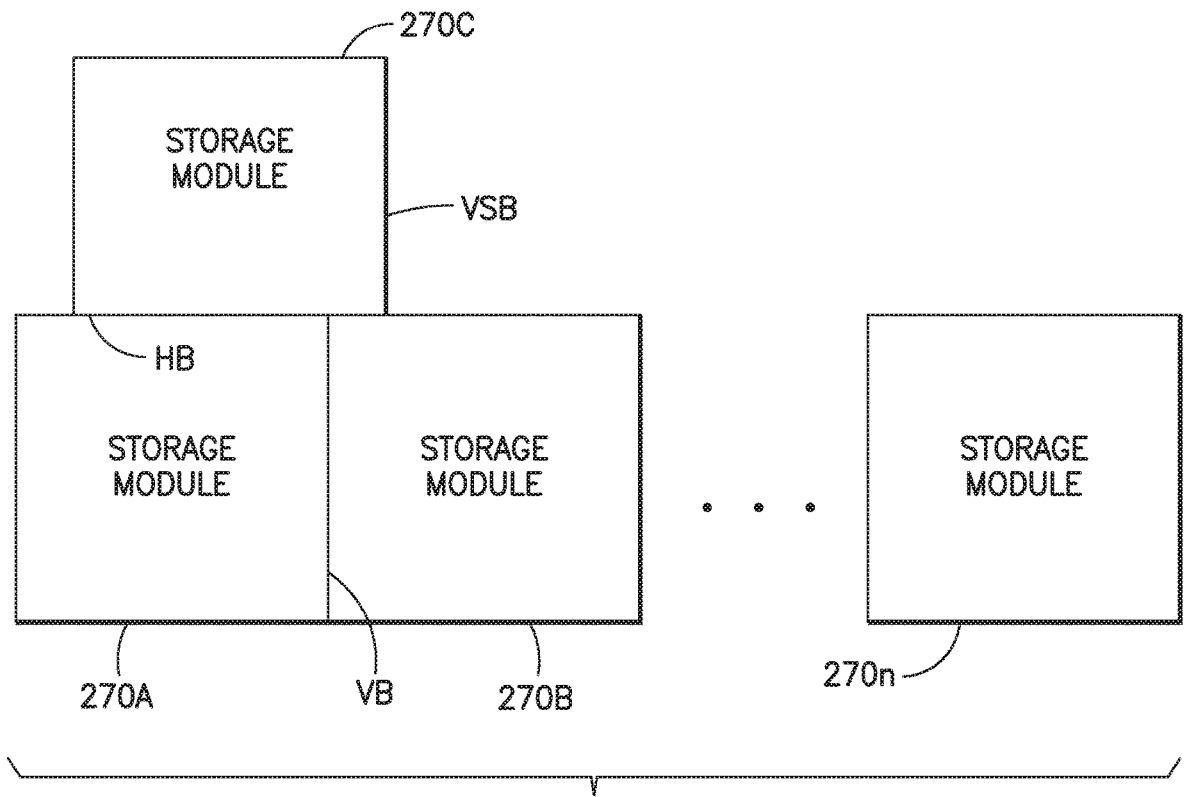

The automated storage and retrieval system 100 may be organized to effect the modular rover space(s) 200A-200n. For example, referring also to FIG. 2B, in one aspect the automated storage and retrieval system 100 and storage structure 130 may be structured as one or more storage module 270A-270n where each storage module 270A-270n includes storage structure levels 130L (e.g. with picking aisles 130A, storage spaces 130S, transfer decks 130B and registration stations 130R), vertical lift modules 150, rover lift modules 190 and transfer stations 160, 170. In one aspect the storage modules 270A-270n may be individual modules where, for example, the operation of the rovers 110 may be confined to the storage modules 270A-270n and/or modular rover spaces 200A-200n (e.g. defined within the respective storage module) in which they were placed for operation. In other aspects the storage modules 270A-270n may be coupled or otherwise connected to each other to form the automated storage and retrieval system 100 such that rovers 110 may transit between the storage modules 270A-270n and/or modular rover spaces 200A-200n. For example, one rover lift module can provide rovers to one or more storage modules 270A-270n. Rovers 110 may also be input into the storage structure 130 with one rover lift module and removed from the storage structure with a different rover lift module. In still other aspects where the storage modules 270A-270n are connected to each other the rovers 110 may be confined to operation in one or more areas of the storage structure such as the modular rover spaces 200A-200n in which the rovers 110 were introduced for operation or to a rover space 200A-200n in which the rover was reassigned.

Figure 2C:
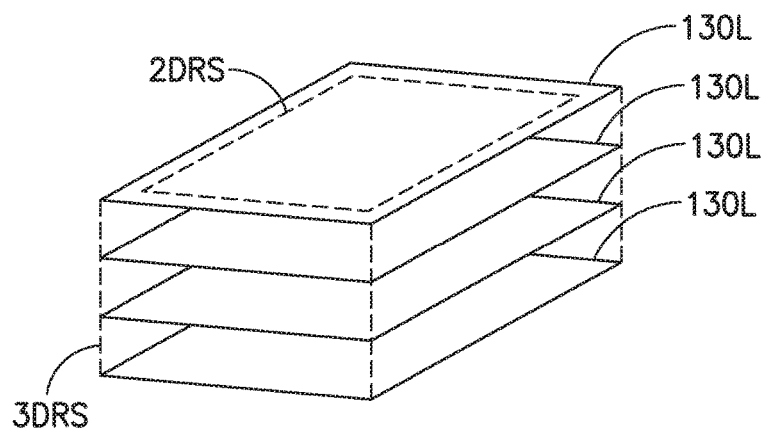

In one aspect the storage modules 270A-270n may have vertical boundaries VB and/or horizontal boundaries HB separating each storage module 270A-270n. In other aspects each level 130L of the storage structure 130 may have vertically staggered boundaries so that the storage modules 270A-270n vertically overlap one another (see storage module 270C in FIG. 2B and vertically staggered boundaries VB and VSB). Each storage module 270A-270n may define a respective one or more modular rover space 200A-200n and, as noted above, may include one or more rover lift modules 190-190n so that entry and exit of the rovers 110 may be provided at each storage level 130L of the storage module 270A-270n. In one aspect, referring also to FIG. 2C, each level 130L of the storage module may define a two dimensional modular rover space 2DRS while in other aspects the storage module as a unit may define a three dimensional modular rover space 3DRS. In still other aspects the modular rover space(s) may be defined in any suitable manner and with any suitable boundaries within each storage module and/or among multiple storage modules. For example, one or more storage levels 130L and/or portions of one or more storage levels of a storage module 270A-270n may define a three dimensional modular rover space. The entry and exit of the rovers 110 from each storage module 270A-270n may be decoupled from case unit input/output within the storage structure 130. As will be described in greater detail below, the rover lift modules 190-190n may communicate with, for example, the controller 120 in any suitable manner (e.g. wired, wireless, etc.) for registering (upon entry) and deregistering (upon exit) each rover as it passes to and from, for example, the rover lift module 190A-190n.

In one aspect each of the storage modules 270A-270n and/or modular rover spaces 200A-200n may be coincident with rover safety zones (e.g. zones where rovers 110 can be quarantined/isolated and/or moved to a rover lift module 190 for removal from the storage structure 130). In other aspects each modular rover space 200A-200n and/or storage module 270A-270n may have designated or predetermined areas defining rover safety zones or personnel access zones within the modular rover space 200A-200n and/or storage module 270A-270n. Suitable examples of personnel access zones can be found in, for example, U.S. provisional patent application No. 61/794,065 entitled "Automated Storage and Retrieval Structure with Integral Secured Personnel Access Zones and Remote Rover Shutdown" and filed on Mar. 13, 2013, the disclosure of which is incorporated herein by reference in its entirety.

Figure 3:
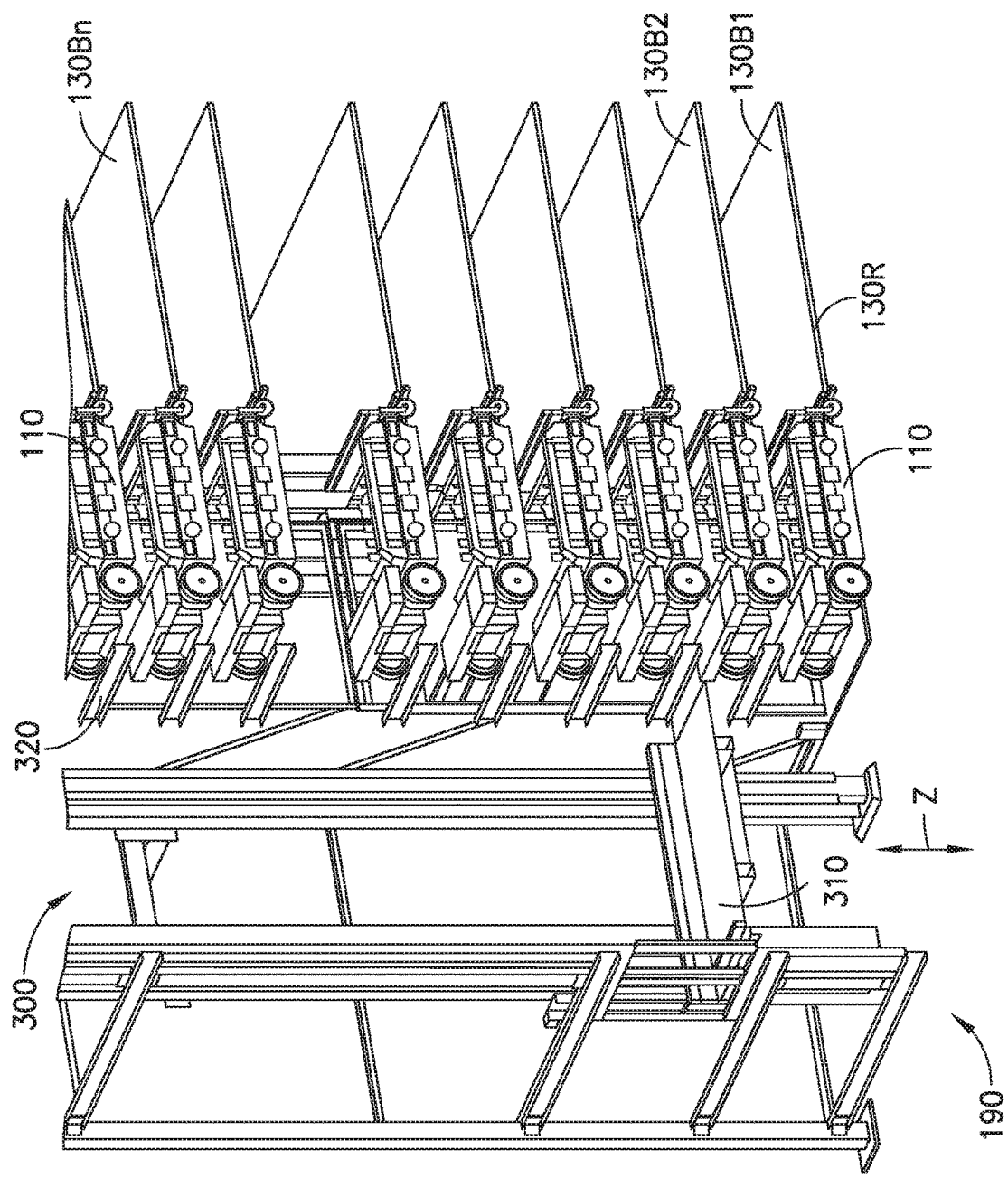
FIG. 3 is a schematic illustration of a portion of the automated storage and retrieval system of FIG. 1 in accordance with aspects of the disclosed embodiment.
Figure 4:
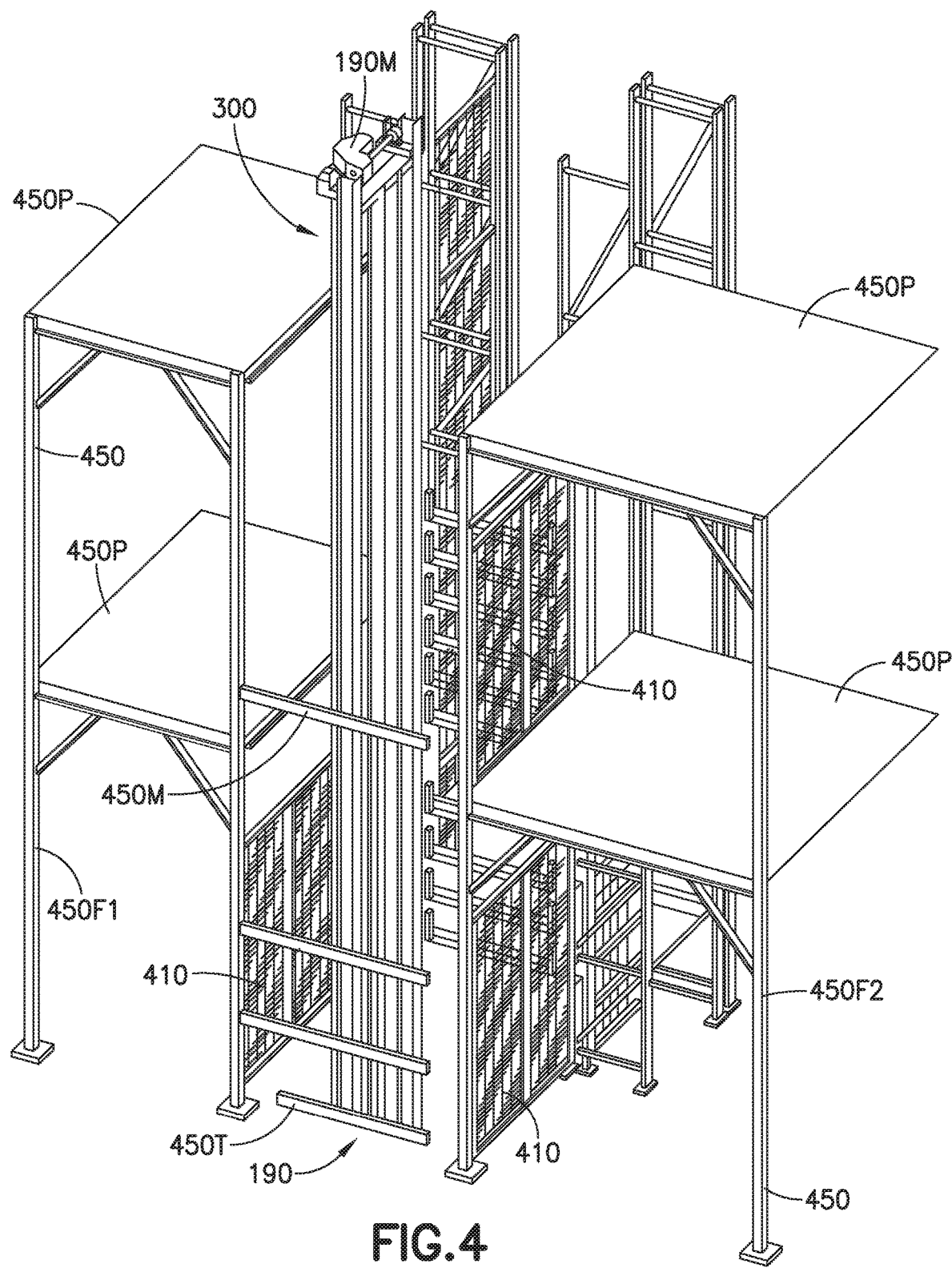
FIG. 4 is a schematic illustration of a portion of the automated storage and retrieval system of FIG. 1 in accordance with aspects of the disclosed embodiment.

Referring to FIGS. 3 and 4 one or more rover lift modules 190 can be interfaced with the transfer deck 130B of one or more storage level 130L. The interface between the rover lift modules 190 and the transfer decks 130B may be disposed at a predetermined location of the transfer decks 130B so that the input and exit of rovers 110 to each transfer deck 130B is substantially decoupled from throughput of the automated storage and retrieval system 100 (e.g. the input and output of the rover 100 at each transfer deck does not affect throughput). In one aspect the rover lift modules 190 may interface with a spur or staging area 130B1-130Bn (e.g. rover loading platform) that is connected to or forms part of the transfer deck 130B for each storage level 130L. In other aspects the rover lift modules 190 may interface substantially directly with the transfer decks 130B. It is noted that the transfer deck 130B and/or staging area 130B1-130Bn may include any suitable barrier 320 that substantially prevents a rover 110 from traveling off of the transfer deck 130B and/or staging area 130B1-130Bn at the lift module interface. In one aspect the barrier may be a movable barrier 320 that may be movable between a deployed position for substantially preventing the rover 110 from traveling off of the transfer deck 130B and/or staging area 130B1-130Bn and a retracted position for allowing the rover 110 to transit between a lift platform 310 of the rover lift module 190 and the transfer deck 130B and/or staging area 130B1-130Bn.

In addition to inputting or removing rovers 110 to and from the storage structure 130, in one aspect, each rover lift module 190 may also transport rovers 110 between storage levels 130L without removing the rovers 110 from the storage structure 130. The controller 120 may utilize the rover lift modules 190 to effect rover balancing where a work load between the storage levels 130L is balanced through the introduction of rovers 110 from outside the storage structure 130 into a predetermined storage level 130L, removal of rovers 110 from the storage structure 130 and/or transfer of rovers 110 between storage levels 130L without removing the rovers 110 from the storage structure 130. It is noted that in one aspect the transfer of rovers 110 between different storage levels 130L with the rover lift modules 190 is performed independent of rover payload transfer (e.g. case units/pickfaces are not disposed on the rover when transferred between storage levels using the rover lift modules). In other aspects, the rover 110 may carry a payload while being transferred between storage levels using the rover lift modules.

For exemplary purposes only, each rover lift module 190 may include a substantially rigid frame 300 and a lift platform 310 movably coupled to the frame 300. The frame 300 may have any suitable configuration for allowing the lift platform 310 to move between the storage levels 130L. The rover lift module 190 may include any suitable drive system 190M that is coupled to the lift platform 310 for causing movement of the lift platform in the direction of arrow Z (FIG. 3) between the storage levels 130L.

Figure 5:
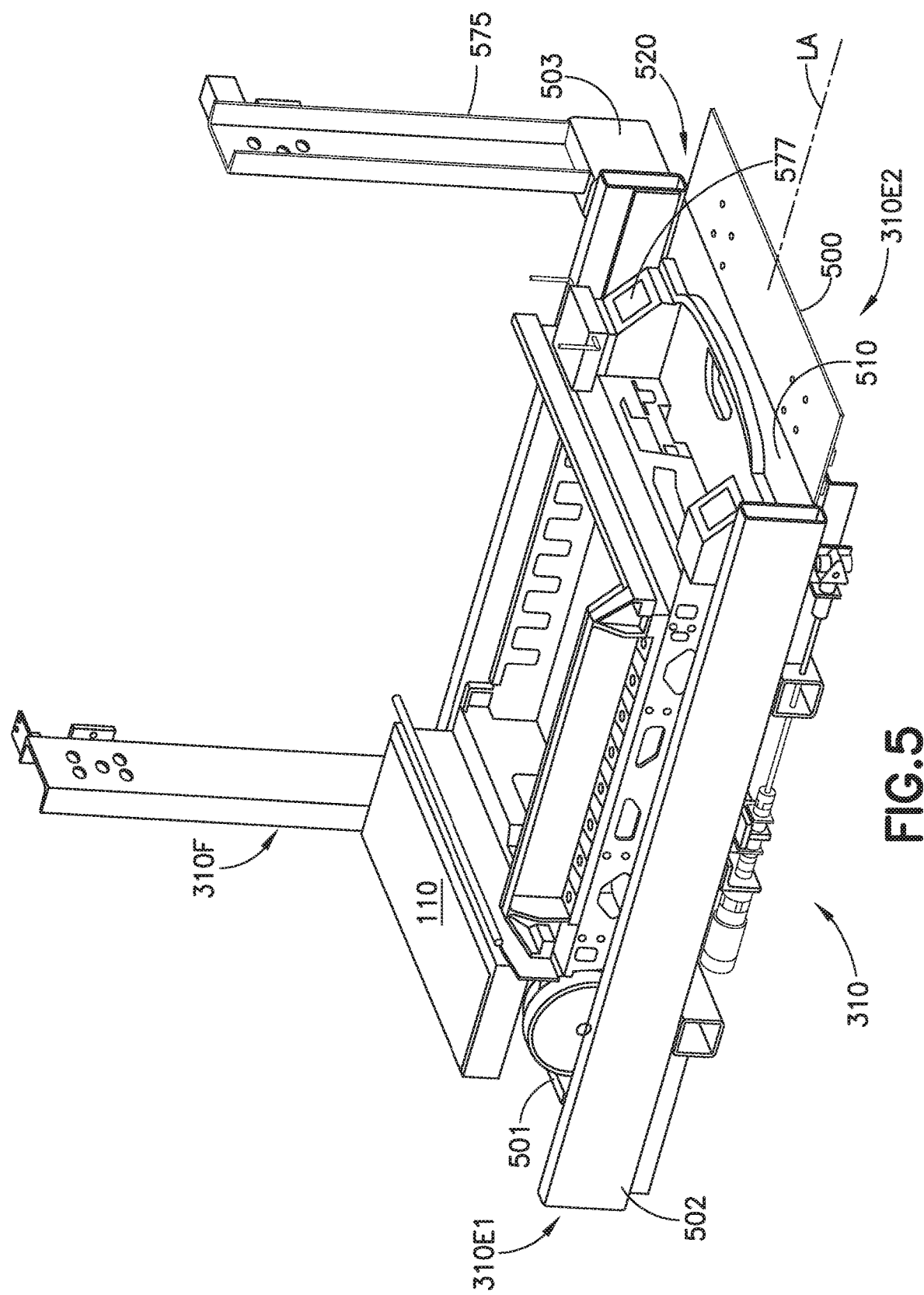
FIG. 5 is a schematic illustration of a portion of a rover lift module in accordance with aspects of the disclosed embodiment.

Referring also to FIG. 5 the lift platform 310 includes a frame 310F that forms a rover support 510 having at least one opening 520 for allowing a rover 110 to transit to and from the rover support 510. The frame 310F may have any suitable configuration and may be movably coupled to the frame 300 and drive system 190M in any suitable manner. The movable coupling between frame 310F and the frame 300 may also include any suitable guide members to substantially prevent movement of the lift platform in the X-Y plane (FIG. 3). For exemplary purposes, the frame 310F may further include one or more fences 500-503 that substantially surround the rover support 510 for substantially preventing the rover 110 from driving or otherwise moving off of the lift platform 310 during, for example, transport of the rover 110. At least one of the fences 500-503 may be movably mounted to the frame for allowing the rover 110 to transit between the rover support 510 and, for example, the transfer deck 130B (and/or staging area 130B1-130Bn). In one aspect the frame 310F includes a first end 310E1 and a second end 310E2 longitudinally separated from the first end 310E1. The rover 110 may travel onto and off of the lift platform along the longitudinal axis LA such that one or more of the fences 500, 501 located at the first and second ends 310E1, 310E2 can be moved between a first position for allowing the rover 110 to enter or exit the lift platform 310 and a second position for retaining the rover on the lift platform 310. Fence 501 may be similarly pivotable to allow for loading or removing the rover 110 onto/from the lift platform 310 from, for example a floor (or other "ground" level) of a warehouse. In other aspects the rover 110 may be loaded on the lift platform in any suitable manner such as through a lateral side of the rover.

Referring again to FIG. 4, maintenance access may be provided to the rover lift module 190 in any suitable manner. In one aspect maintenance platforms 450P may be positioned on one more sides of the rover lift module 190. In one aspect the maintenance platforms may form part of the rover lift module 190. The maintenance platforms 450P may be mounted to respective frames 450F1, 450F2 that may be coupled together by one or more coupling members 450M. The frames 450F1, 450F2 have support columns 450 (only some of which are shown in FIG. 4) to which the maintenance platforms 450P are mounted. Closeable fences or other removable barriers 410 may be coupled to the frame adjacent each maintenance platform 450P. A door 450T may also be provided at, for example, ground level which when opened allows a rover 110 to be loaded and unloaded from the lift platform 310 by, for example, pivoting fence 501 to a lowered position so that the rover 110 can traverse over the pivoting fence onto the rover support 510. In other aspects the access may be provided for loading the rover onto the lift platform in any suitable manner.

In one aspect the rover lift platform 310 may include a registration station 130R that has any suitable non-contact reader for identifying which rover 110 is disposed on the lift platform 310. For example, referring to FIG. 5, one or more readers 575, such as radio frequency, inductive, capacitive, magnetic, optical or other suitable non-contact reader or scanner, may be disposed at any suitable location on the lift platform 310 for reading data from the communicator 110T disposed on the rover 110. The communicator 110T may include any suitable optical, radio frequency, inductive, capacitive, magnetic or other non-contact indicia for providing identification information of the rover 110. The identity of the rover 110 may be communicated in any suitable manner by the registration station 130R to a rover accountant (or other suitable tracking/record keeping unit) of, for example, control server 120 for automatic verification and tracking of which rovers 110 are being introduced to or removed from the automated storage and retrieval system 100. The controller 120 may also use the rover location information obtained from the registration station 130R for controlling the rover 110 (e.g. issuing suitable commands to the rover) in any suitable manner. The controller 120 may maintain a log that includes data indicating which storage levels the rovers are inserted and removed from and include control software for recalculating traffic patterns and task allocations for the rovers that remain on a storage level after rovers are introduced or removed from that storage level. In other aspects the registration station 130R may be disposed on the transfer deck 130B and/or staging area 130B1-130Bn (FIG. 3) at, e.g. a respective interface with the rover lift 190.

Figure 6:
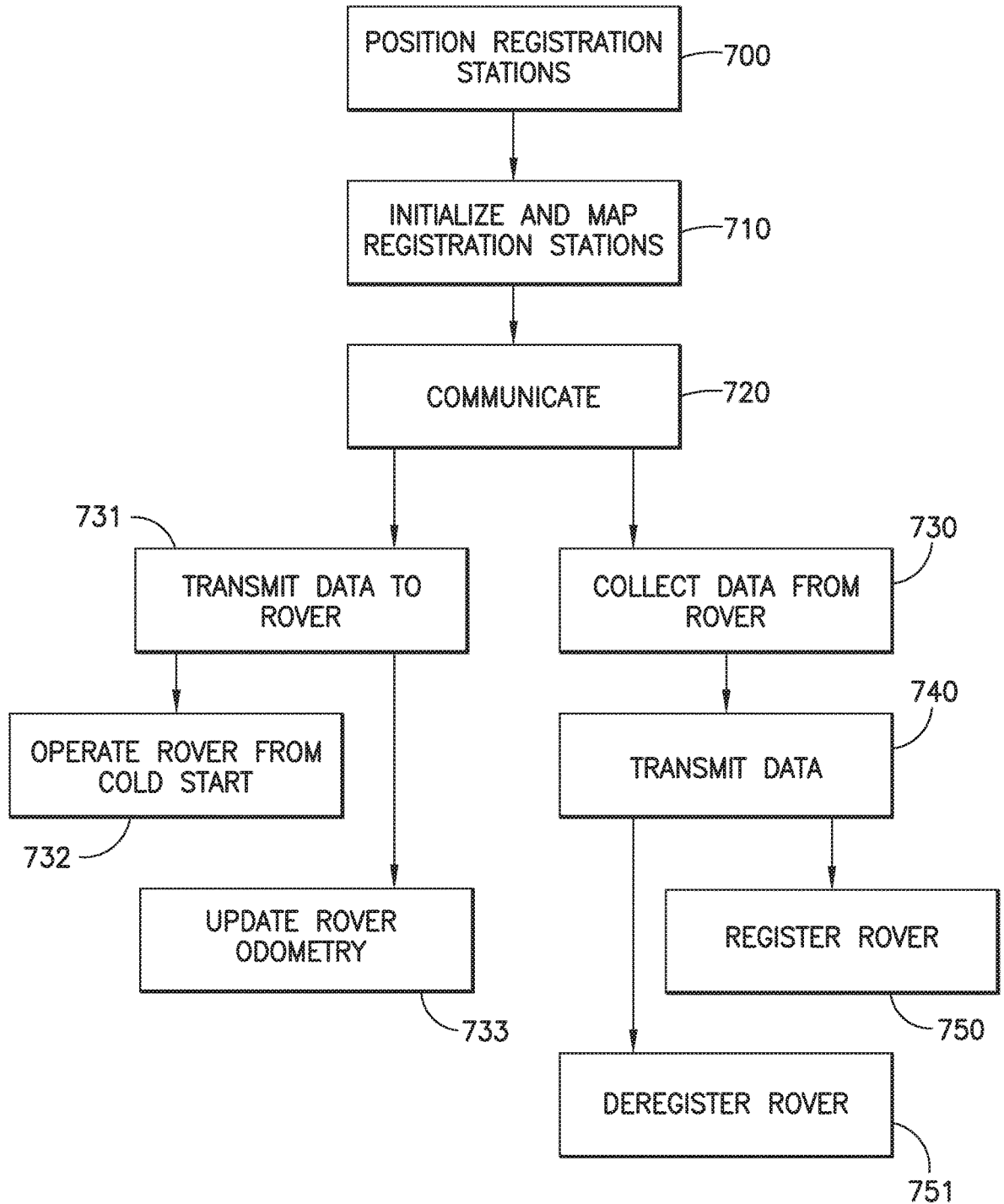
FIG. 6 is a flow diagram in accordance with aspects of the disclosed embodiment.
Figure 7:
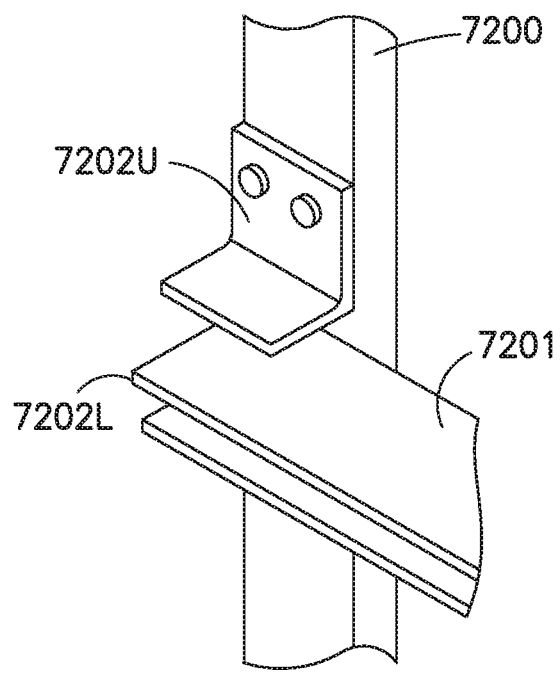
FIGS. 7, 8A and 8B are schematic illustrations of a portion of a storage rack of the automated storage and retrieval system in accordance with aspects of the disclosed embodiment.
Figure 8A:
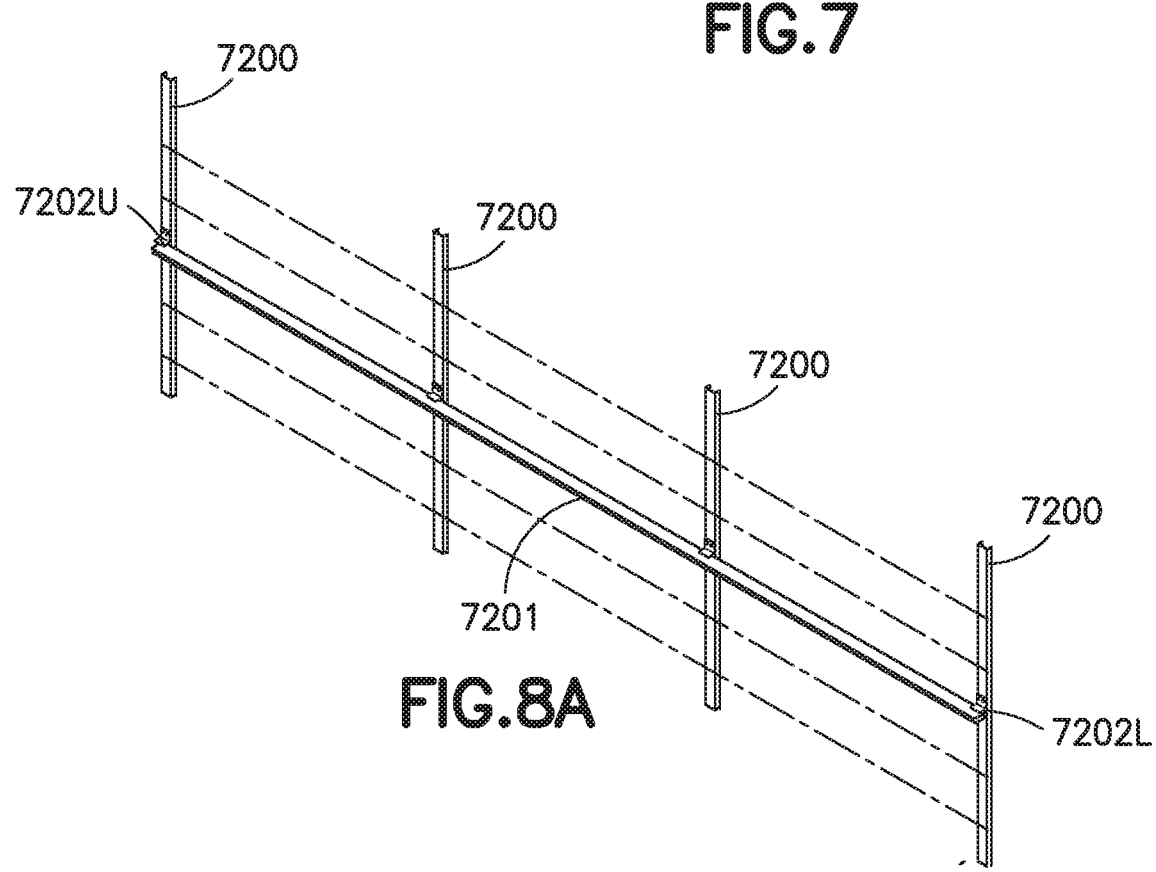
Figure 8B:
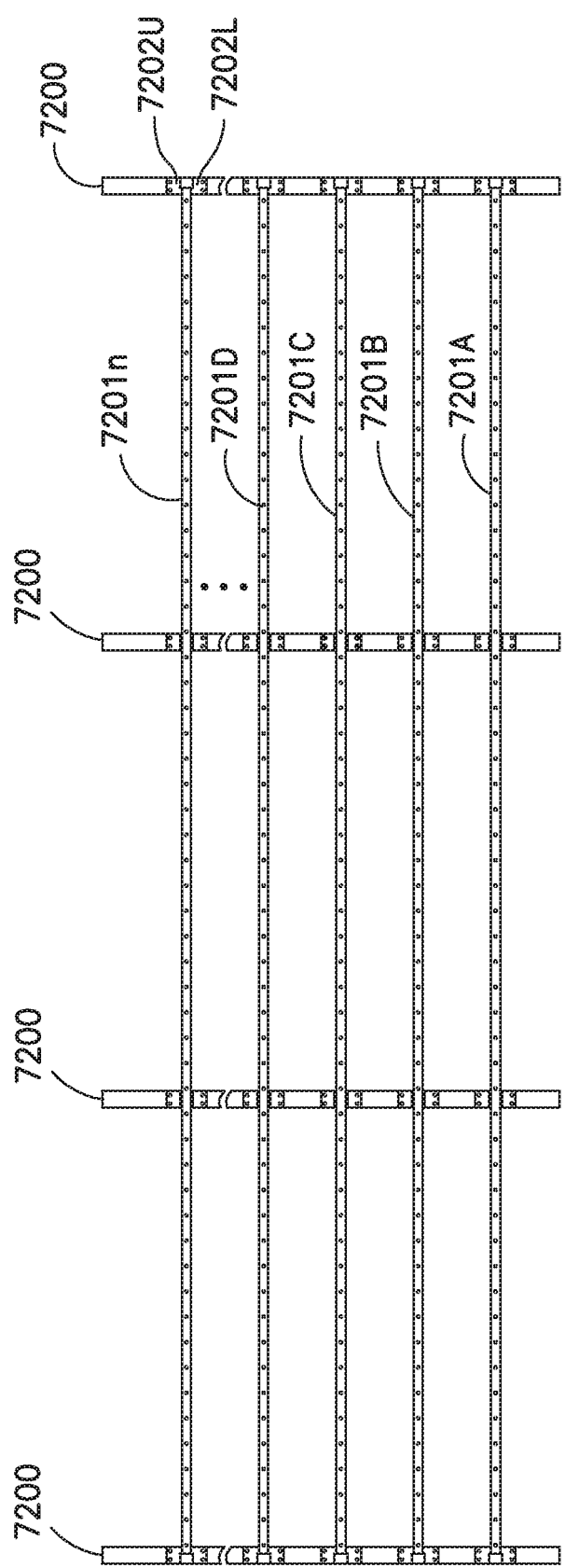
Figure 9A:
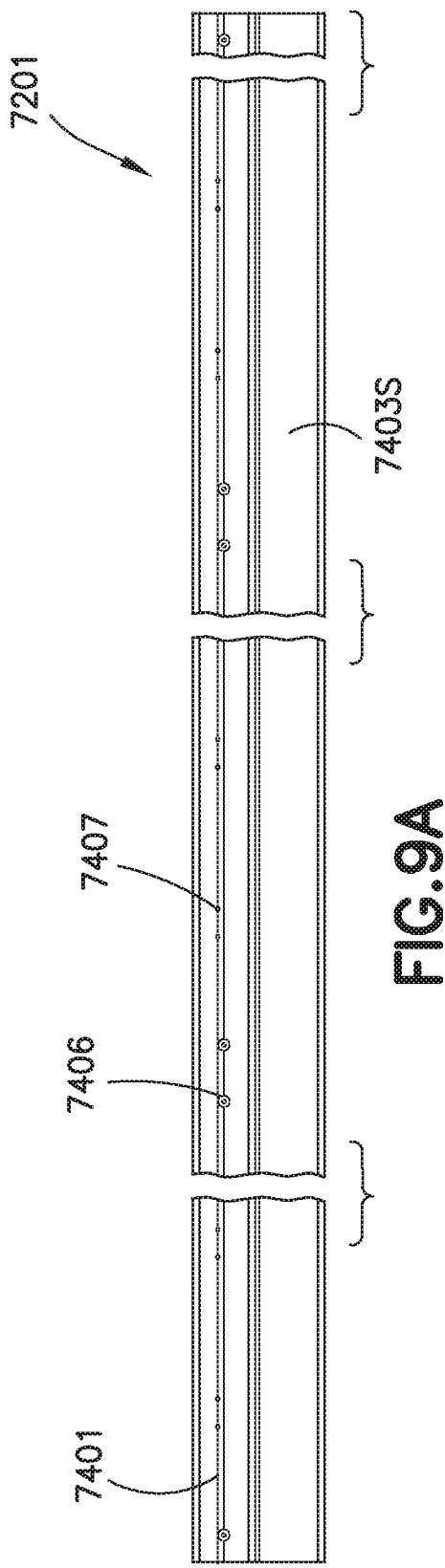

Referring again to FIG. 1, it may be desired that any rover 110 have capability to commence operation substantially anywhere within the storage structure 130. To do so, it is advantageous that a rover start position be determined in a substantially autonomous manner. In one aspect the registration station(s) 130R may be distributed throughout the storage structure 130 to provide a rover 110, which lacks rover prepositioning data, with sufficient positional data so that the rover controller 110C is capable of determining where the rover is within the automated storage and retrieval system 100 (FIG. 6, Block 700). The registration stations 130R may provide a rover 110 location and/or automatic registration system to allow onset, offset and updated registrations of a rover for e.g. rover cold start (where the rover lacks prepositioning data) and bot induction/extraction update at any desired locations throughout structure. The location of each registration station 130R may be mapped within a reference frame (e.g. global three dimensional reference space, in other aspects the global reference space may have any suitable number of dimensions) of storage structure 130. It is noted that when the rovers 110 and the registration stations interface the location of the registration station the rover is interfacing with is sent to both the rover 110 and the controller 120 to enable one or more of the autonomous rover control and control of the rover by the controller 120.

The storage structure 130, transfer decks 130B, and picking aisles 130A may be arranged with any suitable rover entry/exit features, such as the rover lift modules 190 or any other structural features (e.g. ports, openings, platforms) for facilitating physical induction and extraction of bots on each storage level 130L. In one aspect the registration stations 130R may be positioned at and associated with specific entry/exit stations, in a manner substantially similar to that described above with respect to the rover lift modules 190. The registration stations 130R may be initialized and mapped to the storage three dimensional reference space with any suitable controller, such as control server 120 (FIG. 6, Block 710). Each registration station 130R may interface with or otherwise communicate with a rover(s) 110 (which may lack bot prepositioning data) (FIG. 6, Block 720) that is within a predetermined proximity and/or orientation to the registration station 130R. In one aspect the rover 110 may communicate with the registration station 130R to provide the rover 110 with location data where the rover lacks prepositioning data (FIG. 6, Block 731) so that the rover 110 may perform storage and retrieval operations (FIG. 6, Block 732). As noted above, the registration stations 130R may also be used at rover induction and extraction points, such as the rover lift module 190, to tell the rover 110 which location the rover 110 is being inserted into or taken from. In another aspect, the registration station 130R may collect data from the rover 110 (FIG. 6, Block 730) and transmit that data to the controller 120 (FIG. 6, Block 740) where the data may be sufficient for autonomous rover registration (FIG. 6, Block 750) with the controller 120 (i.e. the data may provide a unique rover identification and a location of the rover in the global three dimensional reference space of the automated storage and retrieval system 100). This allows the controller 120 to effect rover induction into, for example, the modular rover space 200A-200n (FIG. 2A) which may be related to the global three dimensional reference space. Conversely rover 110 extraction may be performed so that a rover is deregistered (FIG. 6, Block 751) from the automated storage and retrieval system, in a manner substantially similar to that described above, when the rover exits the storage structure 130. The rover registration and deregistration may automatically update the system software with the induction or extraction information (e.g. which rover 110 is being inserted or removed and on what storage level 130L), as well as automatically check other configuration settings of the automated storage and retrieval system 100.

It is noted that registration stations 130R may be provided at any suitable locations within the storage structure 130 such as, for example, vertical lift 150 stations, interfaces between the picking aisles 130A and transfer decks 130B, and at suitable intervals along transfer decks 130B and/or picking aisles 130A. In one aspect, the registration stations 130R may also serve as odometry updates (e.g. the rover has preposition data) where the registration station 130R provides positioning data to a rover 110 to update or otherwise correct a location of the rover 110 within the storage structure 130 (FIG. 6, Block 733). In aspect, the registration stations 130R may be placed throughout the storage structure 130 to provide continuous updates of rover position. The communicator 110T of the rover may also be configured to obtain data from the registration stations 130R in any suitable manner. The registration stations 130R can be used by the rover 110 to determine where the rover 110 is during normal operation if the rover 110 ever needs to reset itself.

Referring now to FIGS. 1, 7, 8A and 8B, as noted above, the storage structure 130 may include a multilevel storage structure including an array of stacked storage locations. Each array may include vertical support members 7200 to which rover travel rails 7201A-7201n (generally referred to as rover rails 7201) are fixed. The rover rails 7201 may define storage levels and transport levels. The rover rails 7201 may form a riding surface for the rover 110 to travel along through, for example, the picking aisles 130A (FIG. 1) or any other suitable location of the automated storage and retrieval system. The rover rails 7201 may support the rover 110 within, e.g., the picking aisles 130A during payload transfer between the rover 110 and the storage locations. Accordingly, the rover rails 7201 may be subject to static and cyclic loads from rover 110 activity including the rover traversing the picking aisles 130A to and from rack storage locations, transferring payloads to and from storage locations (which may include pickface building at the shelf). Cyclic loading on the rover rails 7201 may create fatigue conditions that may be amplified by dynamic storage distribution (as described in, e.g., U.S. patent application Ser. No. 12/757,337 filed on Apr. 9, 2010 the disclosure or which is incorporated herein by reference in its entirety) along the aisles. As such, the rover rails 7201 may include or otherwise incorporate fatigue resistant features corresponding to any suitable predetermined lifetime loading of the rover rails 7201. The fatigue resistant features may be configured so that a stress at or surrounding the fatigue resistant features is below a predetermined value.

The rover travel rails 7201 may be fixed to the vertical support members 7200 in any suitable manner. In one aspect the rover rails 7201 may be fixed to the vertical support members using any suitable upper mounting bracket 7202U and any suitable lower mounting bracket 7202L. In another aspect, the rover rails 7201 may be fixed to the vertical support members 7200 with an adjustable mounting bracket in a manner similar to that described below with respect to FIG. 11. Here the mounting brackets 7202U, 7202L each have an angle iron shape (e.g. an "L" shape) but in other aspects the mounting brackets 7202U, 7202L may have any suitable shape and be constructed of any suitable material. The mounting brackets 7202U, 7202L may be fixed to the vertical support members 7200 using any suitable fasteners including but not limited to rivets, bolts, clips, screws, snaps, welding or any other suitable mechanical and/or chemical fasteners or adhesives. The rover rails 7201 may be fixed to the mounting brackets 7202U, 7202L in any suitable manner such as in a manner substantially similar to that described above between the mounting brackets 7202U, 7202L and the vertical support members 7200.

Referring now to FIGS. 1 and 9A-9D each of the rover rails 7201 may be, for example, one piece members of unitary construction formed by any suitable manufacturing process such as cold rolling. The rover rails may be disposed on opposite lateral sides of a picking aisle 130A and extend longitudinally along a length of the picking aisle 130A for allowing the rover 110 to travel along the length of the picking aisle 130A. The rover rails 7201 may have any suitable length such that in one aspect, the rover rails 7201 have a length substantially equal to a length of a respective picking aisle 130A, while in other aspects the rover rails 7201 are placed end to end for spanning a length of the respective picking aisle 130A. The rover rails 7201 may include a fatigue resistant vertical profile portion 7400. The vertical profile portion 7400 may have any suitable shape such as, for example, a closed box section with one or more axis of symmetry that provides static and dynamic stability. The vertical profile portion 7400 may define or otherwise include flanges 7401, 7402 for, e.g., fastener engagement to the vertical support members 7200 and/or the storage shelves 130SH (FIG. 1). The flanges 7401, 7402 may be referred to as upper and lower flanges respectively. The upper and lower flanges 7401, 7402 may include fatigue resistant apertures 7406 through which suitable fasteners, such as those described above, are inserted for fixing the respective mounting brackets 7202U, 7202L to the rover rail 7201 in any suitable manner. The upper flange 401 may also include fatigue resistant apertures 7407 through which suitable fasteners, such as those described above, are inserted for fixing the storage shelves 130SH to the rover rail 7201 in any suitable manner.

The one piece rover rail 7201 may also define a fatigue resistant flange 7403 that extends from a face 7404 of the vertical profile portion 7400 and provides a travel/riding and support surface 7403S for, e.g., wheels of the rover 110 during rover operation. The flange 7403 may have any suitable width W for allowing, e.g., wheels of the rover to travel along the flange 7403. The face 7404 may also include integral rover position determination features 7405. The integral rover position determination features 7405 may have any suitable shape and size such that the rover position determination features 7405 are fatigue resistant. In one aspect the integral rover position determination features 7405 may be apertures or protrusions formed in the face 7404 having a shape and size for minimizing stress concentrations in the face 7404. The integral rover position determination features 7405 are illustrated as having a general rectangular shape but in other aspects the integral rover position determination features 7405 may have any suitable shape. In one aspect the rover 110 may include any suitable sensors for detecting the rover position determination features 7405 and determine its position along the picking aisle 130A based on at least the rover position determination features 7405. In other aspects the position of the rover 110 within the picking aisle may be determined in any suitable manner. One example of determining the position of the rover can be found in U.S. patent application Ser. No. 13/327,035 entitled "Bot Position Sensing" and filed on Dec. 15, 2011, the disclosure of which is incorporated herein by reference in its entirety.

Figure 10:
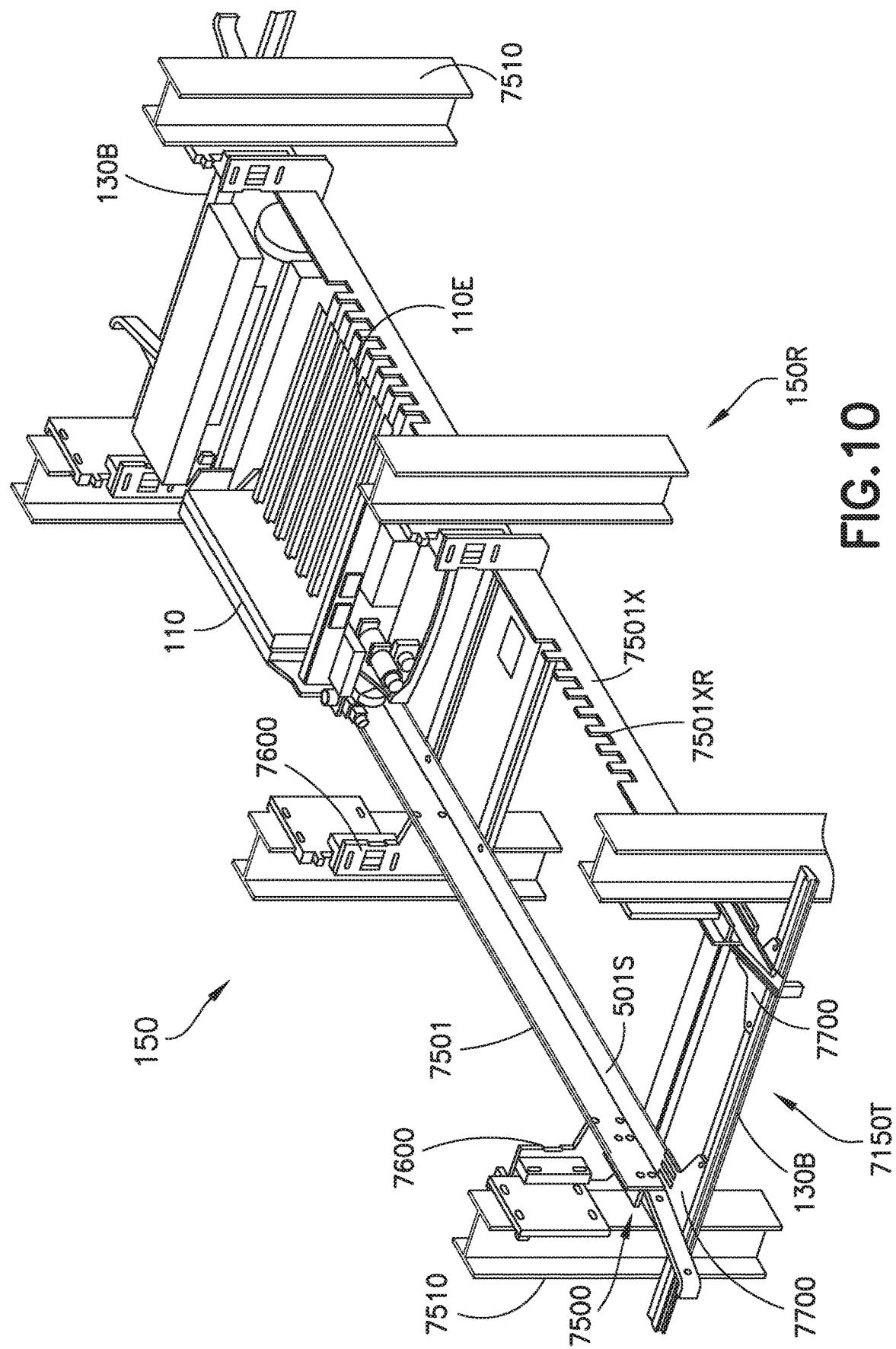
FIG. 10 is a schematic illustration of a portion of the automated storage and retrieval system in accordance with aspects of the disclosed embodiment.

Referring now to FIG. 10 one or more structural components of the automated storage and retrieval system 100 (such as the transfer deck 130B, picking aisles 130A, lift modules 150, etc.) may have transport sections, upon which the rover 110 travels, with different flexure, static and dynamic properties such that one or more of the structural components reacts differently to, e.g., a seismic event or other event (generally referred to as a seismic event) that may cause movement of items within their respective storage locations. A compliant interface 7500 between the structural components may allow for relative movement of the structural components during the seismic event. The compliant interface 7500 may be self-aligning following the seismic event and provide a riding surface over which the rover 110 can transition between the transport sections of the different structural components. It is noted that the compliant interface 7500 will be described with respect to a transition between the lift module 150 and transfer deck 130B but it should be understood that the interface described herein may be placed at a transition between any two structural components of the automated storage and retrieval system. For example, the compliant interface 7500 may provide a transition between one or more of a picking aisle 130A and the transfer deck 130B, between a picking aisle 130A and a lift module 150 (e.g. where the picking aisle provides substantially direct access to the lift module), and/or between any other suitable structures of the automated storage and retrieval system 100.

In one aspect the lift modules 150 (a portion of which is shown in FIG. 10) may be modular. For example, each lift module 150 may include a vertical lift portion (not shown) and a rover interface portion 150R which can be mated to, for example, the transfer deck 130B in any suitable manner. In one aspect each lift module 150 may include vertical supports 7510. The vertical lift portion (not shown) may be coupled to the vertical supports 7510 in any suitable manner. Rover rails 7501, 7501X may also be fixed to the vertical supports 7510 at vertical intervals corresponding to each storage level of the automated storage and retrieval system 100. Each of the rover rails 7501, 7501X may be substantially similar to rover rails 7201 described above and include rover travel/riding and support surface 7501S, however one or more of rover rails 7501, 7501X may include recessed or cut out portions 7501XR that provide clearance for an end effector 110E of the rover 110 to extend for interfacing with a transfer shelf of the vertical lift portion for transporting items between storage levels or into/out of the storage structure 130. The rover rails 7501, 7501X may be disposed on opposite lateral sides of a lift travel aisle 7150T and extend longitudinally along a length of the lift travel aisle 7150T.

Figure 11:
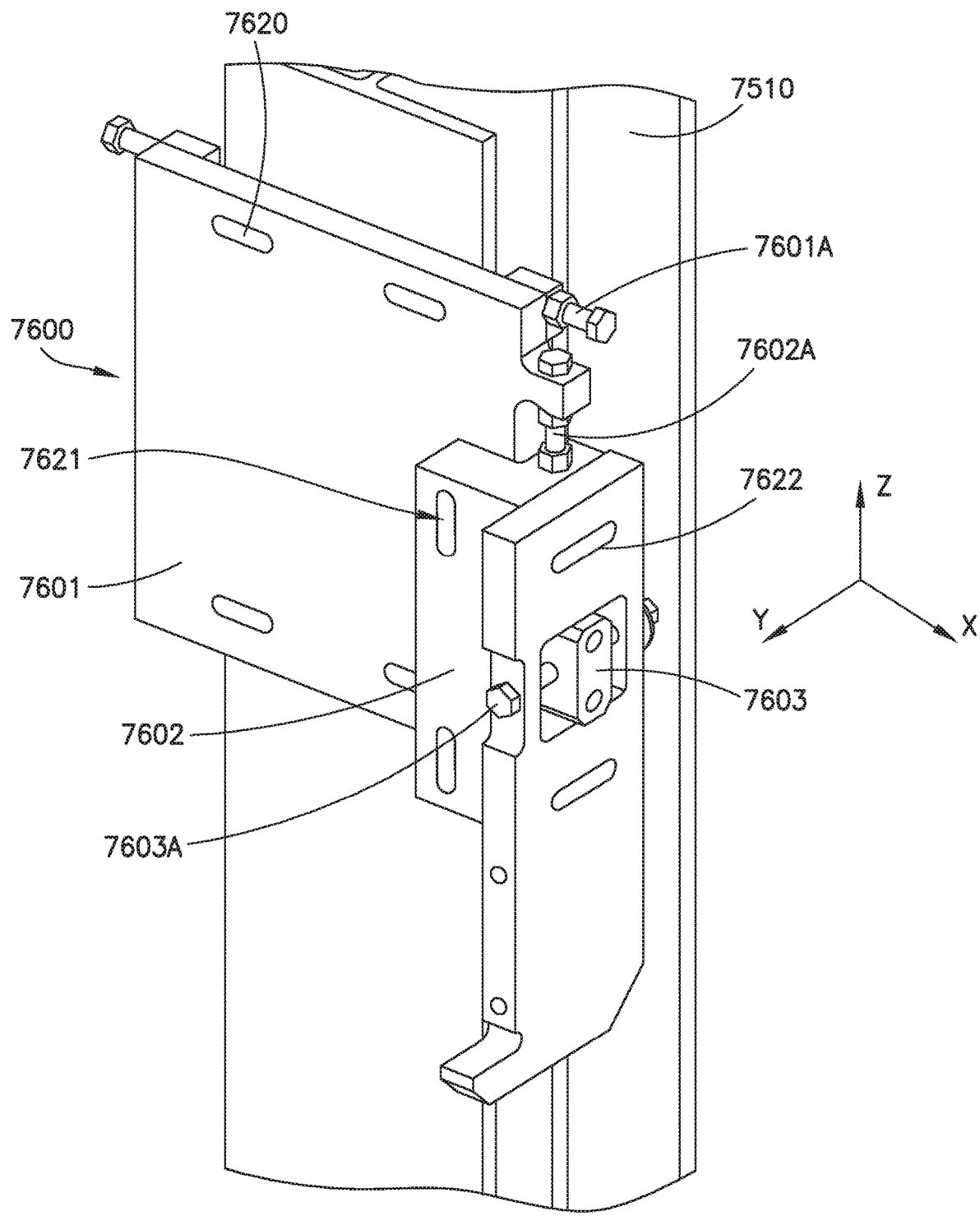
FIG. 11 is a schematic illustration of a rover travel rail mounting bracket in accordance with aspects of the disclosed embodiment.
Figure 12:
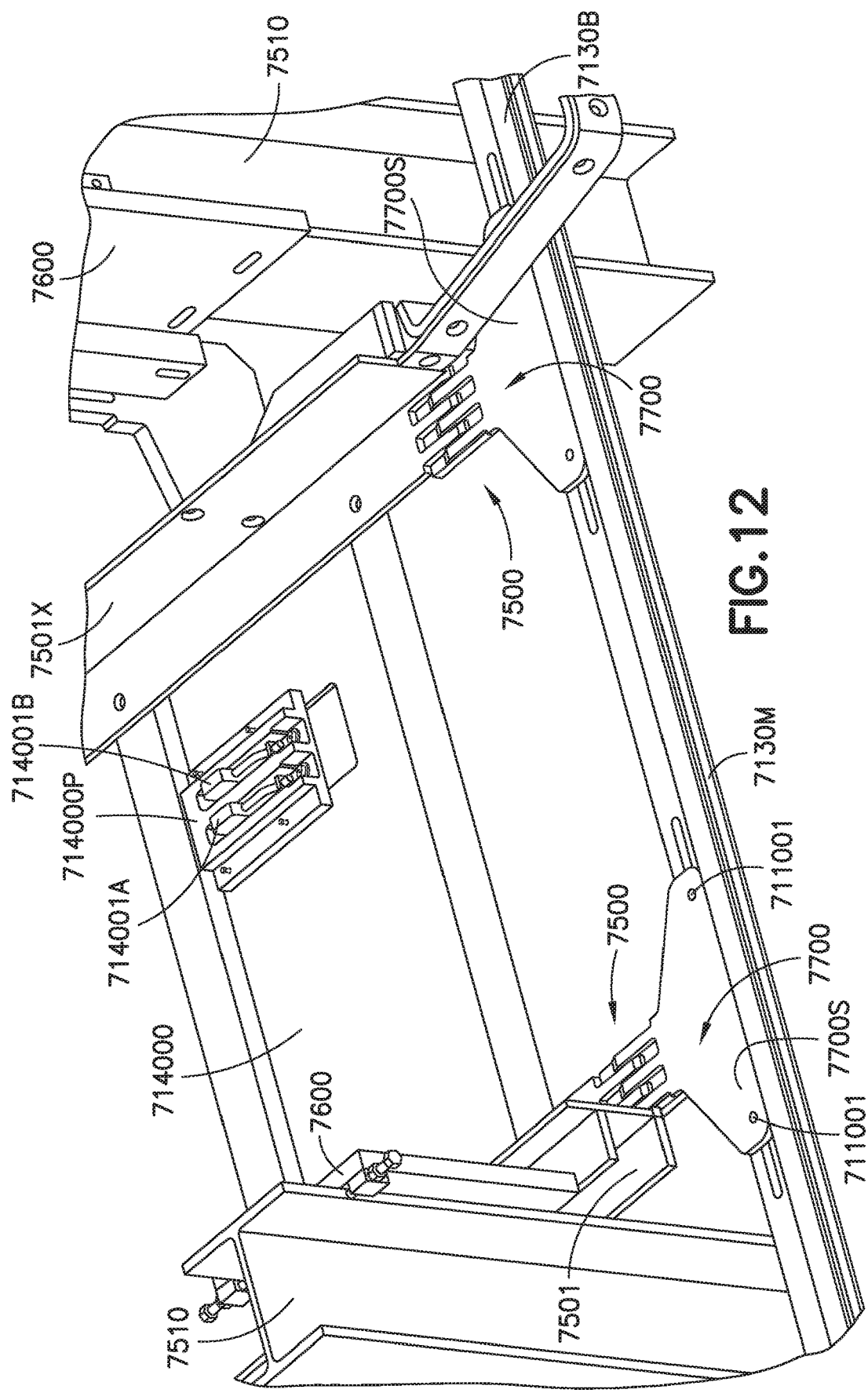
FIGS. 12, 13 and 14 are schematic illustrations of a portion of the automated storage and retrieval system in accordance with aspects of the disclosed embodiment.
Figure 13:
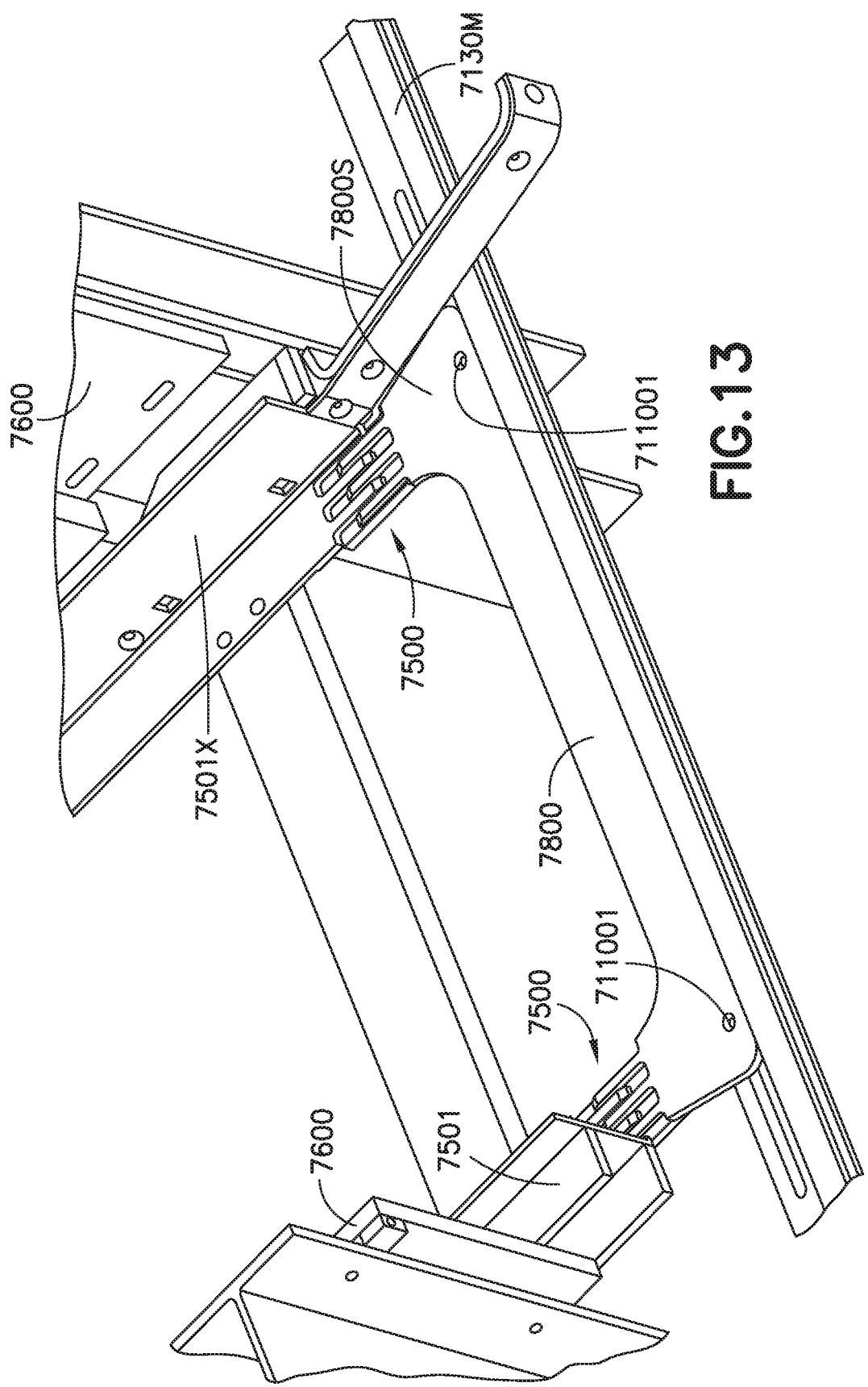
Figure 14:
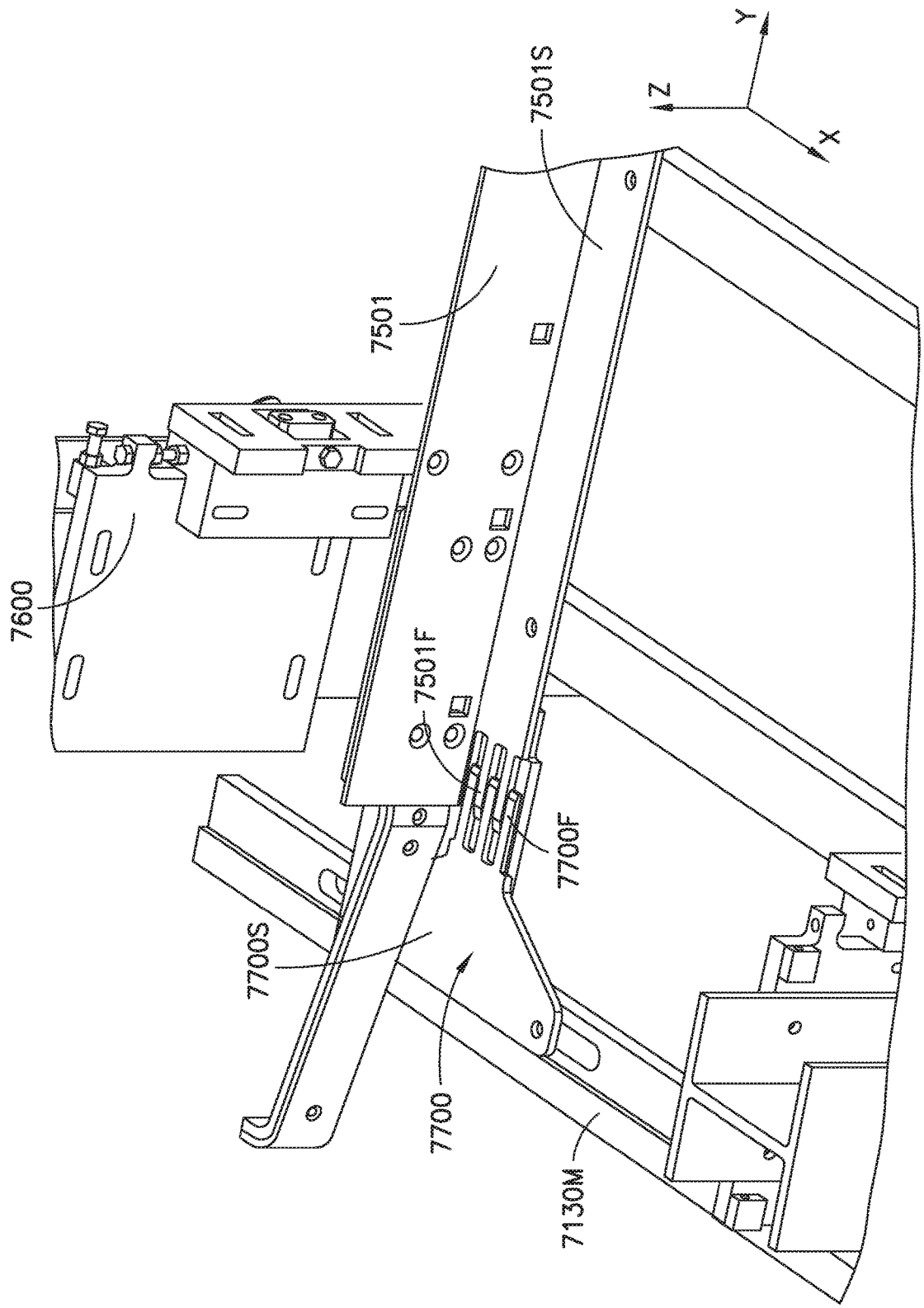

Also referring to FIG. 11 the rover rails 7501, 7501X may be substantially rigidly fixed to the vertical supports 7510 in any suitable manner. In one aspect the rover rails 7501, 7501X may be adjustably fixed to the vertical supports 7510 through adjustable mounting members 7600. The mounting member 7600 may allow three degree of freedom adjustment of each respective rover rail 7501, 7501X. In other aspects the mounting members 7600 may provide adjustment of the respective rover rail along any suitable number of linear and/or rotational axes. The mounting member 7600 may allow for alignment of the respective rover rail 7501, 7501X with the transfer deck 130B and/or other platforms on which the rover travels. Each direction of adjustment of the mounting member 7600 may have a locking mechanism for fixing the respective direction and rigidly securing the rover rail 7501, 7501X to, for example, the vertical supports 7510.

In one aspect each mounting member 7600 includes a first support plate 7601 that interfaces with, for example, vertical support 7510 in any suitable manner for securing the first support plate 7601 to the vertical support member 7510. The first support plate 7601 may include elongate mounting apertures 7620 through which fasteners may be inserted for securing the first support plate 7601 to the vertical support 7510. The first support plate 7601 may be movable relative to, for example, the vertical support 7510 or other suitable feature of the automated storage and retrieval system 100, in the X direction. Locking members 7601A may releasably engage the vertical support 7510 for substantially preventing movement of the first support plate 7601 in the X direction. A second support plate 7602 may also include elongate mounting apertures 7621 and be movably mounted to the first support plate 7601 in any suitable manner so that the second support plate 7602 is movable relative to the first support plate 7601 (or other suitable feature of the automated storage and retrieval system 100) in the Z direction. Locking members 7602A may releasably engage the first support plate 7601 for substantially preventing movement of the second support plate 7601 in the Z direction. A third support plate 7603 may also include elongate mounting apertures 7622 and be movably mounted to the second support plate 7602 in any suitable manner so that the third support plate 7603 is movable relative to the second support plate 7602 (or other suitable feature of the automated storage and retrieval system 100) in the Y direction. Locking members 7603A may releasably engage the second support plate 7602 for substantially preventing movement of the third support plate 7603 in the Y direction. It is noted that the X, Y and Z axes are used for explanatory purposes only and that each of the first, second and third support plates 7601, 7602, 7603 may be movable along any suitable respective axis in any suitable reference frame.

Referring now to FIGS. 1 and 12-15, the rover travel/riding surfaces of the automated storage and retrieval system (e.g. such as surfaces 7501S, 7403S of the rover rails 7201 and the surface of the transfer deck 130B) may be isolated from one another with one or more intermediate or compliant isolation plates 7700 that are robust and long lasting. These isolation plates 7700 are also shown in FIG. 10 between each lift module 150 rail 7501, 7501X and the transfer deck 130B (only a portion of which is shown in the Figs.) for isolating the rails 7501, 7501X from the transfer deck 130B. The isolation plates may also provide the complaint interface 7500, which is formed of a jointed or articulated connection that is released to provide at least one degree of freedom of movement between, e.g., the transfer deck 130B and lift module 150 rails 7501, 7501X as will be described below. The compliant interface 7500 may substantially prevent chafing between automated storage and retrieval system structural elements. While the isolation plates 7700 are shown as being located at the interface between the rails 7501, 7501X and the transfer deck 130B it should be understood, however, that these isolation plates 7700 may be located at any structural joint between any two adjacent rover transport surfaces. The joint elements (which will be described below) of the compliant interface 500 form a substantially continuous and smooth surface upon which the rover 110 travels between the different portions of the automated storage and retrieval system 100.

Figure 15:
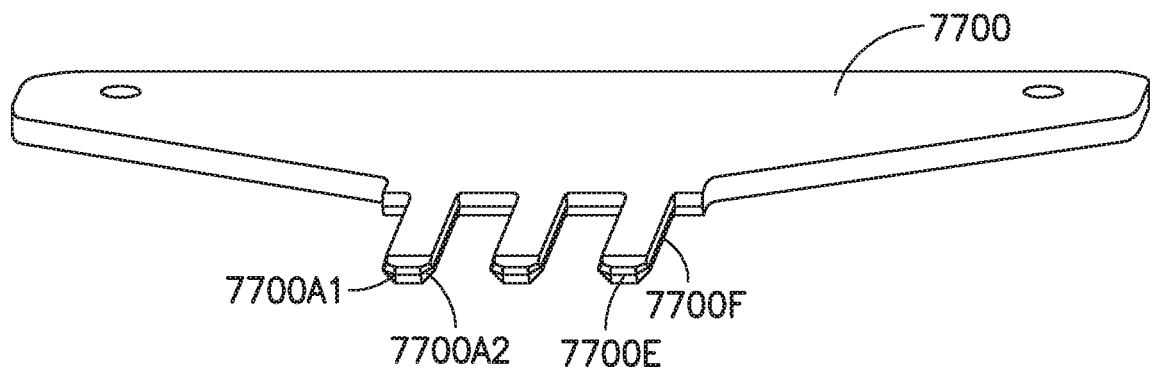

As can be seen in FIGS. 12-15 in one aspect the isolation plates 7700 may include more than one isolation plate 7700 such that each interface 7500 at, e.g. the rails rail 7501, 7501X has a respective isolation plate 7700. In other aspects the isolation plates may be a single, one piece plate 7800 such that each interface 7500 at the rails 7501, 7501X has a common isolation plate 7800. The isolation plates 7700, 7800 may be constructed of any suitable material and have any suitable configuration. In one aspect the isolation plates 7700, 7800 and the rails 7501, 7501X may each include fingers 7700F, 7501F that interleave with each other or other suitable structure, such as flexible membranes and/or slip plates, that allow for movement between the plates 7700, 7800 and rails 7501, 7501X and are configured to provide or otherwise include a riding surface for a rover 110 passing over the compliant joint 7500. In one aspect as can be seen in FIG. 15 the fingers of the isolation plates 7700, 7800 may include tapered sides 7700A1, 7700A2 and/or a tapered end 7700E or any other suitable alignment features to assist in the recovery of the compliant joint 7500 after a seismic event or other movement of the automated storage and retrieval system structure. As may be realized the fingers 7501F of the rails 7501, 7501X may be tapered in a complimentary manner to that of the fingers 7700F to also assist in the recovery of the compliant joint 7500 after a seismic event or other movement of the automated storage and retrieval system structure.

Figure 16A:
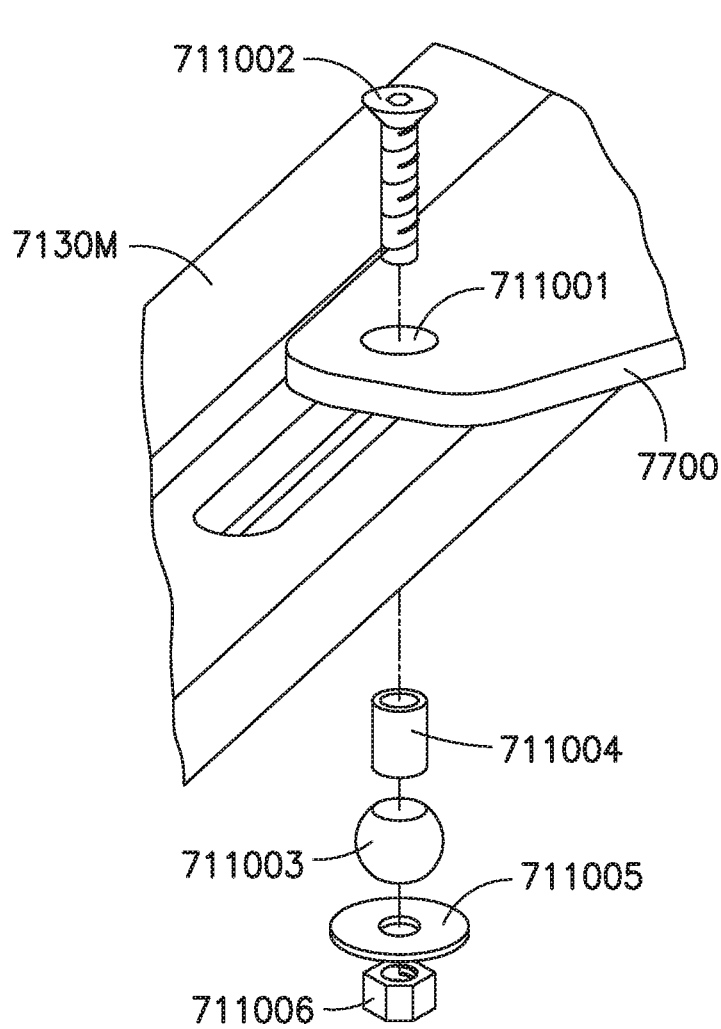
Figure 16B:
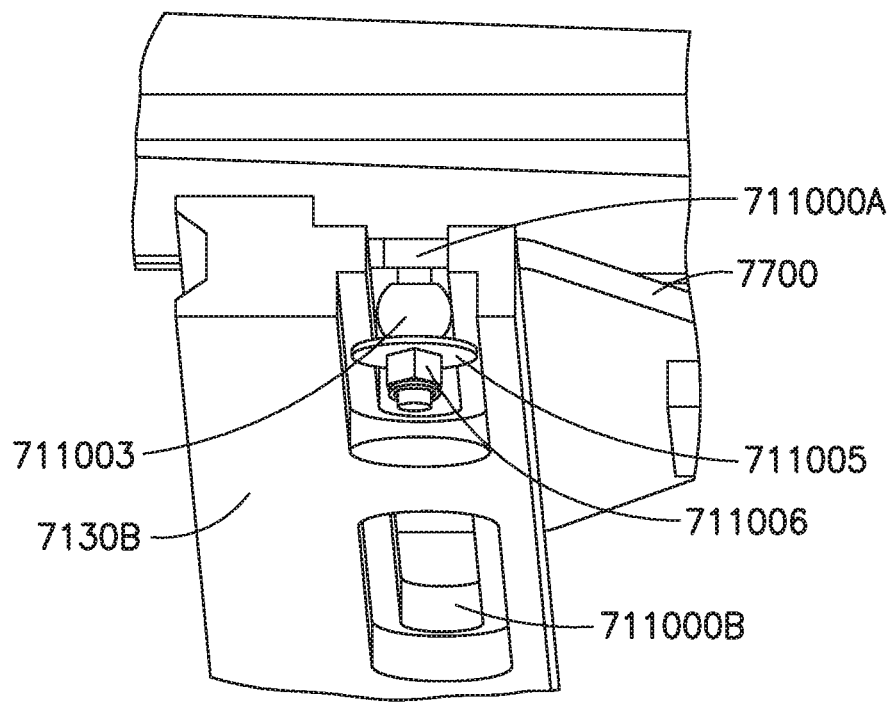
Figure 16C:
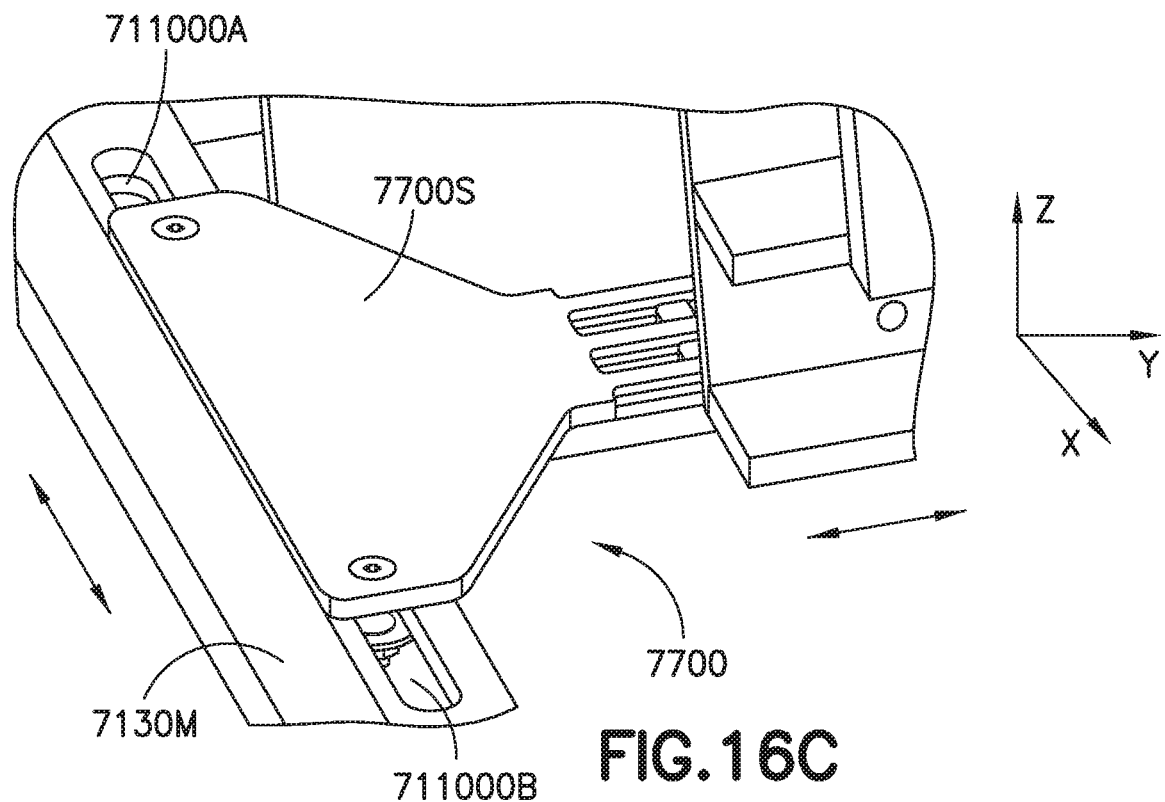

Referring also to FIGS. 16A-16C, the isolation plates 7700, 7800 may be substantially stiff members that are coupled to the transport deck 130B (or other suitable member within the automated storage and retrieval system such as any rover transport surface or isolation plate support members or bars 7130M) to allow for at least one degree of freedom of movement between the transport deck 130B and, for example, rover rails 7501, 7501X (or other rover transport/riding surface). In one aspect the isolation plates 7700, 7800 may be mounted to provide three or more degrees of freedom of movement (e.g. X, Y, Z and/or rotation about one or more of the X, Y and X axes). The isolation plates 7700, 7800 may be mounted in any suitable manner that allows compliant movement of the isolation plate 7700, 7800. In one aspect a ball type joint (as will be described below) or any other suitable articulated joint may be used to mount the isolation plate 7700, 7800 to any suitable support surface. For example, the transfer deck 130B (or any other suitable structural element of the automated storage and retrieval system) may include a slot or other aperture, as will be described below, in which a ball is disposed and the isolation plate may be mounted to the ball (e.g. so a ball and socket joint is formed).

The isolation plates 7700 (isolation plate 7800 may be mounted and function in a manner substantially similar to that described herein for isolation plates 7700) may be mounted to, for example, any suitable portion of the transfer deck 130B such as support member 7130M in any suitable manner. In one aspect the isolation plate 7700 may be mounted to the support member 7130M with a ball joint or otherwise articulated connection that allows pivotal movement of the isolation plate as will be described in greater detail below. Each isolation plate 7700 may include apertures 711001 through which any suitable fasteners 711002 are inserted. The support member 7130M may include elongated apertures 711000A, 711000B through which the fasteners 711002 pass such that the isolation plate is disposed on a first or upper side of the support member 7130M. A ball member 711003 may be placed over the fastener from a second or bottom side of the support member 130M so that the ball member 711003 is located within a respective aperture 711000A, 711000B. The ball member 711003 may have any suitable diameter that allows pivoting movement within and linear movement of the ball member 711003 along a length of the aperture 711000A, 711000B. A bushing or spacer member 711004 may be inserted within the ball member 711003 to substantially prevent contact between the fastener 711002 and the ball member 711003 and to substantially prevent deformation of the ball when a retaining member 711006 is affixed to the fastener for retaining the ball member 711003 within the aperture 711000A, 711000B. In one aspect the fastener 711002 is a screw and the retaining member 711006 is a nut but in other aspects any suitable elongated member and retaining members may be used such as, for example rods and clips, snaps and/or pins. A washer or other substantially flat or obstructive member 711005 may be placed between the retaining member 711006 and the ball member 711003. The obstructive member 711005 may have a diameter or may otherwise be larger than a width of the aperture 711000A, 711000B so as to substantially prevent the ball member 711003 and retaining member 711006 from passing through the aperture 711000A, 711000B such that the isolation plate 7700 is restrained from being lifted from the support member 7130M. In other aspects the retaining member 711006 may be configured to both retain the ball member 711003 on the fastener 711002 and substantially prevent the lifting of the isolation plate 7700 from the support member 7130M. As can be seen in FIG. 16B the aperture 711000A, 711000B may include a recess on the second side of the support member 7130M into which the retaining member 711006 and obstructive member 711005 are disposed. In other aspects the aperture 711000A, 711000B may not include a recess.

Figure 17A:
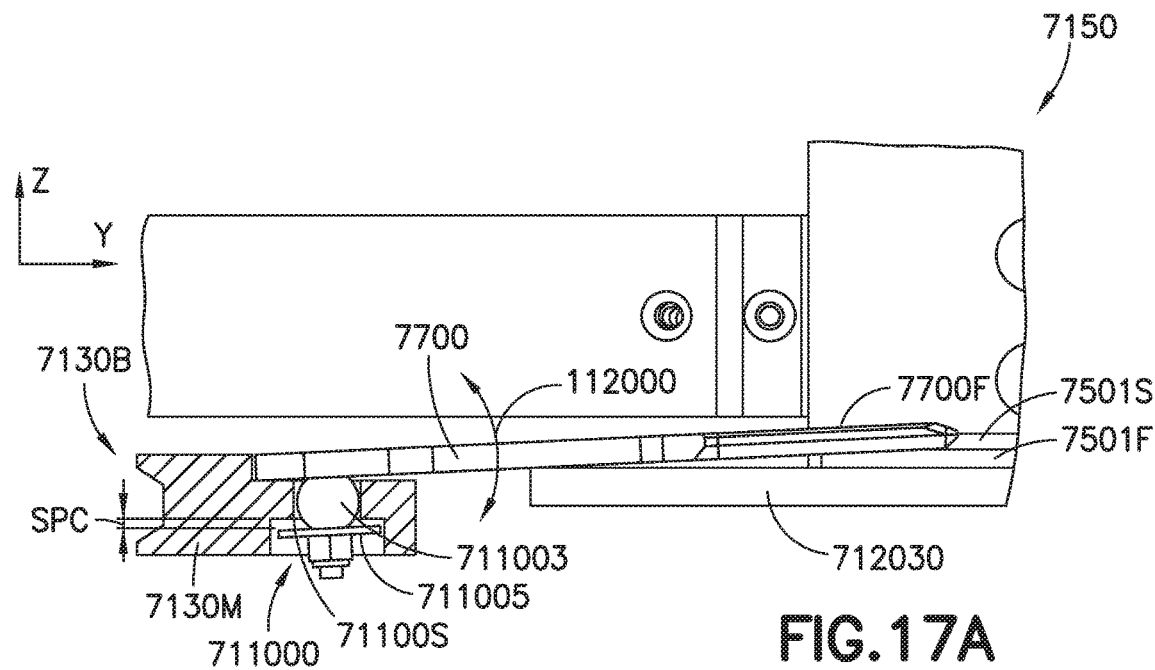
Figure 17B:
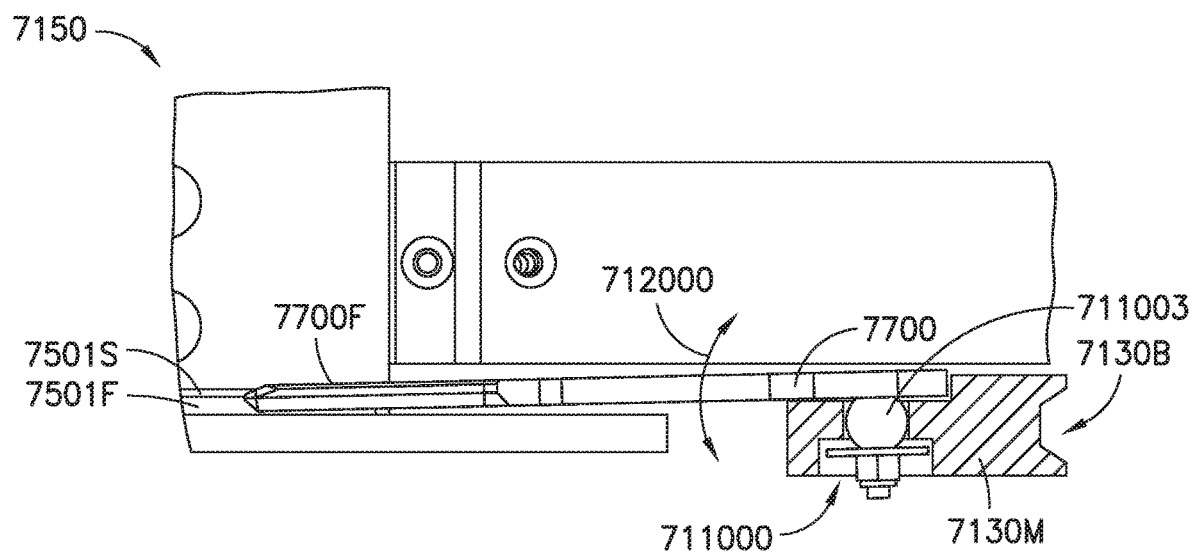

Referring now to FIGS. 16C, 17A and 17B the interleaved fingers 7700F, 7501F (FIG. 14) may substantially prevent movement of the isolation plate 7700 in, for example, the X direction while allowing relative movement of the isolation plate 7700 and the rails 7501, 7501X in the Y direction. The elongated apertures 711000A, 711000B, however, may allow movement of the isolation plate 7700 relative to, for example, the support member 7130M and transfer deck 130B in the X direction but may not allow relative movement between the isolation plate 7700 and the transfer deck 130B/support member 7130M in the Y direction. For example, the ball member, as noted above, may move along the length of the slot allowing the isolation member to move relative to the support member 7130M and transfer deck 130B. In other aspects the isolation plate 7700 may be mounted such that linear movement within the slot is fixed (e.g. the isolation plate substantially does not move along a length of the slot). As such, the combination of the interleaved fingers 7700F, 7501F and the elongated apertures 711000A, 711000B/ball joint provide relative movement between the transfer deck 130B and the rails 7501, 7501X in at least both the X and Y directions.

Further degrees of freedom of movement are provided by the ball joint such that the isolation member 7700 is allowed to pivot about the ball member 711003 within the elongated aperture 711000A, 711000B (generally referred to as elongated apertures 711000). Referring to FIGS. 17A and 17B relative movement between, for example, the transfer deck 130B and the lift module 150 rover transport/riding surfaces in the Z direction may cause pivoting movement of the isolation member 7700 about the ball joint in the direction of arrow 712000. For example, as noted above, the ball member 711003 may allow the isolation member 7700 to pivot relative to the support member 7130M (and the transfer deck 130B). As the transfer deck 130B and the lift module 150 rover transport/riding surfaces move relative to one another in the Z direction so that the riding surface 7501S of the rover rails 7501, 7501X (FIG. 10) is located above the transfer deck riding surface, the isolation plate 7700 contacts the fingers 7501F causing the isolation member fingers 7700F (and the isolation plate as a whole) to pivot upwards as shown in FIG. 17A. As the transfer deck 130B and the lift module 150 rover transport/riding surfaces move relative to one another in the Z direction so that the riding surface 7501S of the rover rails 7501, 7501X (FIG. 10) is located below the transfer deck riding surface, e.g., the cantilevered weight of the isolation plate 7700 causes the isolation plate to pivot downwards as shown in FIG. 17B. It is noted that the ball joint between the isolation member 7700 and the support member 7130M may also allow for substantially pure Z axis motion where a space SPC is provided between the obstructive member 711005 and a surface 711000S of the elongated aperture 711000. It is noted that a support member 712030 may be fixed to the rails 7501, 7501X below the fingers 7501F to at least substantially prevent flexure (e.g. in combination with the interleaved fingers) of one or more of the fingers 7501F and isolation plate 7700 as the rover 110 travels over the rover riding surface formed by the compliant interface. In other aspects the rails 7501, 7501X may not include the support member 712030.

Referring to FIG. 18 one or more lead-ins or guides 713000A, 713000B may be fixed to the lift module 150 rails 7501, 7501X at a proximate end of the guides 713000A, 713000B in any suitable manner for guiding the rover 110 into the lift module 150. The guides 713000A, 713000B may form a funnel like passage, the width of which is narrower at the rails 7501, 7501X than at the mouth of the passage (e.g. at the distal ends of the guides 713000A, 713000B). In one aspect each of the guides 713000A, 713000B may have a single, one piece or unitary construction while in other aspects each guide may be constructed of multiple pieces that are fixed to one another in any suitable manner such as welding or through mechanical or chemical fasteners. The guides may be positioned above the rover transport/riding surface of the transfer deck 130B so that the guides 713000A, 713000B are able to move with the lift module rails 7501, 7501X relative to the transfer deck 130B substantially free from contact with the transfer deck 130B.

Figure 19C:
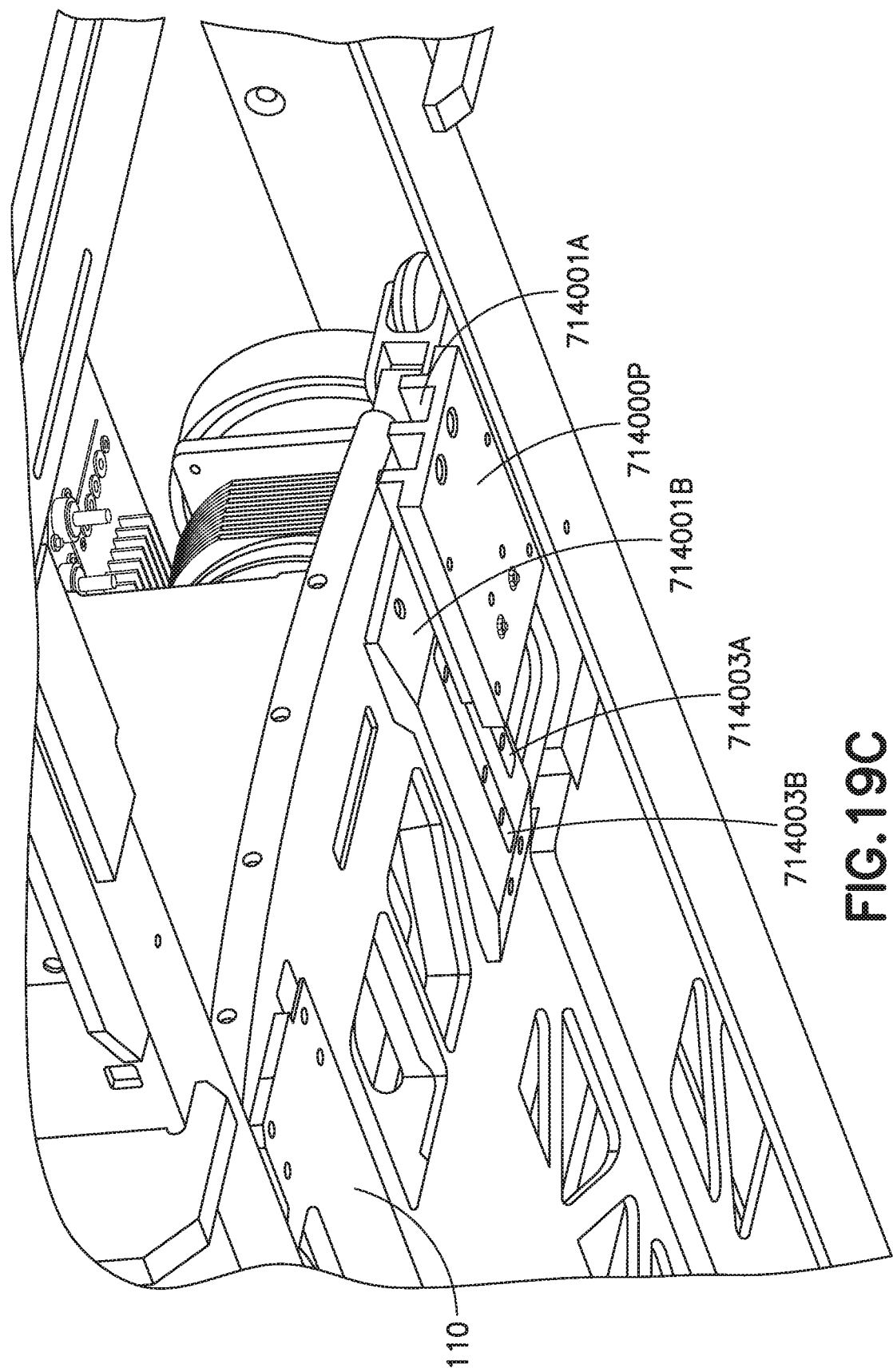

Referring now to FIGS. 1, 12 and 19A-19C the lift module 150 may include a rover charging station 714000 fixed to the rails 7501, 7501X and/or vertical supports/columns 7510 of the lift module so that the charging station 714000 moves with the lift module 150 during, for example, a seismic event. In other aspects the charging station 714000 may be disposed at any suitable location within the automated storage and retrieval system. Suitable examples of rover charging stations are described below and also can be found in, for example, U.S. patent application Ser. No. 13/326,823 entitled "Autonomous Transport Vehicle Charging System" filed on Dec. 15, 2011 and U.S. provisional patent application No. 61/798,282 entitled "Rover Charger System" filed on Mar. 15, 2013 (now U.S. patent application Ser. No. 14/209,086 filed on Mar. 13, 2014 and U.S. provisional patent application No. 61/780,363 entitled "Automated Storage and Retrieval System Structure" filed on Mar. 13, 2013 (now U.S. patent application Ser. No. 14/209,209 filed on Mar. 13, 2014, the disclosures of which are incorporated herein by reference in their entireties. The charging station 714000 may include a contact or charging pad 714000P that includes compliant contacts 714001A, 714001B (generally referred to as compliant contacts 714001). The compliant contacts 714001A, 714001B may interface with rover charging contacts 714003A, 714003B (generally referred to as rover charging contacts 714003) for charging the rover 110. As may be realized, the rovers 110 rest on the lift module 150 rails 7501, 7501X and may move during, e.g., a seismic event. The compliant contacts 714001A, 714001B of the charging station 714000 may be configured to remain in contact with the rover charging contacts 714003A, 714003B during movement of the rover 110 relative to the charging station 714000. As can be seen in FIGS. 19A and 19B, each compliant contact 714001 may be disposed at least partly within a recess of the charging pad 714000P. The compliant contact 714001 may include a contact portion 714010 and a shaft portion 714011 connected to the contact portion 714010. The shaft portion 714011 may be pivotally mounted to the charging pad 714000P in any suitable manner so that the contact portion 714010 moves in the direction of arrow 714020. A resilient or biasing member 714012 is disposed between a surface 714000S of the charging pad 714000P and, for example, the contact portion 714010 (or any other suitable portion of the compliant contact 714001) for biasing the contact portion away from the surface 714000S. As the rover 110 drives onto the charging station 714000 the rover charging contact 714003 pushes the contact portion 714010 of the compliant contact 714001 towards the surface 714000S such that the biasing member 714012 pushes the contact portion 714010 against the rover charging contact 714003. The distance through which the contact portion 714010 is pushed is such that the upward travel of the contact portion 714010 is sufficient to allow the contact portion 714010 to remain in contact with the rover charging contact 714003 during movement of the rover 110 relative to the rails 7501, 7501X during a seismic event. As can be seen in FIGS. 19A and 19B the rover charging contacts 714003, 714003' may have any suitable shape and/or configuration to allow for nonbinding contact as the rover charging contact 714003, 714003' interfaces with the compliant contact 714001.

Referring again to FIG. 1, the autonomous rovers 110 may require charging, for example, before being placed into service, during operations, and/or after an extended idle time. According to an aspect of the disclosed embodiment, the storage and retrieval system 100 includes a charging system 130C for charging power sources (see e.g. power sources 8482, 8522, 8622, 8722 in FIGS. 22A and 23-25) of autonomous rovers 110, 8416, 8516, 8616, 8716 at any suitable time. Charging facilities may be located at any suitable location in the storage and retrieval system 100 such as, for example, at one or more of the input and output vertical lifts 150A, 150B, the levels of storage rack modules, the storage or picking aisles 130A, the transfer decks 130B, or at any point where material is transferred to and from the autonomous rovers 110 or any other suitable location of the storage and retrieval system 100 where an autonomous rover may be located.

Figure 20:
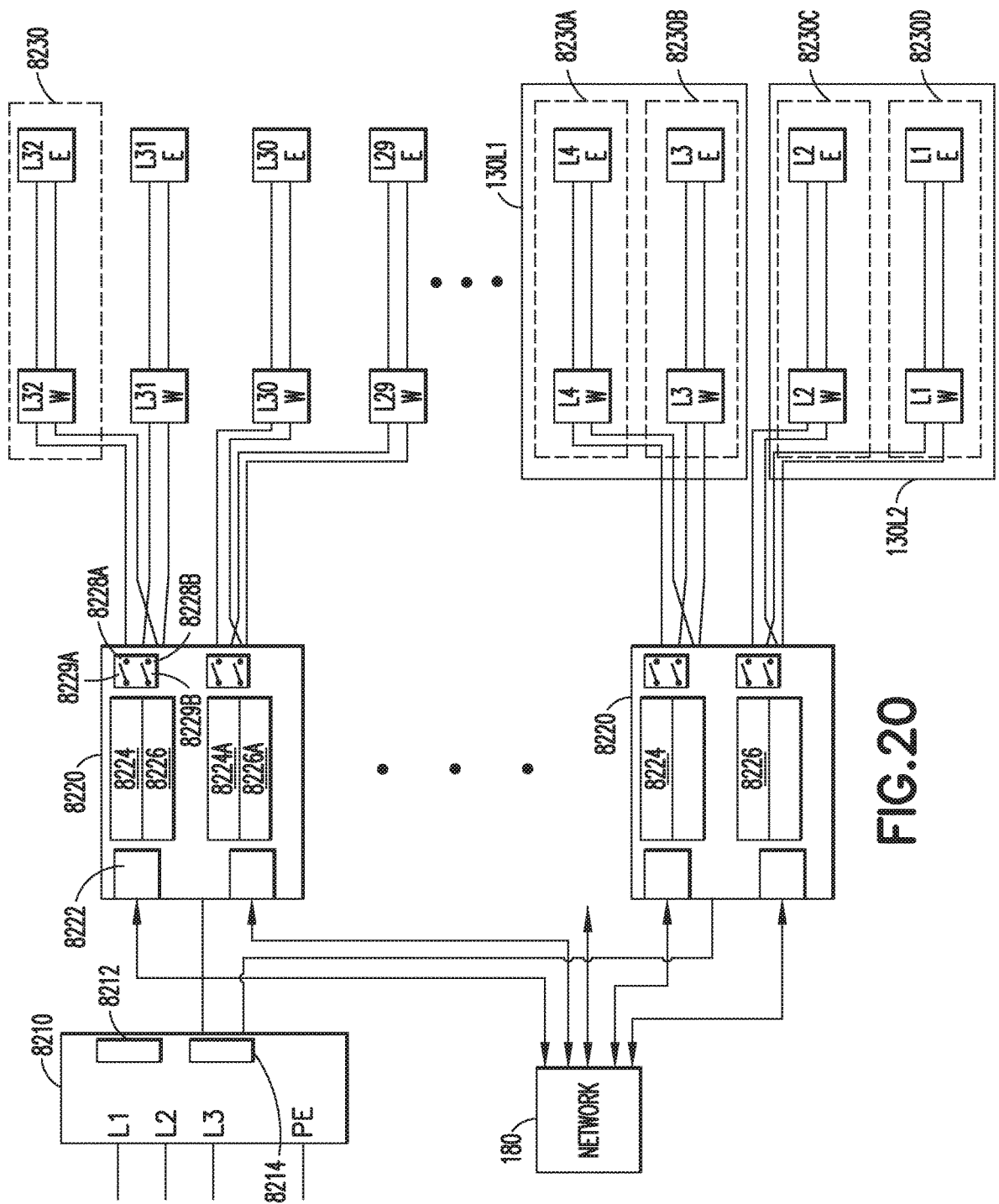
FIG. 20 is a schematic illustration of an autonomous rover charging system in accordance with aspects of the disclosed embodiment.

FIG. 20 shows an exemplary block diagram of a charging system 8200 according to aspects of the disclosed embodiment. The charging system 8200 may be substantially similar to charging system 130C. The charging system 8200 generally includes an alternating current (AC) distribution system 8210, at least one charging supply 8220, and charging locations 8230.

The AC distribution system 8210 may provide alternating current to one or more charging supplies 8220 and may be capable of supplying enough power to enable all charging supplies 8220 in the charging system 8200 to operate at full power simultaneously. The AC distribution system 8210 may include a main disconnect switch 8212 and AC overload and short circuit protection circuitry 8214. An individual AC overload and short circuit protection circuit may be provided for each charging supply 8220 to furnish fault isolation such that a failed charging supply will not affect operation of other charging supplies. The alternating current may be supplied at any suitable amperage or voltage level. For example, the current may be supplied at 480, 400, 240, 230, 220, or 208 volts, 50 or 60 Hz, in a three phase delta or Y configuration, at any appropriate amperage. While FIG. 20 shows a delta configuration and a four wire L1, L2, L3, protective earth (PE) connection, it should be understood that the aspects of the disclosed embodiments may utilize any suitable configuration such as, for example, a Y configuration with a neutral wire L1, L2, L3, N, PE connection. The alternating current may also be supplied to any suitable location within the storage and retrieval system 100.

The at least one charging supply 8220 may include a communications port 8222, one or more charging modules 8224, 8226, and at least one set of contactors 8228A, 8228B. The communications port 222 may generally provide communications between the control server 120 (FIG. 1) and the charging supply 8220 through any suitable network, such as network 180, for enabling in service programming, control, and monitoring of the charging modules 8224, 8226 and contactors 8228A, 8228B. The communications port 8222 may operate to report any suitable information related to the charging modules 8224, 8226 such as, for example, an alarm state, enabled or disabled status, status of contactors 8228A, 8228B, temperature, output current or voltage, voltage or current limits, and/or software version.

The communications port 8222 may operate to receive commands such as, for example, commands to enable and disable charging module output, switch charging module output among constant current, constant voltage, or constant power, change current and voltage limits, update software and calibration data, and/or open or close contactors 8228A, 8228B. The communications port 8222 may also be enabled to report failures of the charging modules 8224, 8226, for example, under voltage, over voltage, over current, over temperature, and no response.

The communications port 8222 may be wired and/or wireless and may use any suitable communication technology or protocol. According to an aspect of the disclosed embodiment, the communications port 8222 may be a network enabled power supply manager having an Internet Protocol (IP) address on the network 180 (FIG. 1) and having a dedicated bus for communication with charging modules 8224, 8226.

Figure 31:
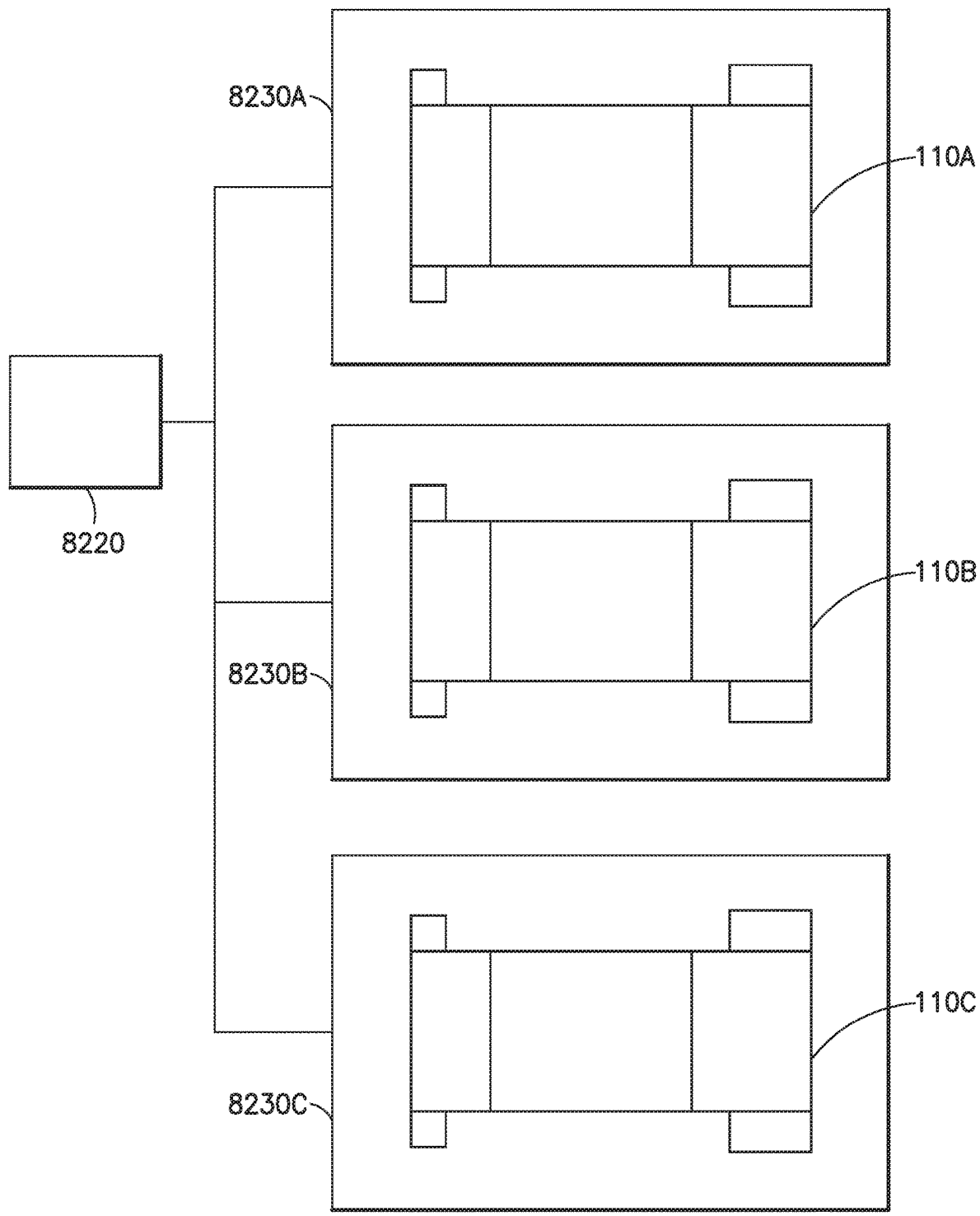
FIG. 31 is a schematic illustration of a charging system in accordance with aspects of the disclosed embodiment.
Figure 32:
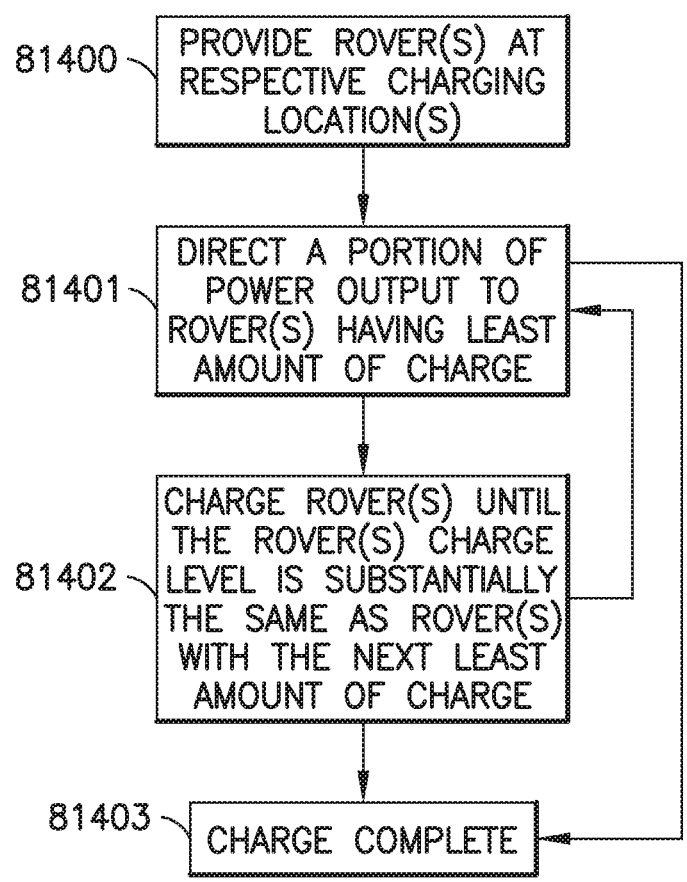
FIG. 32 is a flow diagram in accordance with aspects of the disclosed embodiment.

While charging modules 8224, 8226 are capable of operating alone, two charging modules may be grouped together in charging supply 8220 to produce a combined output. The combined outputs of charging modules 8224, 8226, may be used to deliver power to one or more charging locations 8230. As may be realized, while two charging locations 8230 are illustrated in FIG. 20 with respect to charging modules 8224, 8226 it should be understood that any suitable number of charging modules 8224, 8226 may be connected to power modules 8224, 8226 in any suitable manner. As may also be realized, each charging supply 8220 may have any suitable number of charging modules 8224, 8226, 8224A, 8226A which may be combined to produce a combined output. For example, in one aspect charging modules 8224, 8226 may have a combined output and charging modules 8224A, 8226A may have a combined output. In other aspects charging modules 8224, 8226, 8224A, 8226A may have a combined output while in still other aspects any two or more of the charging modules 8224, 8226, 8224A, 8226A may be combined in any suitable manner to provide a combined output. Each charging location 8230 may have a dedicated contactor 8228A, 8228B. Charging modules 8224, 8226 (and the other charging modules described herein), may be configured such that upon failure of one charging module 8224, 8226, the other charging module 8224, 8226 may be capable of delivering current to the one or more charging locations 8230. According to some aspects, the remaining charging module 8224, 8226 may deliver a reduced amount of current to the charging locations 8230. In one aspect, the charging supply 8220 (and the other charging supplies described herein) may be controlled in any suitable manner such that power output by the charging supply 8220 may be allocated to respective charging locations 8230 depending on a level of charge of the autonomous rovers 110 engaged at each charging location. For example, also referring to FIGS. 31 and 32 charging locations 8230A, 8230B, 8230C may be connected to charging supply 8220 and a rover 110A, 110B, 110C may be provided or otherwise located at a respective charging location 8230A, 8230B, 8230C (FIG. 32, Block 81400). For exemplary purposes only, rover 110A may have the lowest charge level of the rovers 110A, 110B, 110C. Rover 110C may have the highest charge level and rover 110B may have a charge level between the charge levels of rovers 110A and 110C. In one aspect all or most (or any other suitable portion of) the power output from the charging supply 8220 may be allocated to an autonomous rover having the least amount of charge (e.g. such as rover 110A) (FIG. 32, Block 81401) up to the point where the charge of that autonomous rover 110A is substantially equal to a charge of another of the autonomous rovers (e.g. such as rover 110B having the next least amount of charge) at one of the respective charging locations (FIG. 32, Block 81402). Once the charge level of rover 110A is substantially the same as the charge level of rover 110B, autonomous rovers 110A and 110B may receive all or most (or any other suitable portion of) the power output from charging supply 8220 (FIG. 32, Block 81401) until their charge is substantially equal to a charge of another autonomous rover (e.g. having the next least amount of charge such as rover 110C) at one of the respective charging locations (FIG. 32, Block 81402) and so on (e.g. continue with loop of FIG. 32, Blocks 81401, 81402) until the charging of the rovers is complete (FIG. 32, Block 81403). If all the rovers 110A, 110B, 110C at the charging locations 8230A, 8230B, 8230C are substantially the same (e.g. have substantially the same level of charge) the power supply 8220 may direct power to each of the rovers 110A, 110B, 110C until charging is complete (FIG. 32, Block 81403) or until some other predetermined criteria is met (e.g. a predetermined charge percentage of the rover, a command for a rover to leave the charging location, or any other suitable criteria).

Each charging module 8224, 8226 (and the other charging modules described herein) may be "hot pluggable" meaning that each charging module 8224, 8226 may be replaceable without power cycling the charging module 8224, 8226 being replaced and/or without power cycling the charging supply in which the charging module 8224, 8226 is located. The "hot pluggable" replacement of the charging module 8224, 8226 may be done without affecting the operation of any other charging modules and while the charging locations 8230 are active. Each charging module 8224, 8226 may be capable of switching between a constant current, constant voltage, or constant power output mode. In one aspect switching between different output modes may be controlled in any suitable manner such as by commands received from communications port 8222. In another aspect switching between different output modes may be affected automatically by the charging module. In still other aspects switching between different output modes may be controlled by a rover 110 and/or the control server 120.

The charging system 8200 may include any number of charging supplies 8220. A charging supply 8220 may include any number of charging modules 8224, 8226 and may be capable of supplying any number of charging locations 8230 on any number of storage levels. For example, a charging supply 8220 may include two charging modules 8224, 8226 and may provide power to four charging locations 8230 where two charging locations are disposed on each of two levels served by a vertical lift 150A or 150B. For example, referring to FIG. 20, charging locations 8230A, 8230B may be located on level 130L1 of the storage structure 130 while charging locations 8230B, 8230C may be located on level 130L2 of the storage structure 130.

The charging modules 8224, 8226 may be configured with outputs that are enabled when an autonomous rover 110 both accesses and de-accesses charging contacts 8816, 8818 (which may be substantially similar to those described herein) of a charging pad 8810 (FIG. 26A) located at a respective charging location 8230 (e.g. where the charging contacts 8816, 8188 are connected to the charging modules 8224, 8226) to maximize a charging duty cycle and minimize charging delays. The charging supply 8220 may have several different operating modes including, for example, an operating mode where all contactors 8228A, 8228B are disabled, an operating mode where all contactors 8228A, 8228B are enabled, and/or an operating mode where a single or more than one contactor 8228A, 8228B is disabled. Upon power up, the charging supply 8220 may initialize with contactors 8228A, 8228B disabled and open. The communication port 8222 may enable the contactors 8228A, 8228B after receiving a command from a charging system health monitoring function system software, or for example, control server 120. Each contactor 8228A, 8228B may have an auxiliary contact 8229A, 8229B, respectively which may be monitored to determine the state of the respective contactor 8228A, 8228B. During normal operations, the contactors 8228A, 8228B may be closed, energizing the charging pads 8810 at the charging locations 8230. The closed state of the contactors 8228A, 8228B may be verified by monitoring the auxiliary contacts 8229A, 8229B. For maintenance access, a single contactor, e.g. 8228A or 8228B may be disabled so that no current flows through the associated charging location 8230. This may be verified in any suitable manner such as by monitoring auxiliary contact 8229A, 8229B. As may be realized, and as noted above, each charging supply may have any suitable number of contactors 8228A, 8228B connected to any suitable number of charging locations 8230 such that any one or more of the contactors 8228A, 8228B may be disabled for providing maintenance access to any suitable number of charging locations 8230.

According to some aspects, charging modules 8224, 8226 may be configured to charge any suitable power source, such as power sources 8482, 8522, 8622, 8722 (FIGS. 22A and 23-25) disposed on an autonomous rover including a battery pack and/or a capacitor based power source such as, for example, an ultracapacitor bank including one or more ultracapacitors. It is noted that the power sources 8482, 8522, 8622, 8722 are illustrated as ultracapacitors but in other aspects the power sources may be any suitable power sources.

Figure 21:
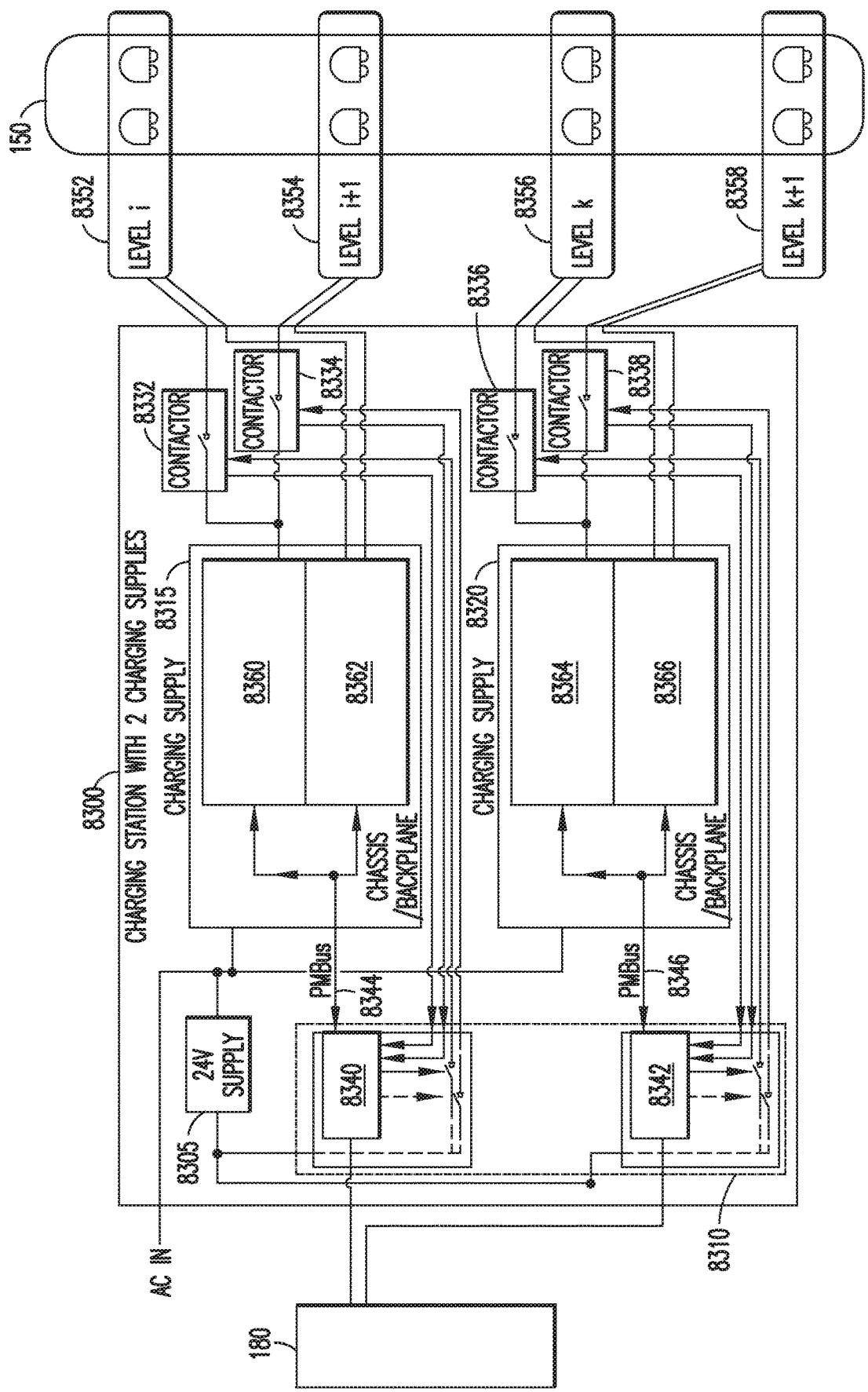
FIG. 21 is a schematic illustration of an exemplary charging station in accordance with aspects of the disclosed embodiment.

FIG. 21 shows a schematic illustration of an exemplary charging station 8300 in accordance with aspects of the disclosed embodiment. The charging station 8300 may be disposed at any suitable location of the storage and retrieval system 100. In one aspect the charging station 8300 may include an internal power supply 8305, a communications port 8310, two charging supplies 8315, 8320, and four contactors 8332, 8334, 8336, 8338, each providing charging facilities to charging pads 8810 (FIG. 26A) disposed at charging locations which may be located at different levels 8352, 8354, 8356, 8358, respectively, of the storage structure 130. In other aspects the charging station 8300 may have any suitable configuration.

In this exemplary aspect, communications port 8310 may be implemented as a dual Ethernet gateway (e.g. having two Ethernet gateways 8340, 8342) with at least one power supply management bus 8344, 8346 capable of controlling one or more charging modules 8360, 8362, 8364, 8366. Each Ethernet gateway 8340, 8342 may have any suitable configuration and include a media access control (MAC) address chip and an assigned IP address on network 180 (FIG. 1). As a result, each charging supply 8315, 8320 may have an Ethernet address or be identified on network 180 in any suitable manner. In one aspect there may be two power supply management busses 8344, 8346 (in other aspects any suitable number of power supply management busses may be provided) that may conform, for example, to the Power Management Bus (PMBus) standard. Each power supply management bus 8344, 8346 may control any suitable number of charging modules 8360, 8362, 8364, 8366. In this example, power supply management bus 8344 may be connected to charging modules 8360, 8362 and power supply management bus 8346 may be connected to charging modules 8364, 8366.

Each charging supply 8315, 8320 may be substantially similar to that described above and include one or more charging modules 8360, 8362, 8364, 8366, grouped together, for example, in pairs, with each pair providing a shared output. In other aspects the one or more charging modules may be grouped together in any suitable manner. Each charging module 8360, 8362, 8364, 8366 may be hot pluggable as described above, and may be capable of switching between a constant current, constant voltage, or constant power output mode, as described above and as controlled by commands from communications port 8310, affected automatically by each charging module, controlled by a rover 110, or controlled by the control server 120.

FIG. 22A is a schematic illustration of an exemplary implementation of a charging system 8400 for charging the rover power source 8482 in accordance with aspects of the disclosed embodiment. Charging system 8400 includes an AC distribution system 8210, one or more charging stations 8410, an intermediate DC bus 8412, and a charging interface 8414 connected to a charging pad 8450 with contacts 8816, 8818 (similar to charging pad 8810 in FIG. 26A) that interface with an autonomous rover 8416 (which may be substantially similar to rover 110 described above). The charging interface 8414 may include, for example, a floor mounted charging pad 8450 with charging contacts 8816, 8818 (FIG. 26A) and a rover mounted charging pad 8452 (similar to charging pad 8820 in FIG. 26A). The charging pads 8450, 8452 may interface or engage each other in any suitable manner such as that described below with respect to FIGS. 26A and 26B. In some aspects, the voltage present on the intermediate DC bus 8412, and hence the voltage present on the charging contacts 8816, 8818, may be considered extra low voltage and may require less protection, or in some aspects, no protection, against electrical shock.

Charging stations 8410 may include any suitable number of charging modules 8440, 8442 (which may be substantially similar to those charging modules described above), generally configured in groups of two (or in groups of any suitable number of charging modules) with combined outputs for delivering charging power to one or more autonomous rovers 8416. A group of any number of charging modules with combined outputs for delivering power may be referred to as a charging supply (see e.g. charging supplies 8220, 8315, 8320 described above).

Figure 26A:
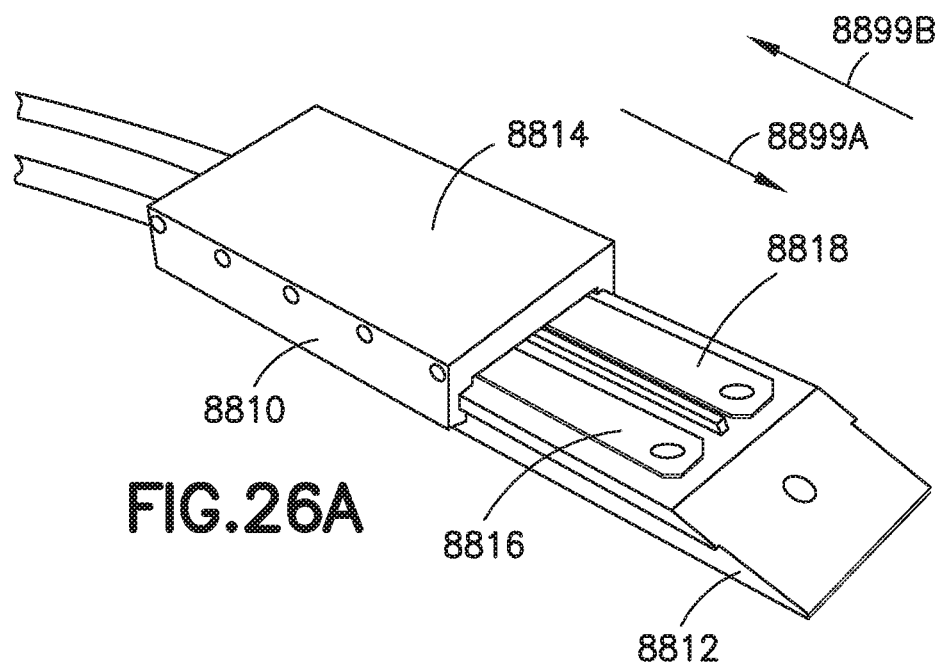
FIGS. 26A and 26B are schematic illustrations of an exemplary set of charging pads in accordance with aspects of the disclosed embodiment.
Figure 26B:
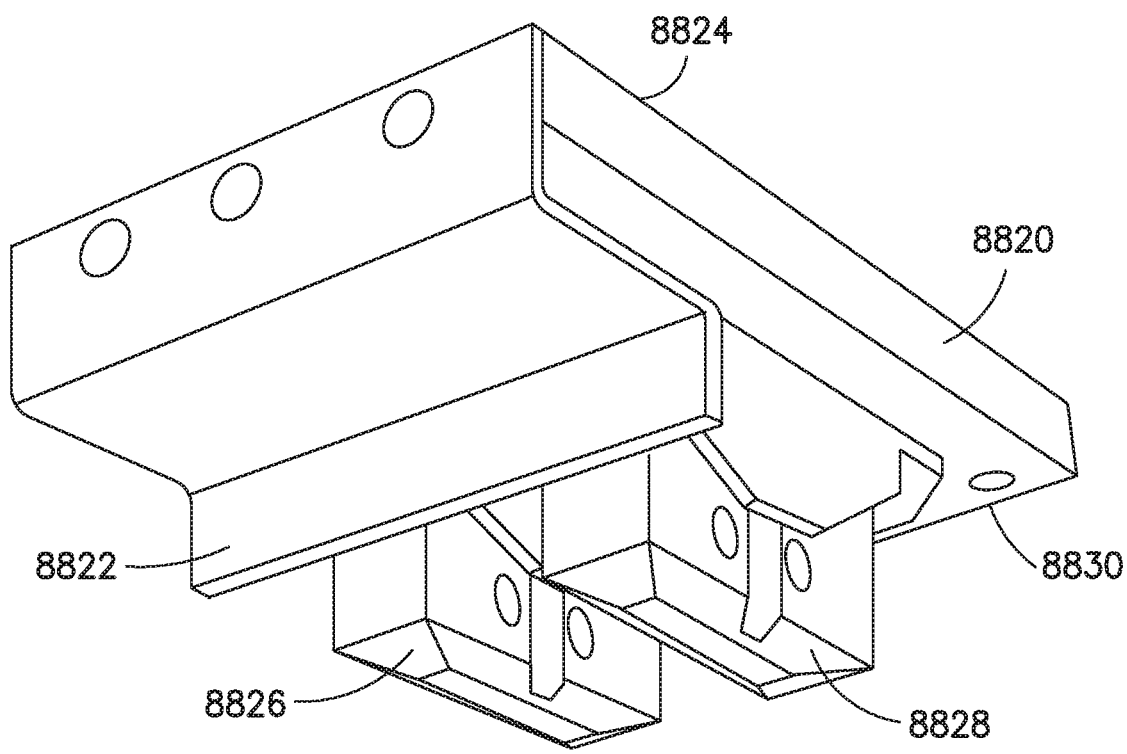

The rover 8416 may include what may be referred to as "hot swap" circuitry 8418 or other suitable protection circuitry configured to allow the rover 8416 to connect to an energized or otherwise enabled charging pad 8450 (e.g. "hot swap" refers to the autonomous rover's ability to make and break contact, such as contact between the charging pad contacts 8816, 8818 and the rover charging contacts 8826, 8828 of charging interface 8414, while the charging pads 8450 are energized—see FIGS. 26A and 26B). As shown in FIG. 22B, the hot swap circuitry 8418 may include current inrush limitation circuitry 8422, reversal protection circuitry 8424, and charging control circuitry 8426. The current inrush limitation, charging control, and reversal protection circuitry may be implemented in any suitable manner such as, for example, under control of an autonomous rover controller 8420. The reversal protection circuitry 8424 may also be implemented, for example, using one or more Field Effect Transistors (FET's) or in any other suitable manner. The autonomous rover controller 8420 may provide commands to the hot swap circuitry 8418, for example, to set current inrush limits and/or enable or disable rover charging. As a result, whether charging of the rover is on or off is controlled locally on the rover 8416 so that no control loop with the charging station 8410 or the control server 120 is required (e.g. enabling or disabling charging of a rover is controlled by the rover 8416 independent of the charging station 8410 and control server 120).

As shown in FIG. 22C, the autonomous rover controller 8420 may include a processor 8430, a memory 8432, and a communications interface 8434. The communications interface 8434 may generally provide communications between the control server 120 (FIG. 1) and the autonomous rover 8416 at least for controlling rover operations, providing information about charging supplies and charging modules, and/or controlling charging supply and charging module operations.

It should be noted that each charging module 8440, 8442 in charging system 8400 may be configured to switch between a constant current, constant voltage, and/or constant power output mode in a manner substantially similar to that described above. As also noted above, in one aspect switching between different output modes may be controlled in any suitable manner such as by commands received from communications port 8222. In another aspect switching between different output modes may be affected automatically by the charging module. In still other aspects switching between different output modes may be controlled by a rover 110 and/or the control server 120.

It should also be noted that the autonomous rover 110, 8416 entry to a charging location 8230 that, for example includes, charging interface 8414, is decoupled or independent from a status of the charging station 8410, a status of the charging location and/or a status of the charging interface 8414. The autonomous rover controller 8420 may control the hot swap circuitry 8418 and the output of charging station 8410 to effect charging of the autonomous rover power source, regardless or otherwise independent of the charging station 8410 status, charging location 8230 status or charging interface 8414 status before and/or after contact is made (e.g. when the rover 110, 8416 accesses and de-accesses the charging interface 8414) between charging contacts 8816, 8818 (FIG. 26A) of the rover 110, 8416 and charging contacts 8826, 8828 (FIG. 26B) of the charging interface 8414. In at least one aspect of the disclosed embodiment, an output of a charging supply, such as charging supply 8220, 8315, 8320, is enabled when the rover 110, 8416 accesses and de-accesses the charging contacts 8826, 8828 of the charging pad 8450 of the charging interface 8414. The autonomous rover controller 8420 may also control the output of charging station 8410 to change a state of the charging interface 8414 between safe and unsafe (e.g. un-energized and energized, respectively) to effect a hot swap entry and departure of the autonomous rover 110, 8416 with respect to a charging location 8230.

As mentioned above, charging locations 8230 may be located at any suitable location in the storage and retrieval system 100 where material is transferred to and from the autonomous rover 110 or at any other suitable location at which the autonomous rover 110 may be disposed. It should be understood that autonomous rover charging may be accomplished while an autonomous rover 110 is transferring material to and from the autonomous rover 110. It should also be understood that the rover entry to a material transfer location, such as at lift 150A, 150B location, in a picking aisle or any other suitable transfer location, with simultaneous charging under rover control is independent of communication between the control server 120 and the rover communication interface 8434 (e.g. independent of the control server commands). It should further be understood that an autonomous rover 110 does not need clearance from the control server 120 or any other system component to effect a charging operation, or for entry onto a charging pad, as long as entry to the charging pad is not blocked, for example, by another rover.

Figure 23:
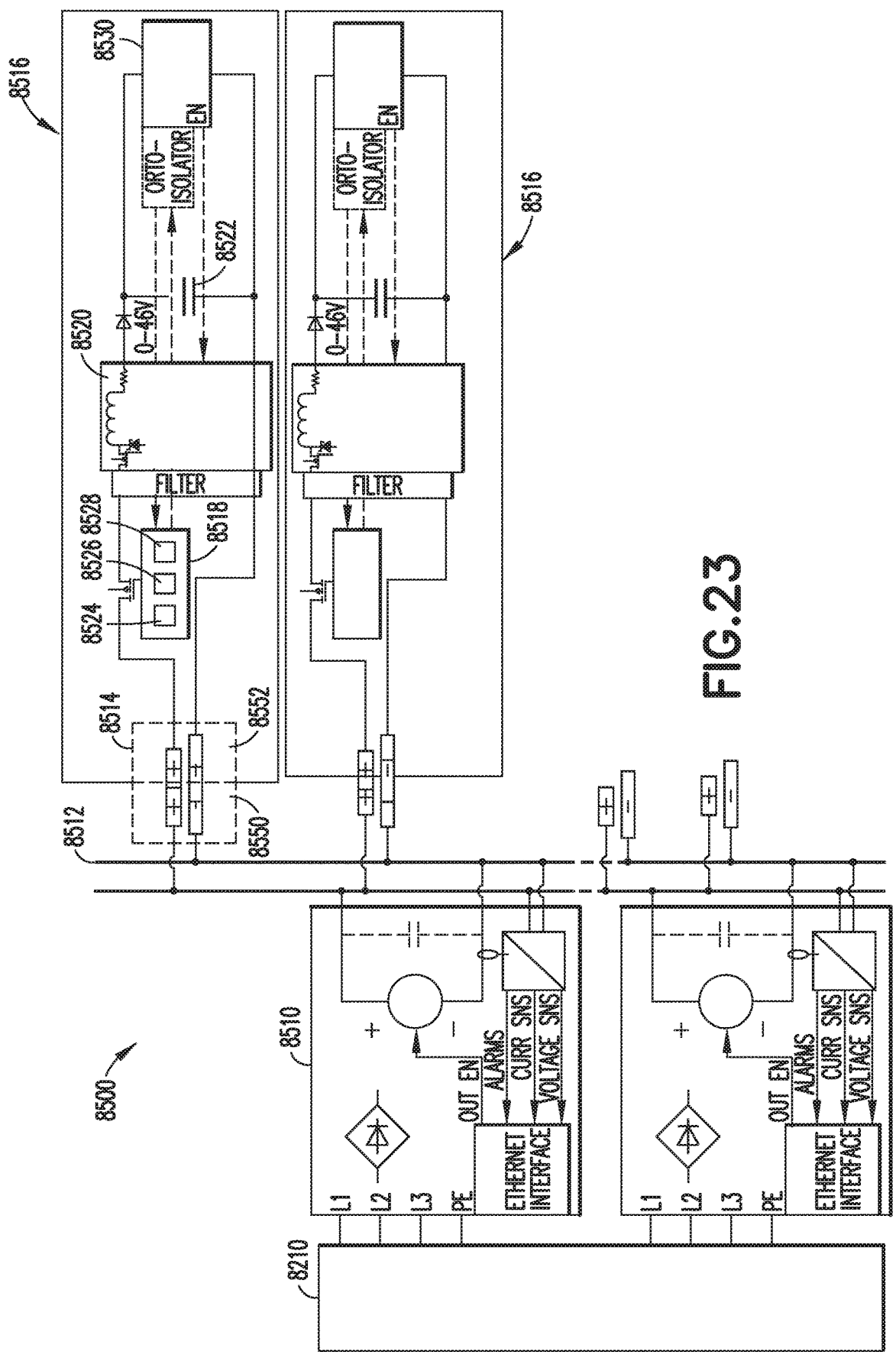
FIG. 23 is a schematic illustration of an exemplary implementation of a charging system in accordance with aspects of the disclosed embodiment.

FIG. 23 shows a schematic illustration of another exemplary implementation of a charging system 8500 in accordance with aspects of the disclosed embodiment. Charging system 8500 includes AC distribution system 8210, at least one DC power supply 8510, an intermediate DC bus 8512, and at least one charging interface 8514 (substantially similar to that described above) with a charging pad 8550 (that is substantially similar to charging pad 8450 described above) having contacts 8816, 8818 (FIG. 26A) that interface with an autonomous rover 8516 (that is substantially similar to rovers 110, 8416 described above). The charging interface 8514 may include, for example, the floor mounted charging pad 8550 and a rover mounted charging pad 8552 (substantially similar to rover mounted charging pad 8452 described above).

According to some aspects, the autonomous rover 8516 may include hot swap circuitry 8518 (substantially similar to that described above) and a charging supply 8520 for charging a power source 8522. According to other aspects, the voltage present on the intermediate DC bus 8512 may be considered high voltage and all components used in the intermediate DC bus and connected to the voltage of the DC bus, or components that may be connected to the DC bus voltage in a single fault case, must be made finger safe, for example, protected against finger contact or solid foreign bodies, typically using an insulating barrier having an opening of 12 mm or less. In some aspects this may include the charging pads 8550 where the charging pads are configured in any suitable manner to be finger safe.

The hot swap circuitry 8518 may include current inrush limitation circuitry 8524, reversal protection circuitry 8526, and charging control circuitry 8528, similar to hot swap circuitry 8418 (FIG. 22). The hot swap circuitry 8518 may be under control of the autonomous rover controller 8530. According to some aspects, the autonomous rover 8516 includes a rover charging supply 8520. The rover charging supply 8520 may be similar to charging supply 8220, and may be capable of switching between a constant current, constant voltage, or constant power output mode. Switching of the charging supply 8520 between different output modes may be controlled by commands received from the autonomous rover controller 8530, may be affected automatically by the rover charging supply 8520, and/or may be controlled by the control server 120. In at least one aspect of the disclosed embodiment, an output of the charging supply 8520 is enabled when the rover accesses and de-accesses the charging contacts in a manner substantially similar to that described above.

Figure 24:
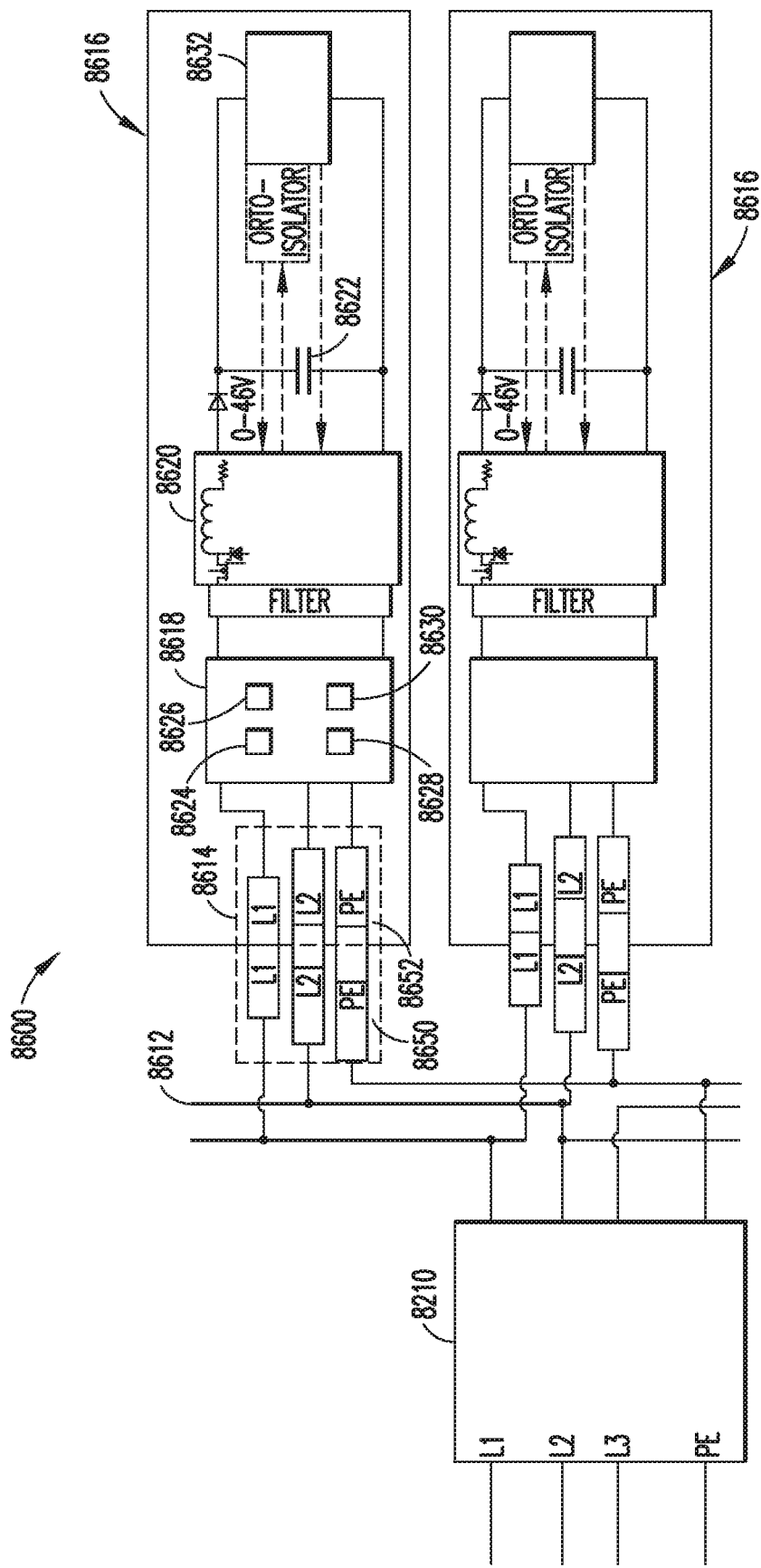
FIG. 24 is a schematic illustration of an exemplary implementation of a charging system in accordance with aspects of the disclosed embodiment.

FIG. 24 shows a schematic illustration of another exemplary implementation of a charging system 8600 in accordance with aspects of the disclosed embodiment. Charging system 8600 includes AC distribution system 8210, an intermediate AC bus 8612, and at least one charging interface 8614 (that may be substantially similar to those described above) with a charging pad 8650 (substantially similar to that described above) having any suitable number of contacts substantially similar to contacts 8816, 8818 (FIG. 26A) that interface with an autonomous rover 8616 (which may be substantially similar to those described above). The charging interface 8614 may include, for example, the floor mounted charging pad 8650 and a rover mounted charging pad 8652 (substantially similar to the rover mounted charging pads described above). Similar to the aspects shown in FIG. 23, the voltage present on the intermediate AC bus 8612 may be considered high voltage and all components used in the intermediate AC bus and connected to the voltage of the AC bus, or components that may be connected to the AC bus voltage in a single fault case, must be made finger safe.

According to some aspects, the number of contacts in charging interface 8614 may be determined by the type of AC power provided by the intermediate AC bus 8612. For example, a delta configuration with four wire L1, L2, L3, and PE connections may have three contacts as shown in FIG. 24, or a Y configuration with neutral wire L1, L2, L3, N, and PE connections may have four contacts.

According to other aspects, the autonomous rover 8616 may include rectifier and hot swap circuitry 8618 and a charging supply 8620 for charging a power source 8622. The rectifier and hot swap circuitry 8618 may include circuitry 8624 for rectification of power received from the intermediate AC bus 8612, current inrush limitation circuitry 8626, reversal protection circuitry 8628, and charging control circuitry 8630.

The rectifier and hot swap circuitry 8618 may operate under control of the autonomous rover controller 8632 or in any other suitable manner. Similar to the aspects shown in FIG. 23, the autonomous rover 8616 includes a rover charging supply 8620 (that may be substantially similar to those described above), which may be capable of switching between a constant current, constant voltage, and/or constant power output mode as controlled by the autonomous rover controller 8632 and/or the control server 120. In at least one aspect of the disclosed embodiment, an output of the charging supply 8620 is enabled when the rover accesses and de-accesses the charging contacts of the charging pad 8650 in a manner substantially similar to that described above.

Figure 25:
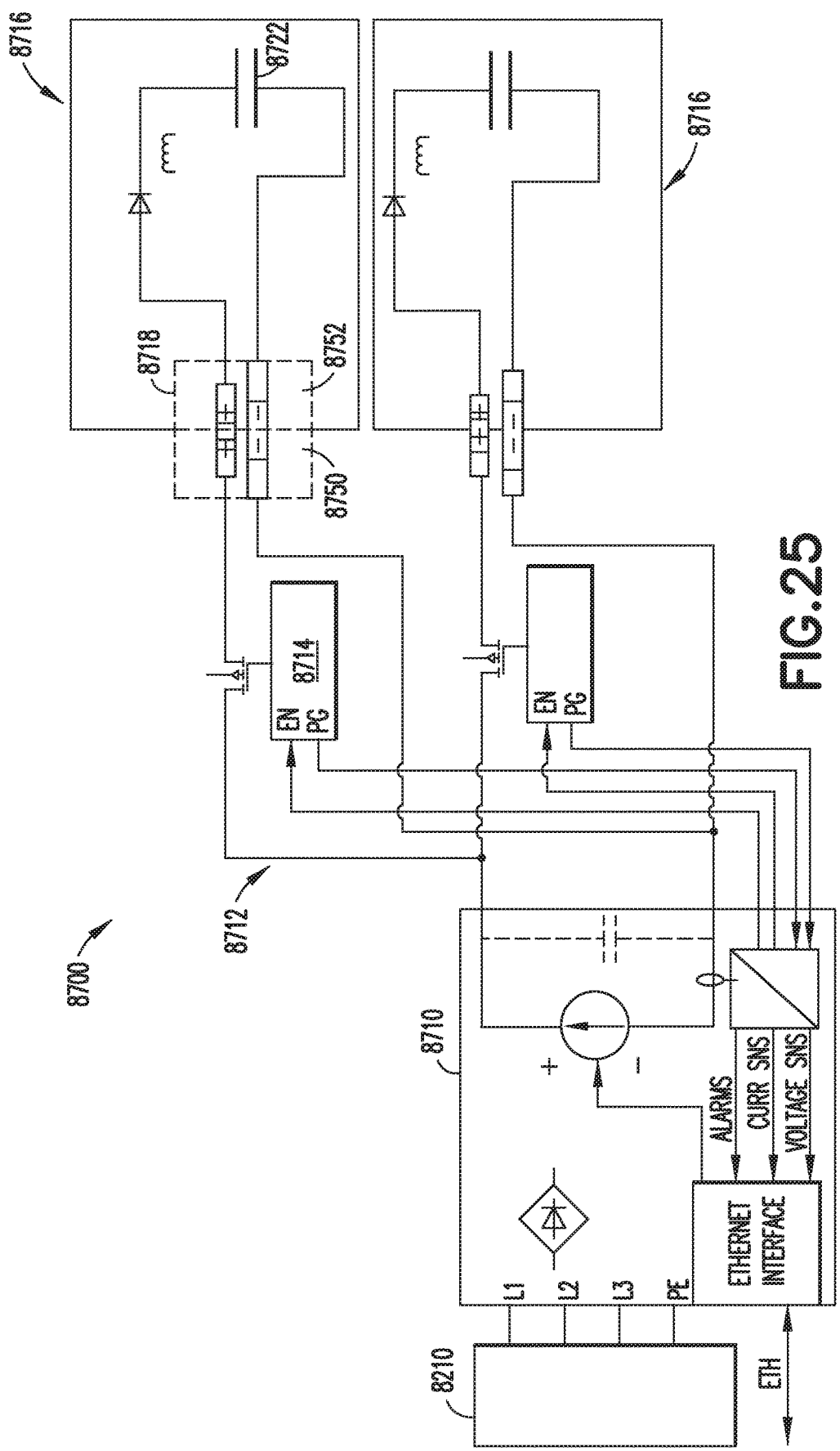
FIG. 25 is a schematic illustration of an exemplary implementation of a charging system in accordance with aspects of the disclosed embodiment.

Another exemplary implementation of a charging system 8700 in accordance with aspects of the disclosed embodiment is shown in FIG. 25. This exemplary charging system 8700 includes AC distribution system 8210, at least one DC power supply 8710, an intermediate DC bus 8712, hot swap circuitry 8714, and at least one charging interface 8718 (that may be substantially similar to those described above) with a charging pad 8750 having contacts 8816, 8818 (FIG. 26A) that interface with an autonomous rover 8716 (which may be substantially similar to those described above). The charging interface 8718 may include, for example, the floor mounted charging pad 8750 and a rover mounted charging pad 8752 (that may be substantially similar to those described above).

The DC power supply 8710 may be substantially similar to those described above and may be capable of switching between a constant current, constant voltage, and/or constant power output mode in a manner similar to that described above. In a manner similar to that described above, switching between different output modes may be affected automatically, may be controlled by commands received from a controller of the autonomous rover 8716, and/or may be controlled by the control server 120. In some aspects of the disclosed embodiment, an output of the DC power supply 8710 is enabled when the rover 8716 accesses and de-accesses the charging contacts of the charging pad 8750 in a manner substantially similar to that described above.

According to some aspects, the voltage present on the intermediate DC bus 8712 may be considered high voltage and all components used in the intermediate DC bus and connected to the voltage of the DC bus, or components that may be connected to the DC bus voltage in a single fault case, must be made finger safe. In other aspects, the voltage present on the intermediate DC bus 8712 may be considered extra low voltage and may require less protection against shock.

Exemplary aspects of components of the charging interface 8414, 8514, 8614, 8718 are shown in FIGS. 26A and 26B. FIG. 26A shows an example of a floor mounted charging pad 8810. The floor mounted charging pad 8810 may include a base 8812 which may be mounted on a floor of the storage structure 130 or wherever a charging location 8230 may be located. A movable cover 8814 may be provided which may be biased in the direction of arrow

8899A in a closed position, such that the movable cover 8814 is disposed over the contacts 8816, 8818 of the charging pad 8810. In other aspects, a cover may not be provided on the charging pad 8810. According to some aspects, contact 8816, which may be connected to a negative DC voltage of a respective power supply, may have a longer length than contact 8818, which may be connected to a positive DC voltage of a respective power supply, in order to facilitate the negative contact 816 being engaged both first and last as the rover drives on and off the charging pad 8810. An exemplary rover mounted charging pad 8820 is shown in FIG. 26B. The rover mounted charging pad 8820 may include rover charging contacts 8826, 8828 mounted, for example, on an underside 8830 of the rover mounted charging pad 8820. The rover mounted charging pad 8820 may be mounted, for example, to an underside of an autonomous rover for establishing a mating relationship with the floor mounted charging pad 8810. In some aspects, the rover mounted charging pad 8820 may be mounted with a cover pusher 8822 or other suitable member for moving the cover 8814 in the direction 8899B as the rover moves relative to the floor mounted charging pad 8810 to expose contacts 8816, 8818 of the floor mounted charging pad 8810 for effecting an electrical connection between the charging pads 8810, 8820. In other aspects, a cover pusher may not be provided. As may be realized, when the rover disengages the floor mounted charging pad, relative movement between the rover (e.g. the cover pusher 8822) and the floor mounted charging pad 8810 may allow the biasing force on the cover 8841 to move the cover 8841 in the direction of arrow 8899A so that the contacts 8816, 8818 are covered. In still other aspects, hot swap circuitry 8418, 8518, or rectifier and hot swap circuitry 8618 may be mounted on a top side 8824 of the rover mounted charging pad 8820.

As mentioned above, an autonomous rover controller 8420, 8530, 8632, may control charging of its onboard power source and/or each of the charging modules within each charging supply. According to some aspects, the autonomous rover controller 8420, 8530, 8632, may be configured to effect different charging modes for the autonomous rover power sources describe above such as, for example, power sources 8482, 8522, 8622, 8722. It should be understood that the specified voltage and current levels described are exemplary and may vary, for example, according to the state of the power source being charged and the time available for charging. The charging modes may include a pre-charge mode, a force charge mode, charge enabled and disabled modes, full, quick, and incomplete charge modes, and a trickle charge mode. According to some aspects, all modes except the pre-charge mode may require that the autonomous rover controller 8420, 8530, 8632 be active.

It should also be understood that when more than one autonomous rover is being charged simultaneously (as described above), in some aspects, all or most of the current may be supplied to the rover with the lowest power source voltage until the power source voltage rises to that of a rover having a next lowest power source voltage, at which point current will be shared between the charging rovers.

The pre-charge mode is used for a fully depleted power source, for example, after shipping with shorted power source terminals. The pre-charge mode may provide a constant current at, for example, any suitable amperage such as approximately 5 A while the power source voltage increases from approximately 0V to any suitable predetermined voltage such as approximately 18V.

The force charge mode may be activated if the output of the power source exceeds any suitable voltage such as, for example, approximately 14V. In the force charge mode, charging may be activated at any suitable constant full current such as, for example, approximately 110 A or any other suitable current.

A charge disabled mode may be activated when the rover power source voltage is within normal operating limits and the autonomous rover controller determines that no charge is required. In other aspects, the charge disabled mode may be activated at any suitable time.

A charge enabled mode may be activated when the rover power source voltage is within normal operating limits and charging is required as determined by the autonomous rover controller. In other aspects, the charge enabled mode may be activated at any suitable time.

The autonomous rover controller may activate a full charge mode at a constant voltage in order to fully charge the rover power source to a predetermined value such as, for example, to approximately 99.3% (to account for power source voltage minus diode drop) of a predetermined full charge value. In other aspects, the full charge mode may be activated at any suitable time.

A quick charge mode may be activated where a constant current charge is followed by a constant voltage charge but charging is terminated before a full charge state is complete. This mode may provide a sufficient charge level to allow the rover to complete at least one task assigned to the rover. The quick charge mode may be activated at any suitable time.

The autonomous rover controller may activate an incomplete charge mode when a rover is only required to complete a predetermined assigned task. In this mode charging may be terminated before completion, as soon a required energy level to perform the assigned task is achieved. The available energy for the assigned task may be estimated from the charge voltage or determined in any other suitable manner.

The autonomous rover controller may also activate, at any suitable time, a trickle charge mode where the rover power supply is charged with a relatively low current over an extended period of time.

Figure 27:
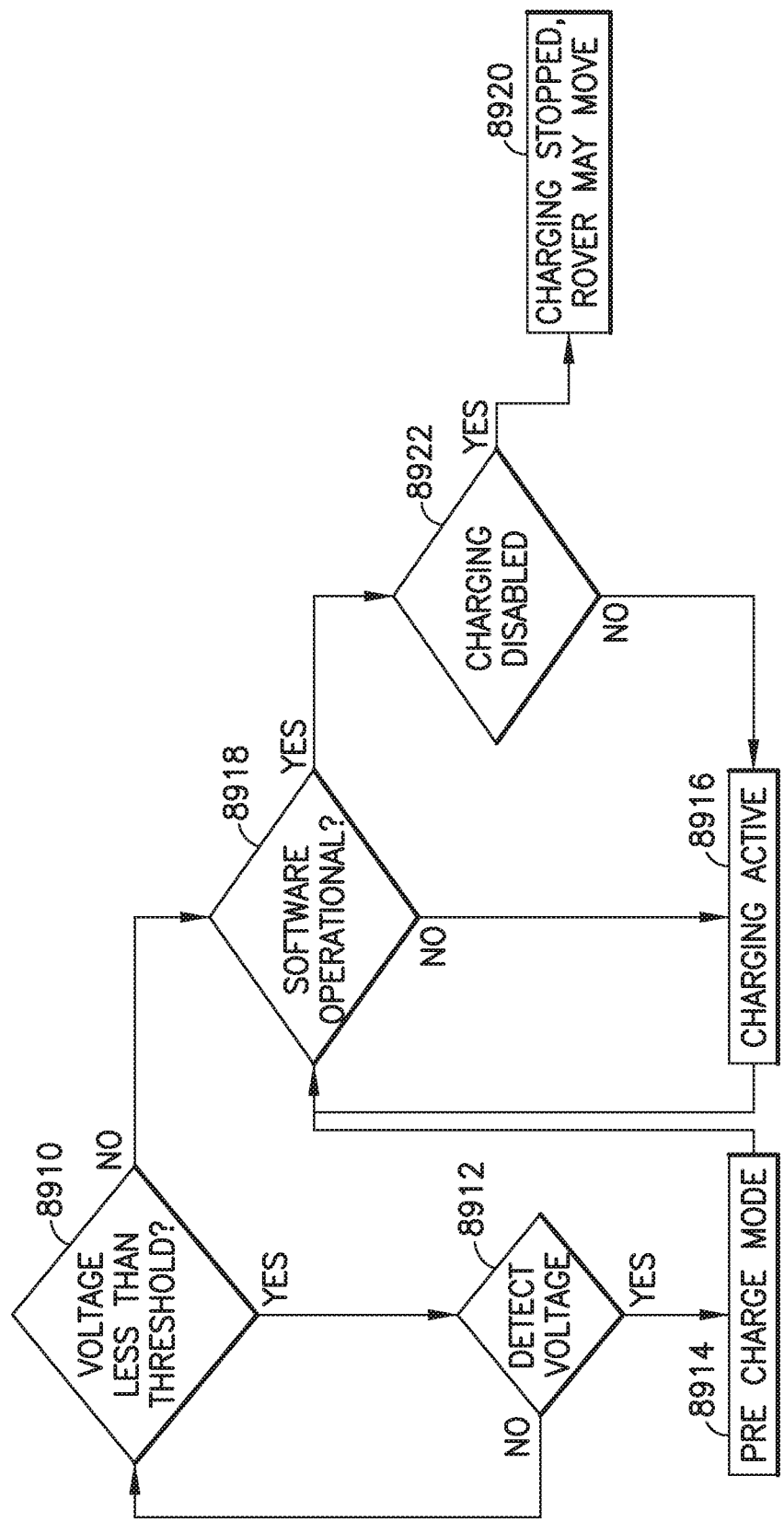
FIG. 27 illustrates different charging modes for an autonomous rover in accordance with aspects of the disclosed embodiment.

FIG. 27 shows an exemplary progression among different charging modes. Referring to item 8910, if the rover power source voltage is less than any suitable predetermined threshold, for example, approximately 14-18V, the voltage of the charging supply may be detected in any suitable manner such as by the a sensor or meter in the charging supply, by control server 120 and/or by the rover controller as shown in item 8912. If the voltage of the charging supply exceeds any suitable predetermined voltage such as, for example, 30V, the rover may enter the pre-charge mode 8914 which provides, for example, any suitable constant current such as, for example, approximately 5 A between any suitable voltage levels such as approximately, 0V and 18V. Pre-charging mode may end when the rover power source reaches a predetermined voltage such as, for example, approximately 18V, or if a force charge mode is activated, as shown in item 8916.

The force charge mode 8916 may be activated upon the output of the power source reaching a suitable voltage such as, for example, approximately 14V-18V during the pre-charge mode. In the force charge mode, charging may be activated at for example, full current, or any suitable current such as approximately 110 A. The force charge mode 8916 may be terminated after the rover software is operational, as shown in item 8918, and a bit is set in a register in the autonomous rover controller, shown as item 8922 and as explained below.

When the rover software is operational and the power source voltage is within normal operating limits (for example, approximately 25V to 46.3V or any other suitable voltage range), charging may be disabled under the control of the software running on the rover by setting a bit in a complex programmable logic device (CPLD) register in the autonomous rover controller or in any other suitable location of the controller, as shown in item 8922. As shown in item 8920, charging may stop within any suitable time period such as, for example, approximately 1 ms (could be more or less than 1 ms) and the rover may move after verifying the bit setting in the register and upon instruction from the control server. After charging has been disabled and the rover may leave the charging location with no risk of arcing on loss of pad contact or bounce.

Figure 28:
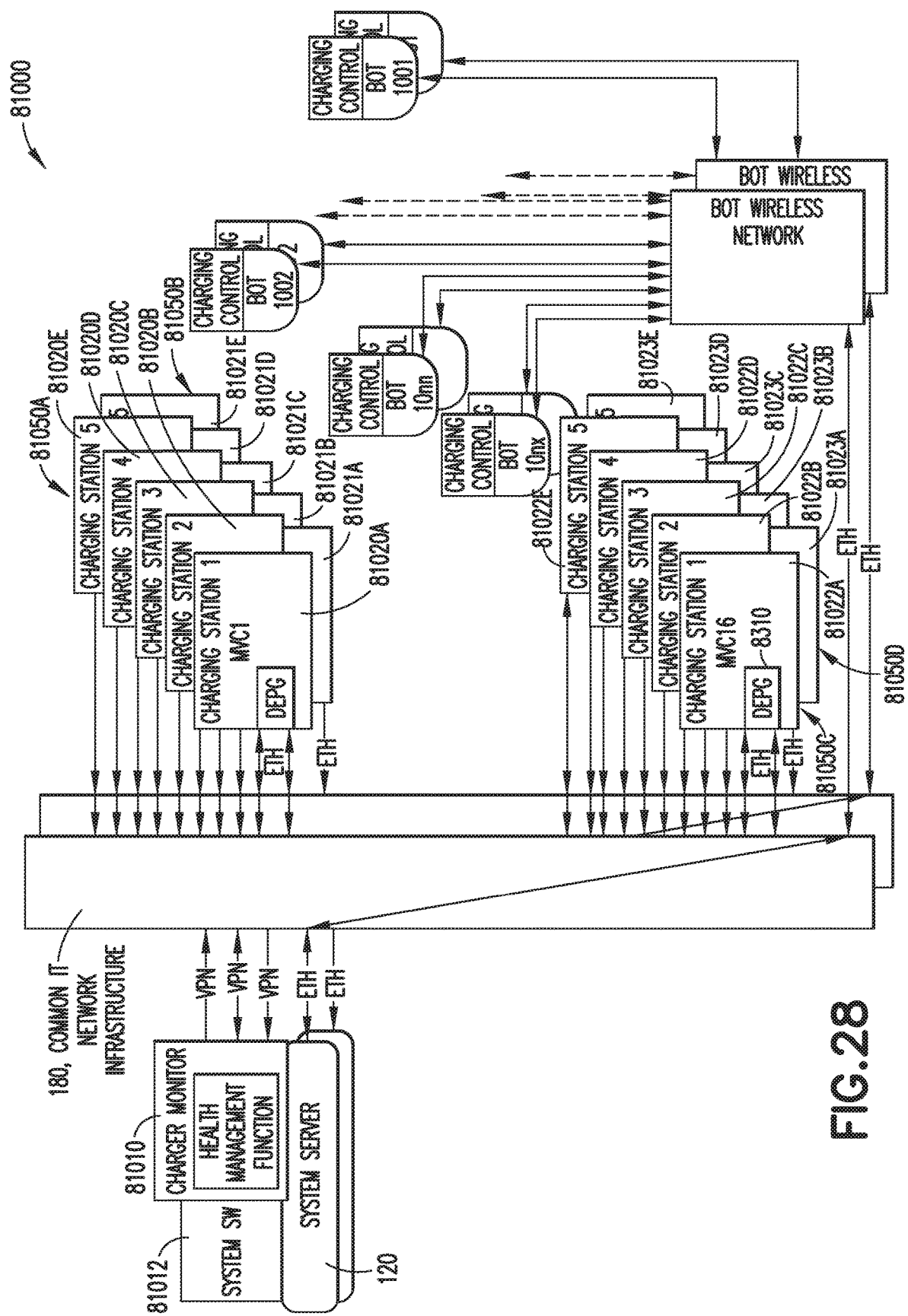
FIG. 28 is a schematic illustration of a control system for controlling an autonomous rover charging system in accordance with aspects of the disclosed embodiment.

FIG. 28 is a schematic illustration of a control system 81000 for controlling an autonomous rover charging system in accordance with aspects of the disclosed embodiment. The control system 81000 includes charger monitor software 81010 which according to some aspects, may reside in a memory of control server 120. According to other aspects, the charger monitor software 81010 may reside in a memory of an autonomous rover controller such as controllers 8420, 8530, 8632 described above. It is noted that the controller/control server where the software resides includes suitable structure for executing the software such that the controller/control server is configured to perform or otherwise execute the software functions as described herein. The charging control system 81000 may provide for monitoring of the state of each charging station, changing the state of each charging station individually under software control, terminating operation of one or more charging supplies and disconnecting power to one or more sets of charging pads to allow maintenance access to a charging location. In this example, the charging stations 81020A-81020E, 81021A-81021E, 81022A-81022E, 81023A-81023B are disposed at respective lift 81050A, 81050B, 81050C, 81050D locations, where the lifts 81050A, 81050B, 81050C, 81050D are substantially similar to one or more of lifts 150A, 150B described above. In this aspect a single or common control system 81000 is illustrated for the charging stations 81020A-81020E, 81021A-81021E, 81022A-81022E, 81023A-81023B but in other aspects there may be more than one control system (similar to control system 81000) where each control system is connected to any suitable number of charging stations. For example, charging stations 81020A-81020E and 81021A-81021E may be connected to a common control system while charging stations 81022A-81022E are connected to a separate control system and charging stations 81023A-81023E are connected to yet another control system.

As described above, a group of charging supplies, for example, in charging stations 8220 and 8300 each have a communications port 8222 and 8310, respectively, for communication with the network 180.

The control system may also include a System Health Monitoring Function (HMF) as part of the charger monitor software 81010. The HMF may correlate information from the various autonomous rovers, charging supplies, and charging locations to determine the status of various components of the charging system. As an example only, a charging supply may be visited by some number of rovers, each rover will visit some number of charging supplies, and a set of charging pads will be used by some number of rovers. Synthesizing this information along with any other suitable information, for example, a level of charge for each rover, may enable, for example, identification of charging supplies in need of maintenance or calibration, a precise determination of a capacitance for each rover, tracking of degradation or anomalies of the charging system for accurate charging decisions, precise statistical estimates of an average energy per assigned task for each rover, comparison of charging contactor properties, effective maintenance of the system, preemptive identification of rovers in need of maintenance, and any other suitable task.

The HMF may include continuous monitoring of one or more autonomous rovers 110. An autonomous rover 110 may utilize the communication interface to provide various operational parameters to the HMF such as, for example, time stamped power source voltage levels, allowing the HMF to determine an average energy consumption of the rover 110. Each rover 110 may continuously monitor its power source voltage while charging, for example, at any suitable time interval such as approximately at least 2 times per second and may disable charging and raise a warning (e.g. sends any suitable message to any suitable controller such as system/control server 120) if the power source voltage exceeds a predetermined value. If several rovers 110 raise the same warning for the same charging station, that station may need calibration or other maintenance. While an autonomous rover might still be able to use that charging station because of an ability of the rover to detect overvoltage the charger monitor software 81010 may cause the charging station to be disabled.

The HMF may also provide a continuous monitoring function to the charger monitor software 81010. For example, the HMF may continuously apprise the charger monitor software 81010 of the health of the charging system and allow for intelligent decisions regarding when to enable or disable chargers to minimize potentially damaging situations. The HMF may collect and report health information for each charging station that includes charger timeouts, trips and over temperature. If, for example, over temperature or trip events exceed some predetermined number at a charging location within a predetermined time period, then the charger monitor software 81010 HMF may disable charging at that location. The HMF may periodically fetch and report any suitable error and warning words from the charging stations, supplies, and modules. The charger monitor software 81010 response to these error and warning words may include instructing charging modules to automatically disable outputs if one or more conditions are detected. During normal operations the charger monitor software 81010 generally enables charging supply outputs.

The charger monitor software may also determine a minimum time for rovers to charge. For example, in one aspect the charger monitor software 81010 may give every rover a minimum time to charge based upon an average charge time/job multiplied by some predetermined factor. Such a charging scheme may have rovers fully charged to any suitable predetermined working voltage such as, for example, approximately 46V, be tolerant of dead power supplies, and substantially eliminate use of the incomplete charge mode. In another aspect, the charger monitor software 81010 may compute how much charge time is needed for the rover based upon, for example, at least one or more of capacitance and voltage levels and routing information.

Figure 29:
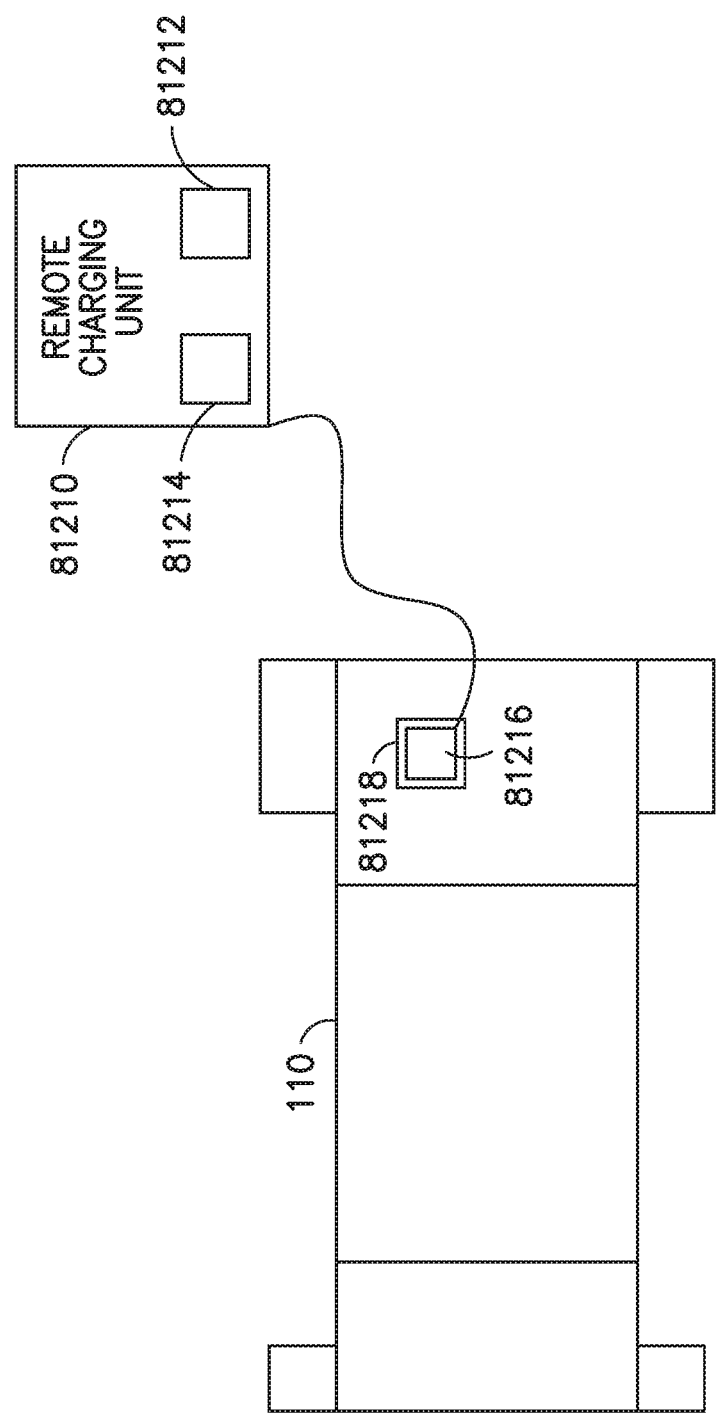
FIG. 29 is a schematic illustration of a system using a transportable charger in accordance with aspects of the disclosed embodiment.
Figure 30:
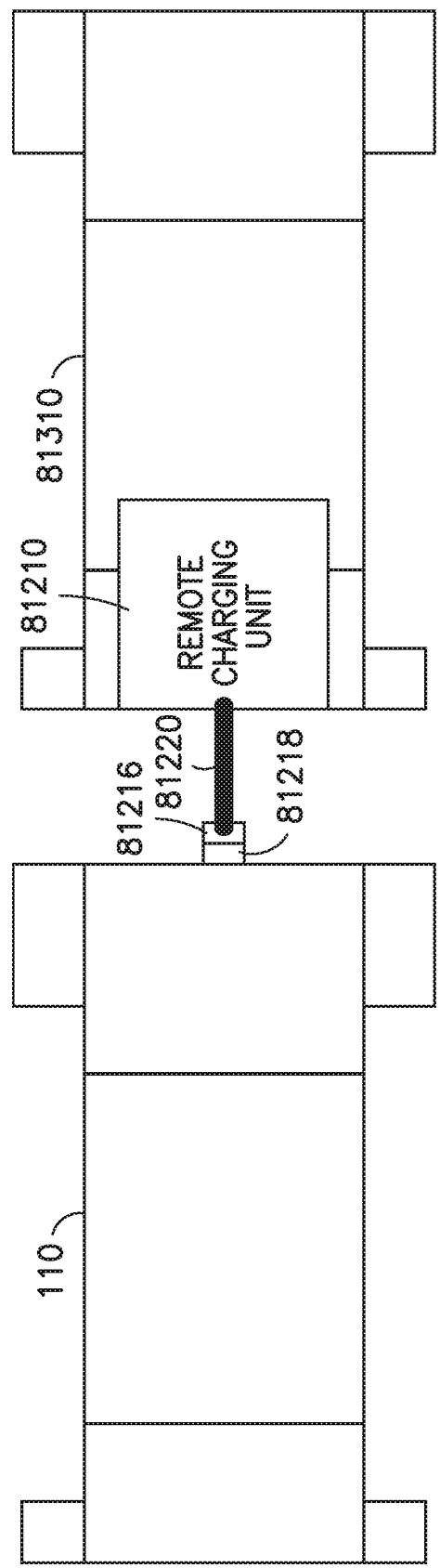
FIG. 30 is a schematic illustration of a system using a transportable charger in accordance with aspects of the disclosed embodiment.

Turning to FIGS. 29 and 30, a remote charging unit 81210 may be provided to charge at least one autonomous rover 110 requiring a charge and unable to reach a charging location. The remote charging unit 81210 may be sized and shaped so as to be transportable by maintenance personnel or another autonomous rover. In one aspect the remote charging unit 81210 may take the form of a backpack, a carry case or have any other suitable transportable configuration. In another aspect the remote charging unit may be a transportable unit that can be mounted to or otherwise affixed to another autonomous rover 81310 (FIG. 30) for transport through the storage and retrieval system.

The remote charging unit may include any suitable energy storage unit 81212 such as a battery or capacitor. The energy storage unit may be rechargeable so that the remote charging unit 81210 may be reusable. The remote charging unit may include any suitable controls 81214. For example, the controls may provide for an operator to start and stop a charge and/or automatic start and stop of a charge upon, e.g., detection that the remote charging unit is coupled to the autonomous rover in need of charge. The remote charging unit may also include one or more connectors 81216 for transferring energy from the energy storage unit 81212 to an onboard energy source of the at least one rover requiring a charge. Where two connections 81216 are provided simultaneous charging of rovers may be performed. In one aspect a rover requiring a charge may include a plug or other suitable connector 81218 in which the remote charging unit connector 81216 interfaces for the transfer of energy. In other aspects, such as when the remote charging unit 81210 is carried by another rover 81310, the remote charging unit may include a probe 81220 that interfaces with the connector 81218 of the rover requiring a charge such that when rovers 110 and 81310 are disposed adjacent one another the probe is aligned with the receptacle (FIG. 30). The remote charging unit 81210 may be used to charge one or more rovers (e.g. individually or simultaneously) at any location within the storage and retrieval structure or outside the storage and retrieval structure.

In accordance with one or more aspects of the disclosed embodiment an automated storage and retrieval system includes at least one autonomous rover for transferring payload within the automated storage and retrieval system, the at least one autonomous rover including a communicator; a multilevel storage structure, each level of the storage structure being configured to allow traversal of the at least one autonomous rover; at least one registration station disposed at predetermined locations on each level of the multilevel storage structure, the at least one registration station being configured to communicate with the communicator to at least receive rover identification information; and a controller in communication with the at least one registration station, the controller being configured to receive the at least rover identification information and at least one of register the at least one autonomous rover as being on a level of the storage structure corresponding to a respective one of the at least one registration station or deregister the at least one autonomous rover from the automated storage and retrieval system, where the controller effects induction of the at least one autonomous rover into a predetermined rover space on the level.

In accordance with one or more aspects of the disclosed embodiment the automated storage and retrieval system further includes at least one rover transfer station configured to physically insert or remove the at least one autonomous rover to and from a respective level; wherein each of the at least one rover transfer station includes a respective registration station, the registration station being further configured to send location information corresponding to a location of the at least one rover with respect to a global automated storage and retrieval reference frame.

In accordance with one or more aspects of the disclosed embodiment a location of each of the at least one registration station within the multilevel storage structure is mapped within a global automated storage and retrieval reference frame.

In accordance with one or more aspects of the disclosed embodiment the at least one registration station effects autonomous rover location determination for allowing an autonomous rover lacking rover prepositioning information to commence operations from a cold start substantially anywhere within the multilevel storage structure.

In accordance with one or more aspects of the disclosed embodiment the at least one registration station effects updating a location of a registered autonomous rover within the multilevel storage structure.

In accordance with one or more aspects of the disclosed embodiment the communicator comprises one or more of a radio frequency identification chip reader and an optical code reader.

In accordance with one or more aspects of the disclosed embodiment an automated storage and retrieval system includes at least one autonomous rover for transferring payload within the automated storage and retrieval system, the at least one autonomous rover including a communicator; a multilevel storage structure, each level of the storage structure being configured to allow traversal of the at least one autonomous rover; and at least one registration station disposed at predetermined locations on each level of the multilevel storage structure with respect to a global automated storage and retrieval reference frame, the at least one registration station being configured to at least communicate with the communicator to send location information to the at least one rover corresponding to a location of the at least one rover with respect to the global automated storage and retrieval reference frame for effecting at least a rover location determination upon induction of the at least one rover into the automated storage and retrieval system.

In accordance with one or more aspects of the disclosed embodiment the automated storage and retrieval system further includes at least one rover transfer station disposed on at least one level of the storage structure, the at least one rover transfer station being configured to physically insert or remove the at least one autonomous rover to and from a respective level; wherein each of the at least one rover transfer station includes a respective registration station.

In accordance with one or more aspects of the disclosed embodiment the automated storage and retrieval system further includes a controller in communication with the at least one registration station; wherein the controller is configured to effect at least one of registration of the at least one autonomous rover upon induction of the at least one rover into the multilevel storage structure, and deregistration of the at least one autonomous rover upon extraction of the at least one rover from the multilevel storage structure.

In accordance with one or more aspects of the disclosed embodiment the at least one registration station effects autonomous rover location determination for allowing an autonomous rover lacking rover prepositioning information to commence operations from a cold start substantially anywhere within the multilevel storage structure.

In accordance with one or more aspects of the disclosed embodiment the at least one registration station effects updating a location of a registered autonomous rover within the multilevel storage structure.

In accordance with one or more aspects of the disclosed embodiment the communicator comprises one or more of a radio frequency identification chip reader and an optical code reader.

In accordance with one or more aspects of the disclosed embodiment an automatic registration system for autonomous rovers is provided. The automatic registration system includes a rover space having a global reference frame; at least one registration station disposed at predetermined locations within the rover space, the at least one registration station being configured to communicate with each of the autonomous rovers to at least receive rover identification information; and a controller in communication with the at least one registration station, the controller being configured to receive the at least rover identification information and at least one of register a corresponding autonomous rover as being at a predetermined location within the rover space corresponding to a respective one of the at least one registration station or deregister the corresponding autonomous rover from the rover space, where the controller effects induction of the corresponding autonomous rover into the rover space.

In accordance with one or more aspects of the disclosed embodiment the rover space is a multilevel storage structure and the global reference frame is a three dimensional reference frame of the multilevel storage structure.

In accordance with one or more aspects of the disclosed embodiment the automatic registration system further includes at least one rover transfer station configured to physically insert or remove the at least one autonomous rover to and from the rover space; wherein each of the at least one rover transfer station includes a respective registration station, the registration station being further configured to send location information corresponding to a location of the at least one rover with respect to the global reference frame.

In accordance with one or more aspects of the disclosed embodiment a location of each of the at least one registration station within the rover space is mapped within the global reference frame.

In accordance with one or more aspects of the disclosed embodiment the at least one registration station effects autonomous rover location determination for allowing an autonomous rover lacking rover prepositioning information to commence operations from a cold start substantially anywhere within the rover space.

In accordance with one or more aspects of the disclosed embodiment the at least one registration station effects updating a location of a registered autonomous rover within the rover space.

In accordance with one or more aspects of the disclosed embodiment the at least one registration station is configured to communicate with each of the autonomous rovers through one or more of a radio wave receiver and an optical code reader.

In accordance with one or more aspects of the disclosed embodiment an automated storage and retrieval system includes at least one autonomous rover configured for transporting case units; at least one modular rover space in which the at least one autonomous rover travels, each of the at least one modular rover space including at least one multilevel vertical conveyor in communication with the at least one autonomous rover and configured to at least one of input and remove the case units from the modular rover space, storage spaces in communication with the at least one autonomous rover and configured to hold the case units, and at least one transfer deck configured to allow rover transit between the at least one multilevel vertical conveyor and respective storage spaces; and at least one rover module connected to the at least one transfer deck, the at least one rover module being configured to at least one of introduce and remove the at least one autonomous rover into at least one respective modular rover space substantially independent of the input and removal of case units to and from the automated storage and retrieval system.

In accordance with one or more aspects of the disclosed embodiment the at least one rover module is configured to at least one of introduce and remove the at least one autonomous rover into at least one respective modular rover space substantially independent of case unit transfer by the at least one autonomous rover.

In accordance with one or more aspects of the disclosed embodiment the at least one transfer deck comprises at least two vertically stacked transfer decks and the at least one rover module is configured to transfer the at least one autonomous rover to each of the at least two vertically stacked transfer decks.

In accordance with one or more aspects of the disclosed embodiment the at least one transfer deck comprises at least two vertically stacked transfer decks and the at least one rover module is configured to transfer the at least one autonomous rover between each of the at least two vertically stacked transfer decks while the at least one autonomous rover remains within the automated storage and retrieval system.

In accordance with one or more aspects of the disclosed embodiment the at least one modular rover space includes at least two modular rover spaces connected to each other to form a storage array of the automated storage and retrieval system.

In accordance with one or more aspects of the disclosed embodiment at least two modular rover spaces are configured so that the at least one autonomous rover transits between the at least two modular rover spaces. In one aspect the at least one rover module effects transit of the at least one autonomous rover between the at least two modular rover spaces.

In accordance with one or more aspects of the disclosed embodiment the at least one rover module includes an identification system configured to effect registration and deregistration of the at least one autonomous rover upon a respective loading and unloading of each autonomous rover into the automated storage and retrieval system.

In accordance with one or more aspects of the disclosed embodiment each transfer deck includes at least one rover platform positioned to interface with a respective rover module. In one aspect the at least one rover platform comprises a movable barrier at an interface between the at least one rover platform and the respective rover module.

In accordance with one or more aspects of the disclosed embodiment the at least one rover module effects rover load balancing between storage levels of the automated storage and retrieval system.

In accordance with one or more aspects of the disclosed embodiment the at least one modular rover space is configured to isolate the at least one automated rover within the automated storage and retrieval system.

In accordance with one or more aspects of the disclosed embodiment a method of balancing a work load in an automated storage and retrieval system having multiple storage levels and at least one autonomous rover is provided. The method includes providing at least one rover module, the at least one rover module being in communication with each storage level; and transporting the at least one autonomous rover with the at least one rover module to at least one of introduce and remove the at least one autonomous rover at a predetermined storage level to effect at least one of rover load balancing and work load balancing between storage levels.

In accordance with one or more aspects of the disclosed embodiment the at least one autonomous rover is introduced into the predetermined storage level from another one of the multiple storage levels.

In accordance with one or more aspects of the disclosed embodiment the at least one autonomous rover is introduced into the predetermined storage level from outside of the automated storage and retrieval system.

In accordance with one or more aspects of the disclosed embodiment the at least one autonomous rover is removed from the predetermined storage level and transferred with the at least one rover module to another one of the multiple storage levels.

In accordance with one or more aspects of the disclosed embodiment the at least one autonomous rover is removed from the predetermined storage level and transferred with the at least one rover module outside of the automated storage and retrieval system.

In accordance with one or more aspects of the disclosed embodiment the method further includes at least one of registering and deregistering the at least one autonomous rover upon a respective introduction and removal of each autonomous rover at the predetermined storage level.

In accordance with one or more aspects of the disclosed embodiment an automated storage and retrieval system is provided. The automated storage and retrieval system includes an autonomous rover; and a multilevel rack structure. The multilevel rack structure includes columns connected by rail beams transversely spanning between the columns. The rail beams define storage and transport levels and provide riding surfaces for the autonomous rover. The rail beams include integral fatigue resistant rover location apertures.

In accordance with one or more aspects of the disclosed embodiment, the autonomous rover includes sensors for detecting the rover location apertures.

In accordance with one or more aspects of the disclosed embodiment, the rail beam members include fatigue resistant connections for coupling the rail beam members to the columns.

In accordance with one or more aspects of the disclosed embodiment an automated storage and retrieval system having autonomous rovers is provided. The automated storage and retrieval system includes a first automated storage and retrieval section having respective structural dynamic properties and a first rover support surface upon which the autonomous rovers travel; a second automated storage and retrieval section having respective structural dynamic properties and a second rover support surface upon which the autonomous rovers travel; and a released interface disposed between the first and second rover support surfaces. The released interface being configured to allow relative movement between the first and second rover support surfaces, and provide an interface support surface upon which the autonomous rovers travel, the interface support surface extending between the first and second rover support surfaces.

In accordance with one or more aspects of the disclosed embodiment the released interface includes an interface portion connected to one of the first or second rover support surface; and at least one movable plate movably connected to another one of the first or second rover support surface, the at least one movable plate and the interface portion being configured to releasably engage one another for providing the interface support surface. In other aspects the interface portion includes first fingers integrally formed with the one of the first or second rover support surface and the at least one movable plate includes second fingers that are interleaved with the first fingers. In still other aspects the first rover support surface comprises at least one rover guide rail of a vertical lift module and the second rover support surface comprises a transfer deck surface. In yet another aspect the interface portion comprises two interface portions and the at least one movable plate comprises a movable plate for releasably engaging a respective one of the two interface portions. In still another aspect the interface portion comprises two interface portions and the at least one movable plate comprises a single plate for releasably engaging the two interface portions. In another aspect the at least one movable plate is movably coupled to the another one of the first or second rover support surface with at least a two-degree of freedom coupling.

In accordance with one or more aspects of the disclosed embodiment the automated storage and retrieval system includes at least one vertical lift module; and a transfer deck in communication with the at least one vertical lift module; wherein the first automated storage and retrieval section comprises the at least one vertical lift module and the second automated storage and retrieval section comprises the transfer deck. In another aspect wherein the at least one vertical lift module includes a frame, rover guide rails, and an adjustable rail mounting bracket coupling the rover guide rails to the frame. In one aspect the adjustable rail mounting bracket is configured to provide adjustment in three degrees of freedom. In another aspect the at least one vertical lift module comprises a rover charging station including compliant contacts configured to engage the autonomous rovers.

In accordance with one or more aspects of the disclosed embodiment the respective structural dynamic properties of the first automated storage and retrieval section are different than the respective structural dynamic properties of the second automated storage and retrieval section.

In accordance with one or more aspects of the disclosed embodiment an automated storage and retrieval system having autonomous rovers is provided. The automated storage and retrieval system includes at least one vertical lift module having at least one travel surface upon which the autonomous rovers travel; a transfer deck in communication with the at least one vertical lift module, the transfer deck including a transfer deck surface upon which the autonomous rovers travel; and a released interface releasably connecting the at least one travel surface and the transfer deck surface, the released interface forming an autonomous rover riding surface extending between the at least one travel surface and the transfer deck surface.

In accordance with one or more aspects of the disclosed embodiment the at least one vertical lift module includes a frame, and a rail mounting bracket configured to adjustably couple the at least one travel surface to the frame.

In accordance with one or more aspects of the disclosed embodiment the at least one vertical lift module comprises a rover charging station including compliant contacts configured to engage the autonomous rovers.

In accordance with one or more aspects of the disclosed embodiment the released interface includes an interface portion connected to one of the at least one travel surface or the transfer deck surface; and at least one movable plate movably connected to another one of the at least one travel surface or the transfer deck surface, the at least one movable plate and the interface portion being configured to releasably engage one another and provide the autonomous rover riding surface. In another aspect the interface portion includes first fingers integrally formed with the at least one travel surface or the transfer deck surface and the at least one movable plate includes second fingers that are interleaved with the first fingers. In yet another aspect the interface portion comprises two interface portions and the at least one movable plate comprises a movable plate for releasably engaging a respective one of the two interface portions. In still another aspect the interface portion comprises two interface portions and the at least one movable plate comprises a single plate for releasably engaging the two interface portions. In another aspect the at least one movable plate is movably coupled to the another one of the at least one travel surface or the transfer deck surface with at least a two-degree of freedom coupling.

In accordance with one or more aspects of the disclosed embodiment, a charging system for an autonomous rover includes a charging interface with contacts that interface with the autonomous rover, a rover power source for the autonomous rover, and circuitry operated by the autonomous rover for controlling charging of the rover power source.

In accordance with one or more aspects of the disclosed embodiment, an output of the charging interface is enabled when the rover accesses and de-accesses the contacts.

In accordance with one or more aspects of the disclosed embodiment, the charging system includes one or more charging stations each of which includes the charging interface and rover entry to a charging station is decoupled or independent from a charging station status.

In accordance with one or more aspects of the disclosed embodiment, the charging system includes a charging supply connected to the charging interface, the charging supply being configured to switch between one or more of a constant current output mode, a constant voltage output mode, or a constant power output mode and switching between different output modes may be effected by one or more of automatically by the charging supply and by commands received from the circuitry operated by the autonomous rover.

In accordance with one or more aspects of the disclosed embodiment, the circuitry operated by the autonomous rover is configured to control an output of the charging interface to effect charging of the rover power source independent of a charging interface status when the autonomous rover accesses and de-accesses the contacts.

In accordance with one or more aspects of the disclosed embodiment, the charging interface is disposed at a charging location and the circuitry operated by the autonomous rover is configured to cause an output of the charging interface to change between a safe and unsafe state to effect a hot swap entry and departure of the autonomous rover with respect to the charging location.

In accordance with one or more aspects of the disclosed embodiment, the charging system for an autonomous rover is part of a storage and retrieval system.

In accordance with one or more aspects of the disclosed embodiment, a charging system for an autonomous rover includes one or more charging stations configured to engage the autonomous rover, each of the charging stations comprising a charging supply; and a power source for the autonomous rover, wherein autonomous rover entry to a charging station is decoupled or independent from a charging station status.

In accordance with one or more aspects of the disclosed embodiment, an output of the charging supply is enabled when the rover accesses and de-accesses a respective charging station.

In accordance with one or more aspects of the disclosed embodiment, the charging supply is configured to switch between one or more of a constant current output mode, a constant voltage output mode, and a constant power output mode.

In accordance with one or more aspects of the disclosed embodiment, switching between different output modes may be effected by one or more of automatically by the charging supply and by commands received from the circuitry operated by the autonomous rover.

In accordance with one or more aspects of the disclosed embodiment, the charging system further includes circuitry on-board and operated by the autonomous rover, the circuitry being configured to control an output of the one or more charging stations to effect charging of the power source independent of a charging station status when the autonomous rover accesses and de-accesses the contacts.

In accordance with one or more aspects of the disclosed embodiment, a charging system for an autonomous rover includes a charging station having contacts configured to engage the autonomous rover, a power source for the autonomous rover, and circuitry operated by the autonomous rover the circuitry being configured to cause an output of the charging station to change between a safe and unsafe state to effect a hot swap entry and departure of the autonomous rover with respect to the charging station.

In accordance with one or more aspects of the disclosed embodiment, an output of the charging station is enabled when the rover accesses and de-accesses the contacts.

In accordance with one or more aspects of the disclosed embodiment, the charging supply is configured to switch between one or more of a constant current output mode, a constant voltage output mode, and a constant power output mode.

In accordance with one or more aspects of the disclosed embodiment, switching between different output modes may be effected by one or more of automatically by the charging supply and by commands received from the circuitry operated by the autonomous rover.

In accordance with one or more aspects of the disclosed embodiment, a charging system for an autonomous rover includes a system controller and a charging station with one or more charging interfaces configured to engage the autonomous rover for charging, wherein entry to the charging station is under control of the autonomous rover and independent of the system controller.

In accordance with one or more aspects of the disclosed embodiment, an output of the charging interface is energized when the autonomous rover accesses and de-accesses the contacts.

In accordance with one or more aspects of the disclosed embodiment, entry to the charging station is independent of communication between the autonomous rover and the system controller.

It should be understood that the foregoing description is only illustrative of the aspects of the disclosed embodiment. Various alternatives and modifications can be devised by those skilled in the art without departing from the aspects of the disclosed embodiment.

Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated storage and retrieval system having multiple storage levels and at least one autonomous rover, the system comprising:
at least one rover entry or exit station, the at least one rover entry or exit station being in communication with each storage level; and
a controller configured to insert or remove the at least one autonomous rover via the at least one rover entry or exit station to at least one of introduce and remove the at least one autonomous rover at a predetermined storage level, and the controller is configured to effect at least one of rover load balancing and work load balancing between storage levels so as to balance a work load in the automated storage and retrieval system.

2. The automated storage and retrieval system of claim 1, wherein the at least one autonomous rover is introduced into the predetermined storage level from one or more of
another one of the multiple storage levels, and
outside of the automated storage and retrieval system.

3. The automated storage and retrieval system of claim 1, wherein the at least one autonomous rover is removed from the predetermined storage level and transferred with the at least one rover entry or exit station to another one of the multiple storage levels or transferred with the at least one rover entry or exit station outside of the automated storage and retrieval system, where transfer of the at least one autonomous rover with the at least one rover entry or exit station is decoupled from case unit input and output from the storage and retrieval system.

4. An automated storage and retrieval system having multiple storage levels and at least one autonomous rover, the system comprising
at least one rover entry or exit station, the at least one rover entry or exit station being in communication with each storage level; and
a controller configured to:
insert or remove the at least one autonomous rover via the at least one rover entry or exit station to at least one of introduce and remove the at least one autonomous rover at a predetermined storage level, and the controller is configured to effect at least one of rover load balancing and work load balancing between storage levels so as to balance a work load in the automated storage and retrieval system; and
at least one of register and deregister the at least one autonomous rover upon a respective introduction and removal of each autonomous rover at the predetermined storage level.

5. The automated storage and retrieval system of claim 4, wherein the at least one autonomous rover is introduced into the predetermined storage level from one or more of
another one of the multiple storage levels, and
outside of the automated storage and retrieval system.

6. The automated storage and retrieval system of claim 4, wherein the at least one autonomous rover is removed from the predetermined storage level and transferred with the at least one rover entry or exit station to another one of the multiple storage levels or transferred with the at least one rover entry or exit station outside of the automated storage and retrieval system, where transfer of the at least one autonomous rover with the at least one rover entry or exit station is decoupled from case unit input and output from the storage and retrieval system.

7. An automatic registration system for autonomous rovers, the automatic registration system comprising:
a rover space having a global reference frame;
at least one registration station disposed at predetermined locations within the rover space, the at least one registration station being configured to communicate with each of the autonomous rovers to at least receive rover identification information; and
a controller in communication with the at least one registration station, the controller being configured to receive the at least rover identification information from the at least one registration station and wherein the at least one registration station is configured to effect autonomous rover location determination for allowing an autonomous rover lacking rover prepositioning information to commence operations from a cold start substantially anywhere within the rover space, where the controller effects induction of the autonomous rover into the rover space.

8. The automatic registration system of claim 7, wherein the controller, based on the rover identification information, registers a corresponding autonomous rover as being at a predetermined location within the rover space corresponding from the at least one registration station.

9. The automatic registration system of claim 7, wherein the rover space is a multilevel storage structure and the global reference frame is a three dimensional reference frame of the multilevel storage structure.

10. The automatic registration system of claim 7, further comprising:
at least one rover transfer station configured to physically insert or remove the at least one autonomous rover to and from the rover space where the physical insertion or removal of the at least one autonomous rover to and from the rover space is decoupled from case unit input and output.

11. The automatic registration system of claim 10, wherein each of the at least one rover transfer station includes a respective registration station, the registration station being further configured to send location information corresponding to a location of the at least one rover with respect to the global reference frame.

12. The automatic registration system of claim 7, wherein a location of each of the at least one registration station within the rover space is mapped within the global reference frame.

13. The automatic registration system of claim 7, wherein the at least one registration station is configured to one or more of
effect updating a location of a registered autonomous rover within the rover space, and
communicate with each of the autonomous rovers through one or more of a radio wave receiver and an optical code reader.

14. A method for automatically registering autonomous rovers, the method comprising:
providing a rover space having a global reference frame;
providing at least one registration station disposed at predetermined locations within the rover space, the at least one registration station being configured to communicate with each of the autonomous rovers to at least receive rover identification information;
receiving, with a controller in communication with the at least one registration station, the at least rover identification information from the at least one registration station; and
effecting, with the at least one registration station, autonomous rover location determination for allowing an autonomous rover lacking rover prepositioning information to commence operations from a cold start substantially anywhere within the rover space, where the controller effects induction of the autonomous rover into the rover space.

15. The method of claim 14, further comprising registering, with the controller based on the rover identification information, a corresponding autonomous rover as being at a predetermined location within the rover space corresponding from the at least one registration station.

16. The method of claim 14, wherein the rover space is a multilevel storage structure and the global reference frame is a three dimensional reference frame of the multilevel storage structure.

17. The method of claim 14, further comprising:
physically inserting or removing, with at least one rover transfer station, the at least one autonomous rover to and from the rover space where the physical insertion or removal of the at least one autonomous rover to and from the rover space is decoupled from case unit input and output from the storage and retrieval system.

18. The method of claim 17, wherein each of the at least one rover transfer station includes a respective registration station, the method further comprising sending, with the registration station, location information corresponding to a location of the at least one rover with respect to the global reference frame.

19. The method of claim 14, wherein a location of each of the at least one registration station within the rover space is mapped within the global reference frame.

20. The method of claim 14, the method further comprising one or more of:
effecting, with the at least one registration station, updating a location of a registered autonomous rover within the rover space, and
communicating, with the at least one registration station, with each of the autonomous rovers through one or more of a radio wave receiver and an optical code reader.

* * * * *